US011928907B2

(12) United States Patent
Nakao et al.

(10) Patent No.: US 11,928,907 B2
(45) **Date of Patent: *Mar. 12, 2024**

(54) INFORMATION PROCESSING APPARATUS, CONTROL PROGRAM OF COMMUNICATION TERMINAL, AND ENTRANCE AND EXIT MANAGEMENT METHOD

(71) Applicant: NEC Corporation, Tokyo (JP)

(72) Inventors: Tomoaki Nakao, Tokyo (JP); Yukie Hasegawa, Tokyo (JP); Kenji Harada, Tokyo (JP); Kenichi Urasawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,267

(22) Filed: Jan. 12, 2023

(65) Prior Publication Data

US 2023/0154267 A1 May 18, 2023

Related U.S. Application Data

(63) Continuation of application No. 17/344,461, filed on Jun. 10, 2021, now Pat. No. 11,605,257, which is a
(Continued)

(30) Foreign Application Priority Data

Nov. 2, 2018 (JP) ................................ 2018-207359

(51) Int. Cl.
*G07C 9/38* (2020.01)
*G07C 9/37* (2020.01)

(52) U.S. Cl.
CPC ................ *G07C 9/38* (2020.01); *G07C 9/37* (2020.01); *G07C 2209/02* (2013.01)

(58) Field of Classification Search
CPC ......... G07C 9/38; G07C 9/37; G07C 2209/02
See application file for complete search history.

(56) References Cited

U.S. PATENT DOCUMENTS 4,993,068 A * 2/1991 Piosenka ............. G06Q 20/341
382/116
11,062,545 B2 7/2021 Nakao ...................... G07C 9/37
(Continued)

FOREIGN PATENT DOCUMENTS

CN 106803289 A 6/2017
JP 2002-312551 A 10/2002
(Continued)

OTHER PUBLICATIONS

Japanese Office Action dated Jun. 20, 2023 in Japanese Application No. 2022-153089.
(Continued)

*Primary Examiner* — Sisay Yacob

(57) ABSTRACT

Entrance and exit of a person is efficiently managed by simple authentication and registration of entrance and exit using a communication terminal carried by the person. An information processing apparatus includes a face information register that registers face information of registered users who are to enter into and exit from a place in association with the place, an information acquirer that acquires, from a communication terminal, position information of the communication terminal, face information of an applying user who applies to enter into or exit from the place, and application information for entering or exiting, a user authenticator that performs user authentication by comparing the face information of the applying user acquired from the communication terminal by the information acquirer with the face information of the registered users registered in the face information register, and an entrance and exit recorder that records, if the user authentication
(Continued)

succeeds, that the applying user has entered into or exited from the place corresponding to the position information.

18 Claims, 49 Drawing Sheets

Related U.S. Application Data continuation of application No. 16/668,041, filed on Oct. 30, 2019, now Pat. No. 11,062,545.

(56) References Cited

U.S. PATENT DOCUMENTS

| | | | | |
|---|---|---|---|---|
| 2002/0140542 | A1* | 10/2002 | Prokoski | G06V 40/10 340/5.52 |
| 2002/0152390 | A1 | 10/2002 | Furuyama et al. | |
| 2002/0191817 | A1 | 12/2002 | Sato et al. | |
| 2004/0258281 | A1* | 12/2004 | Delgrosso | G06Q 20/4014 705/64 |
| 2012/0280783 | A1* | 11/2012 | Gerhardt | H04L 63/08 340/5.6 |
| 2014/0002236 | A1 | 1/2014 | Pineau et al. | |
| 2015/0170104 | A1 | 6/2015 | Yamada et al. | |
| 2015/0221151 | A1 | 8/2015 | Bacco | |
| 2016/0307380 | A1* | 10/2016 | Ho | G10L 17/00 |
| 2017/0213404 | A1 | 7/2017 | Sivalingam et al. | |

FOREIGN PATENT DOCUMENTS

| | | | |
|---|---|---|---|
| JP | 2002-329043 | A | 11/2002 |
| JP | 2004-326226 | A | 11/2004 |
| JP | 2006-065649 | A | 3/2006 |
| JP | 2007-148902 | A | 6/2007 |
| JP | 2009-080723 | A | 4/2009 |
| JP | 2009-098767 | A | 5/2009 |
| JP | 2009-245230 | A | 10/2009 |
| JP | 2009-301413 | A | 12/2009 |
| JP | 4850973 | B | 1/2012 |
| JP | 2016-024689 | A | 2/2016 |
| JP | 5871068 | B | 3/2016 |
| JP | 2016-058015 | A | 4/2016 |
| JP | 2018-142178 | A | 9/2018 |
| JP | 2018-151838 | A | 9/2018 |

OTHER PUBLICATIONS

JP Office Action for JP Application No. 2018-207359, dated Jul. 26, 2022 with English Translation.

Japanese Office Action for JP Application No. 2018-207359 dated Oct. 18, 2022 with English Translation.

Takahiro Fujimura, Mobile Diligence-and-Indolence Managerial System King of Time MobiRecorder that Combined Position Information and Face Authentication, Monthly Automatic Recognition, Japan Industrial Publishing Co., Ltd., Nov. 2, 2006, 19th vol. No. 13, the 23-27th Page Cited in JPOA as Document Showing a Well-known Technique.

* cited by examiner

521

| 611 | 612 | 613 | 614 | | 615 | 616 | |
|---|---|---|---|---|---|---|---|
| SITE ID | SITE NAME | CONTRACT COMPANY | WORK PERIOD | | PLACE INFORMATION | POSITION INFORMATION | ... |
| | | | START DATE | END DATE | | | |
| | | ⋮ | | | | | |
| | | ⋮ | | | | | |
| ⋮ | | | | | | | |

FIG. 6A

522

| SITE INFORMATION (621) | | WORKER INFORMATION (622) | | | | | WORKER FACE IMAGE (623) | |
|---|---|---|---|---|---|---|---|---|
| SITE NAME | POSITION | WORKER NAME | QUALIFICATION | LICENSE | ATTRIBUTE | ... | IMAGE DATA | FEATURE DATA |
| | | | | | | | | |
| | | | | | | | | |
| | | | | | | | | |
| | | ... | | | | | | |
| | | | | | | | | |
| | | | | | | | | |
| | | ... | | | | | | |
| ... | | | | | | | | |
| | | ... | | | | | | |

FIG. 6B

523

631 632 633

| WORKER ID | WORKER INFORMATION | WORKER ENTRANCE/EXIT HISTORY | | | | |
|---|---|---|---|---|---|---|
| | | DATE AND TIME | SITE INFORMATION | ENTRANCE/EXIT TIME | WORK CONTENTS | ... |
| | | | | | | |
| | | | | | | |
| | | | | | | |
| | | ... | | | | |
| | | | | | | |
| | | | | | | |
| | | ... | | | | |
| ... | | | | | | |
| | | ... | | | | |

FIG. 6C

524

| 641 BROWSING OR REPORT SCREEN ID | 642 BROWSING OR REPORT REQUEST SOURCE | 643 BROWSING OR REPORT CONTENTS | 644 BROWSING OR REPORT TEMPLATE |
|---|---|---|---|
| | | | |
| | | ... | |
| | | | |
| | | ... | |
| | ... | | |
| | | ... | |
| | | | |
| | | ... | |
| | ... | | |
| | | ... | |
| ... | | | |
| | | ... | |

FIG. 6D

581

| 711 | | 712 | | 713 | 714 | 715 |
|---|---|---|---|---|---|---|
| ENTRANCE/EXIT FACE IMAGE | | REGISTERED FACE IMAGE | | DEGREE OF MATCHING | THRESHOLD | AUTHENTICATION RESULT |
| FACE IMAGE DATA | FEATURE DATA | FACE IMAGE DATA | FEATURE DATA | | | |
| | | | | | | |

F I G. 7A

591

| 721 ENTRANCE/EXIT POSITION INFORMATION (GPS OR THE LIKE) | 722 SITE INFORMATION (POSITION INFORMATION OF SITE) | 723 POSITION INFORMATION < SITE INFORMATION | 724 AUTHENTICATION RESULT |
|---|---|---|---|
| | | | |

FIG. 7B

2923

| WORKER ID (2931) | WORKER INFORMATION (2932) | WORKER ENTRANCE/EXIT HISTORY (2933) | | | | |
|---|---|---|---|---|---|---|
| | | DATE/TIME | SITE INFORMATION | ENTRANCE/ EXIT TIME | WORK CONTENTS | ... |
| | | | | | | |
| | | | | | | |
| | | | MISMATCH | | | |
| | | ⋮ | | | | |
| | | | | | | |
| | | | | | | |
| | | ⋮ | | | | |
| INDEFINITE PERSON | | | | | | |
| | | | MISMATCH | | | |
| | | ⋮ | | | | |
| ⋮ | | | | | | |

FIG. 29

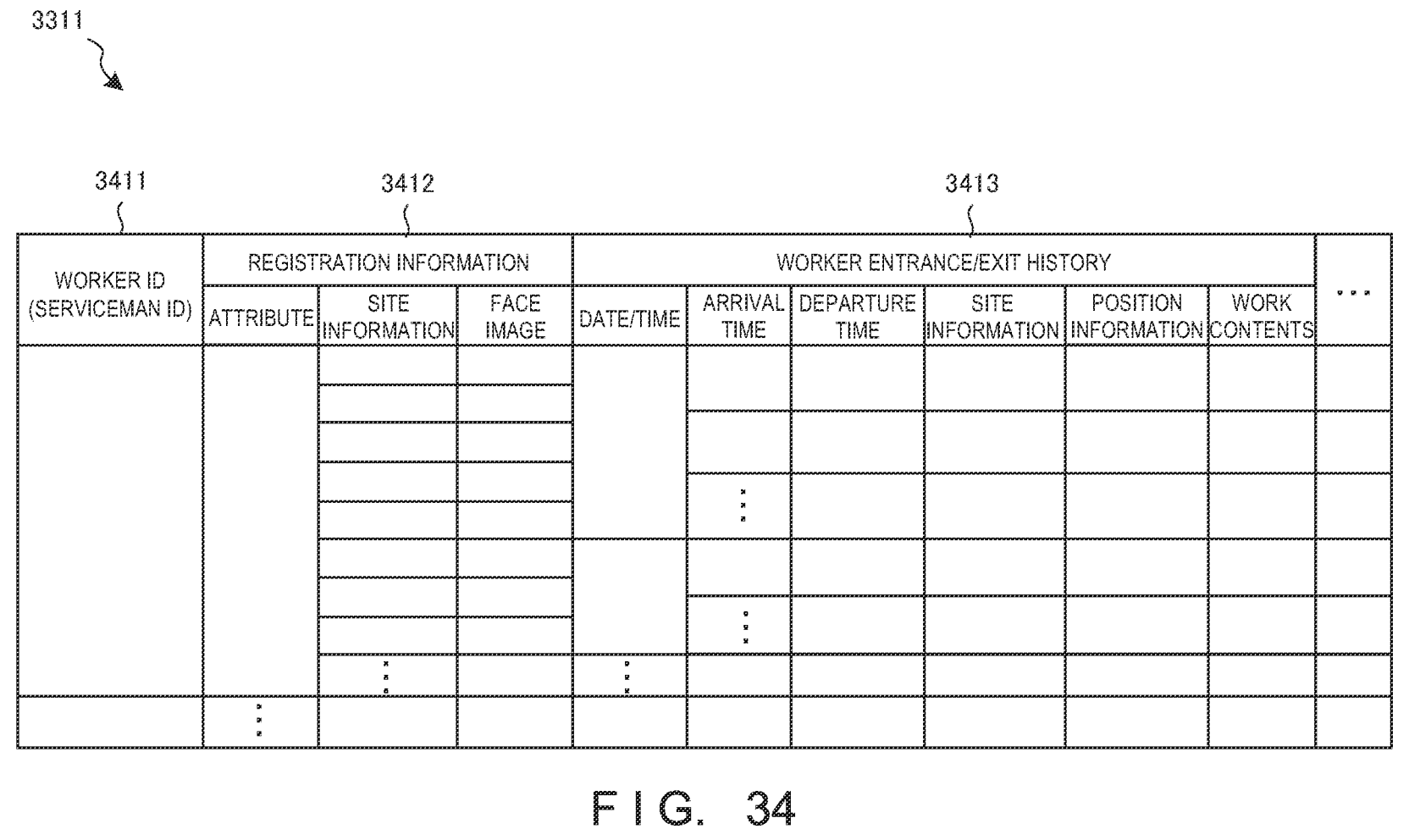

3311

3411 3412 3413

| WORKER ID (SERVICEMAN ID) | REGISTRATION INFORMATION | | | WORKER ENTRANCE/EXIT HISTORY | | | | | | ... |
|---|---|---|---|---|---|---|---|---|---|---|
| | ATTRIBUTE | SITE INFORMATION | FACE IMAGE | DATE/TIME | ARRIVAL TIME | DEPARTURE TIME | SITE INFORMATION | POSITION INFORMATION | WORK CONTENTS | |
| | | | | | | | | | | |
| | | | | | | | | | | |
| | | | | | ... | | | | | |
| | | | | | | | | | | |
| | | | | | ... | | | | | |
| | | ... | | ... | | | | | | |
| | ... | | | | | | | | | |

F I G. 34

3791

| 721 | 3822 | 3823 | 3824 |
|---|---|---|---|
| ENTRANCE/EXIT POSITION INFORMATION (GPS OR THE LIKE) | DISCLOSABLE RANGE INFORMATION (SITE INFORMATION) | POSITION INFORMATION < DISCLOSABLE RANGE INFORMATION | AUTHENTICATION RESULT |
| | | | |

FIG. 38

INFORMATION PROCESSING APPARATUS, CONTROL PROGRAM OF COMMUNICATION TERMINAL, AND ENTRANCE AND EXIT MANAGEMENT METHOD

CROSS-REFERENCE TO RELATED APPLICATIONS

This application is a continuation of U.S. application Ser. No. 17/344,461 filed on Jun. 10, 2021, which is a continuation of U.S. application Ser. No. 16/668,041 filed on Oct. 30, 2019, which issued as U.S. Pat. No. 11,062,545, which is based upon and claims the benefit of priority from Japanese patent application No. 2018-207359 filed on Nov. 2, 2018, the disclosures of which are incorporated herein in their entirety by reference.

BACKGROUND OF THE INVENTION

Field of the Invention

The present invention relates to an information processing apparatus, a control program of a communication terminal, and an entrance and exit management method.

Description of the Related Art

In the above technical field, patent literature 1 discloses a technique of collating face image data registered in advance with face image data of an entering/exiting person acquired by a face authentication apparatus provided at the gate of a construction site, and authenticating entrance/exit of the entering/exiting person.

[Patent Literature 1] Japanese Patent Laid-Open No. 2016-058015

SUMMARY OF THE INVENTION

In the technique described in the above literature, however, it is necessary to provide a face authentication apparatus at the gate of a construction site, and it is impossible to efficiently manage entrance and exit of a person.

The present invention provides a technique of solving the above-described problem.

One example aspect of the present invention provides an information processing apparatus comprising:

- a face information register that registers face information of registered users who are to enter into and exit from a place in association with the place;
- an information acquirer that acquires, from a communication terminal, position information of the communication terminal, face information of an applying user who applies to enter into or exit from the place, and application information for entering or exiting;
- a user authenticator that performs user authentication by comparing the face information of the applying user acquired from the communication terminal by the information acquirer with the face information of the registered users registered in the face information register; and
- an entrance and exit recorder that records, if the user authentication succeeds, that the applying user has entered into or exited from the place corresponding to the position information.

Another example aspect of the present invention provides a non-transitory computer readable medium storing a control program of a communication terminal for causing a computer to execute a method, the method comprising:

- transmitting, to an information processing apparatus, a place and face information of a registering user who is to enter into or exit from the place in association with each other, to register the face information corresponding to the place in the information processing apparatus;
- transmitting, to the information processing apparatus, position information of the communication terminal and face information of an applying user who applies to enter into or exit from the place, to apply for entering into or exiting from the place to the information processing apparatus;
- acquiring, from the information processing apparatus, a result of authentication which is performed in the information processing apparatus by comparing the face information of the applying user with face information of registering users registered in association with the place in advance; and
- notifying, to the applying user, whether it is accepted for the applying user to enter into or exit from the place based on the acquired result of the authentication.

Still other example aspect of the present invention provides an entrance and exit management method comprising:

- registering, in a face information register, face information of registered users who are to enter into or exits from a place in association with the place;
- acquiring position information of a communication terminal, face information of an applying user, who applies to enter into or exit from the place, captured by the communication terminal, and application information for entering or exiting input to the communication terminal;
- performing user authentication by comparing the face information of the applying user with the face information of the registered users registered in the face information register; and
- recording, if the user authentication succeeds, that the applying user has entered into or exited from the place corresponding to the position information.

According to the present invention, it is possible to efficiently manage entrance and exit of a person by simple authentication and registration of entrance and exit using a communication terminal carried by the person.

BRIEF DESCRIPTION OF THE DRAWINGS

FIG. 6A is a table showing the structure of a site information database according to the second example embodiment of the present invention;

FIG. 6B is a table showing the structure of a worker face image database according to the second example embodiment of the present invention;

FIG. 6C is a table showing the structure of a worker entrance/exit database according to the second example embodiment of the present invention;

FIG. 6D is a table showing the structure of a browsing and report template storage unit according to the second example embodiment of the present invention;

FIG. 7A is a table showing the structure of a face image authentication table according to the second example embodiment of the present invention;

FIG. 7B is a table showing the structure of a position information authentication table according to the second example embodiment of the present invention;

FIG. 29 is a table showing the structure of a worker entrance and exit database according to the seventh example embodiment of the present invention;

FIG. 34 is a table showing the structure of a site management database according to the ninth example embodiment of the present invention;

FIG. 38 is a table showing the structure of a position information authentication table according to the 10th example embodiment of the present invention.

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus that manages entrance and exit of a user.

Figure 1:
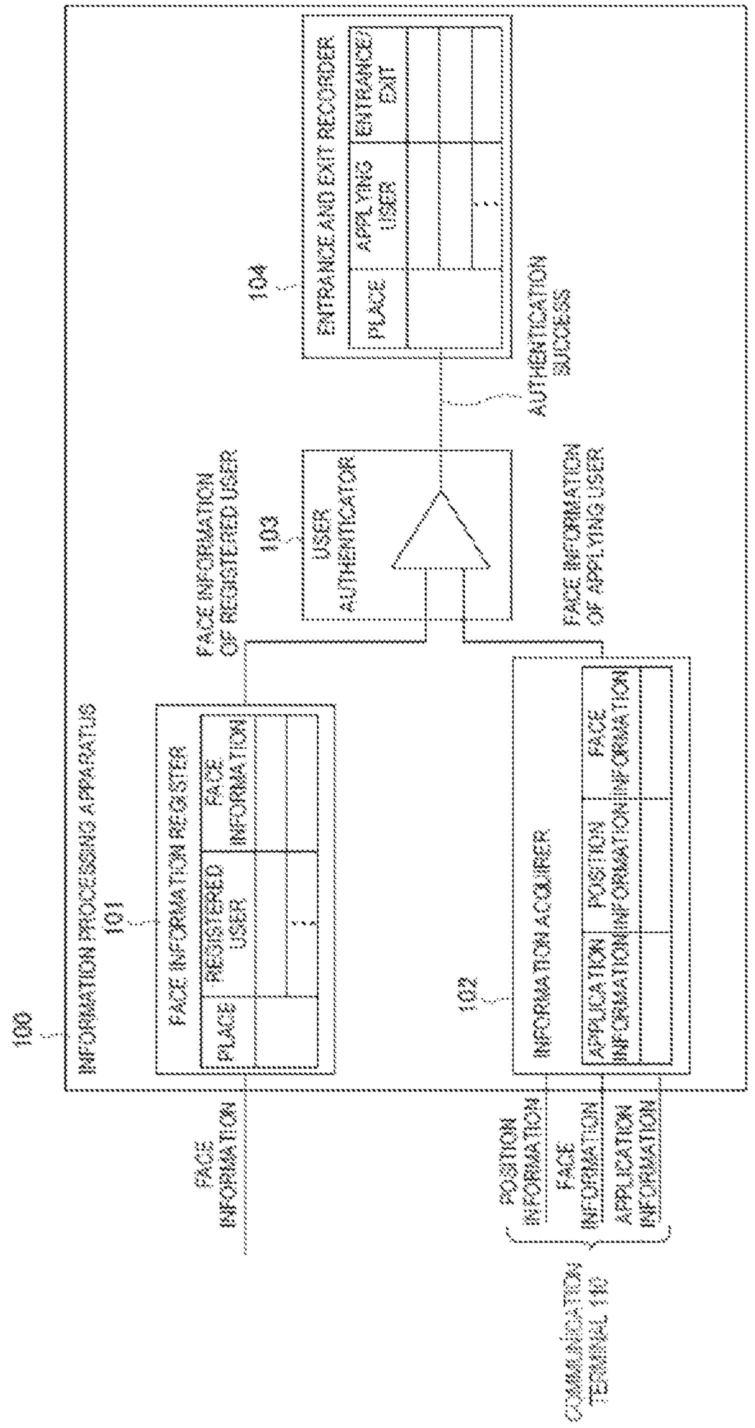
FIG. 1 is a block diagram showing the arrangement of an information processing apparatus according to the first example embodiment of the present invention.

As shown in FIG. 1, the information processing apparatus 100 includes a face information register 101, an information acquirer 102, a user authenticator 103, and an entrance and exit recorder 104. The face information register 101 registers face information of registered users who are to enter into and exit from a place in association with the place. The information acquirer 102 acquires, from a communication terminal 110, position information of the communication terminal 110, face information of an applying user who applies to enter into or exit from the place, and application information of entering or exiting. The user authenticator 103 performs user authentication by comparing the face information of the applying user acquired from the communication terminal 110 by the information acquirer 102 with the face information of the registered users registered in the face information register 101. The entrance and exit recorder 104 records, if user authentication succeeds, that the applying user has entered into or exited from the place corresponding to the position information.

According to this example embodiment, it is possible to efficiently manage entrance and exit of a person by simple authentication and registration of entrance and exit by the position information of the communication terminal and face authentication using the communication terminal carried by the person.

Second Example Embodiment

An information processing apparatus according to the second example embodiment of the present invention will be described next. The information processing apparatus according to this example embodiment is provided as a cloud server, and performs management processing by undertaking various entrance and exit management operations. In this example embodiment, time information is also acquired from a communication terminal, and the entrance time or exit time of an applying user is recorded based on the time information. In this example embodiment, pieces of registered face information are searched for face information associated with a place corresponding to position information of the communication terminal, and authentication is performed by comparing the found face information with face information of the applying user. Furthermore, in this example embodiment, at the time of user authentication, position information authentication is performed by comparing the position information of the communication terminal with the position information of the place. In this example embodiment, at the time of registration of face information, a place specifying code to be used by the communication terminal to acquire and hold the place is issued, the place acquired and held by the communication terminal based on the place specifying code and the face information of the user captured by the communication terminal are received, and then the face information of the user is registered in association with the place. In this case, the position information of the communication terminal, the face information of the applying user, and application information are acquired from the communication terminal that holds the place.

In this example embodiment, in response to a browsing request, a record of entrance or exit into or from the place is provided in a predetermined format to a browsing request source. Alternatively, in response to a report request, a report of entrance or exit of the applying user is created using history information of entrance or exit into or from the place.

<<Entrance and Exit Management System>>

An overview of an entrance and exit management system including the information processing apparatus serving as a cloud server according to this example embodiment will be described below with reference to FIGS. 2A to 4B.

(Overview of Operation of System)

Figure 2A:
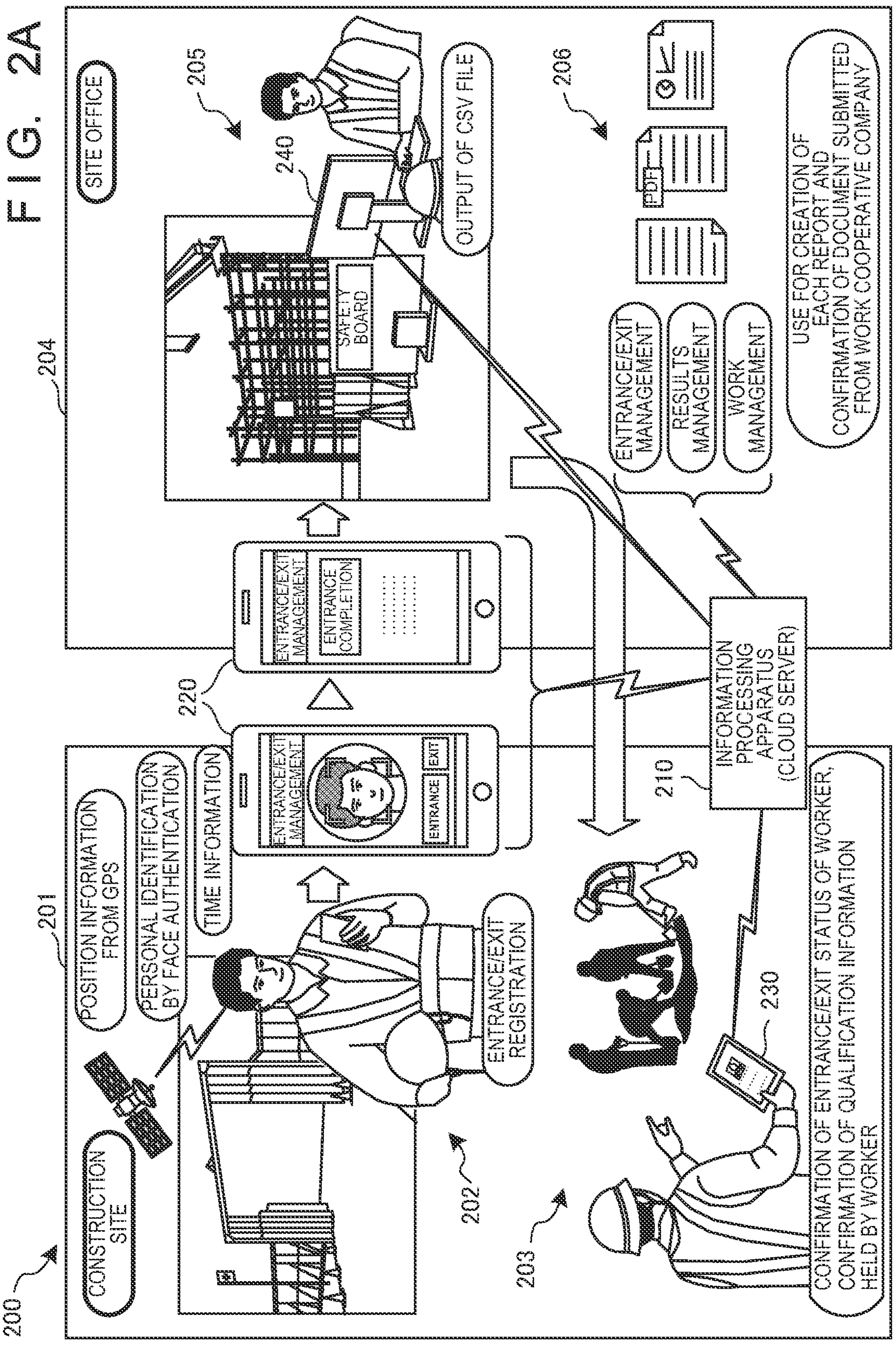
FIG. 2A is a view showing an overview of the operation of an entrance and exit management system including an information processing apparatus according to the second example embodiment of the present invention.

FIG. 2A is a view showing an overview of the operation of an entrance and exit management system 200 including an information processing apparatus 210 according to this example embodiment. Note that FIG. 2A shows an image of the overview of the operation, and details thereof will be described below.

Referring to FIG. 2A, the entrance and exit management system 200 manages entrance and exit of each worker as a user of this system by connecting a construction site 201 and a site office 204. A communication terminal 220 of the worker used at the construction site 201, a manager terminal 230, and a prime contractor manager terminal 240 arranged in the site office 204 are communicably connected to the information processing apparatus (cloud server) 210, thereby managing entrance and exit of the worker.

In entrance and exit registration 202 at the construction site 201, position information from the GPS, a face image, and time information are sent from the communication terminal 220 of the worker to the information processing apparatus 210, and the information processing apparatus 210 performs personal authentication by the face image. If face authentication succeeds, entrance or exit time of the worker at the site is registered.

In field work management 203 at the construction site 201, it is possible to browse an entrance and exit status list of the worker, licenses and qualifications of the worker, and the like using the manager terminal 230, and thus a field work manager can readily confirm work.

In entrance and exit file output 205 at the site office 204, by requesting, from the prime contractor manager terminal 240, the information processing apparatus 210 to create a document of the entrance and exit history of the worker to be submitted, and quickly outputting the document as a CSV (Comma Separated Value) file by a simple operation, the document can be used for creation of each report, work of confirming a document submitted from a work cooperative company, and the like 206.

(Overview of Operation of Communication Terminal)

Figure 2B:
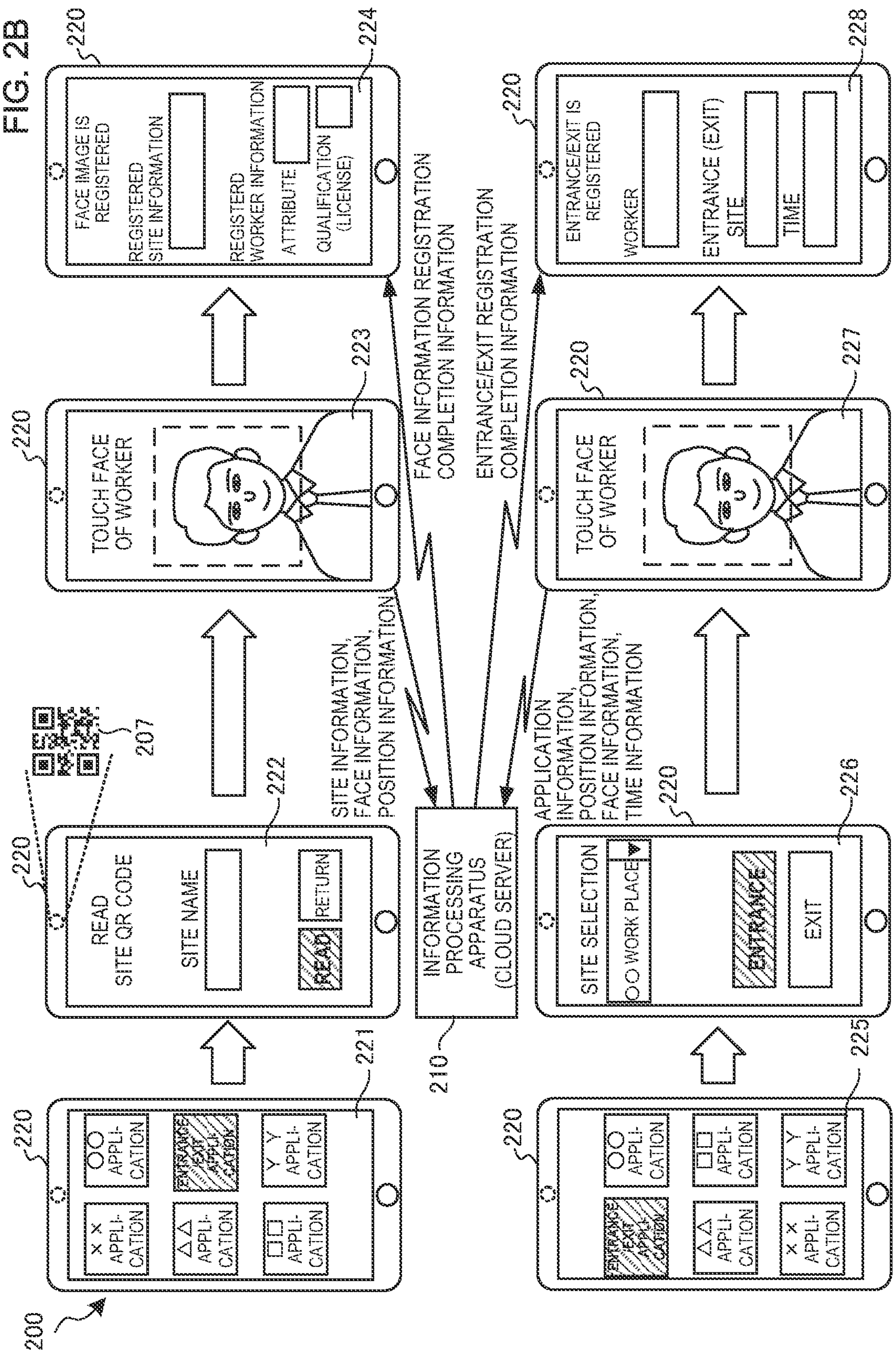
FIG. 2B is a view showing an overview of the operation of a communication terminal that communicates with the information processing apparatus according to the second example embodiment of the present invention.

FIG. 2B is a view showing an overview of the operation of the communication terminal 220 that communicates with the information processing apparatus 210 according to this example embodiment.

The upper portion of FIG. 2B shows transition of the display screen of the communication terminal 220 in processing of registering a face image of a worker associated with site information. A display screen 221 of the communication terminal 220 shows a state in which an entrance and exit management application is activated. A display screen 222 of the communication terminal 220 shows a state in which the entrance and exit management application reads a QR (Quick Response) Code® 207 generated from site information, reconstructs a site name from the site information, and then displays the site name. A display screen 223 of the communication terminal 220 shows a state in which the worker who is to register the face image is captured and a face image extracted from the captured image is transmitted to the information processing apparatus 210. Note that the site information and position information are transmitted together with the face image. A display screen 224 of the communication terminal 220 is a screen on which a notification is made that the face image of the worker has been registered in association with the site information.

The lower portion of FIG. 2B shows transition of the display screen of the communication terminal 220 in entrance and exit registration processing in which face authentication of a worker and position confirmation are performed at the time of entrance into or exit from the site. A display screen 225 of the communication terminal 220 shows a state in which the entrance and exit management application is activated. A display screen 226 of the communication terminal 220 is a screen on which the site name obtained from the site information already held at the time of registration of the face image is displayed by the entrance and exit management application and entrance or exit is selected. In FIG. 2B, entrance is selected. A display screen 227 of the communication terminal 220 shows a state in which the worker who enters into or exits from the site is captured and a face image extracted from the captured image is transmitted to the information processing apparatus 210. Note that application information, the position information of the communication terminal 220, and time information are transmitted together with the face image. A display screen 228 of the communication terminal 220 is a screen on which a notification is made that face authentication of the worker and position confirmation are complete and entrance into or exit from the site has been registered.

(Site Information and Position Information)

Figure 2C:
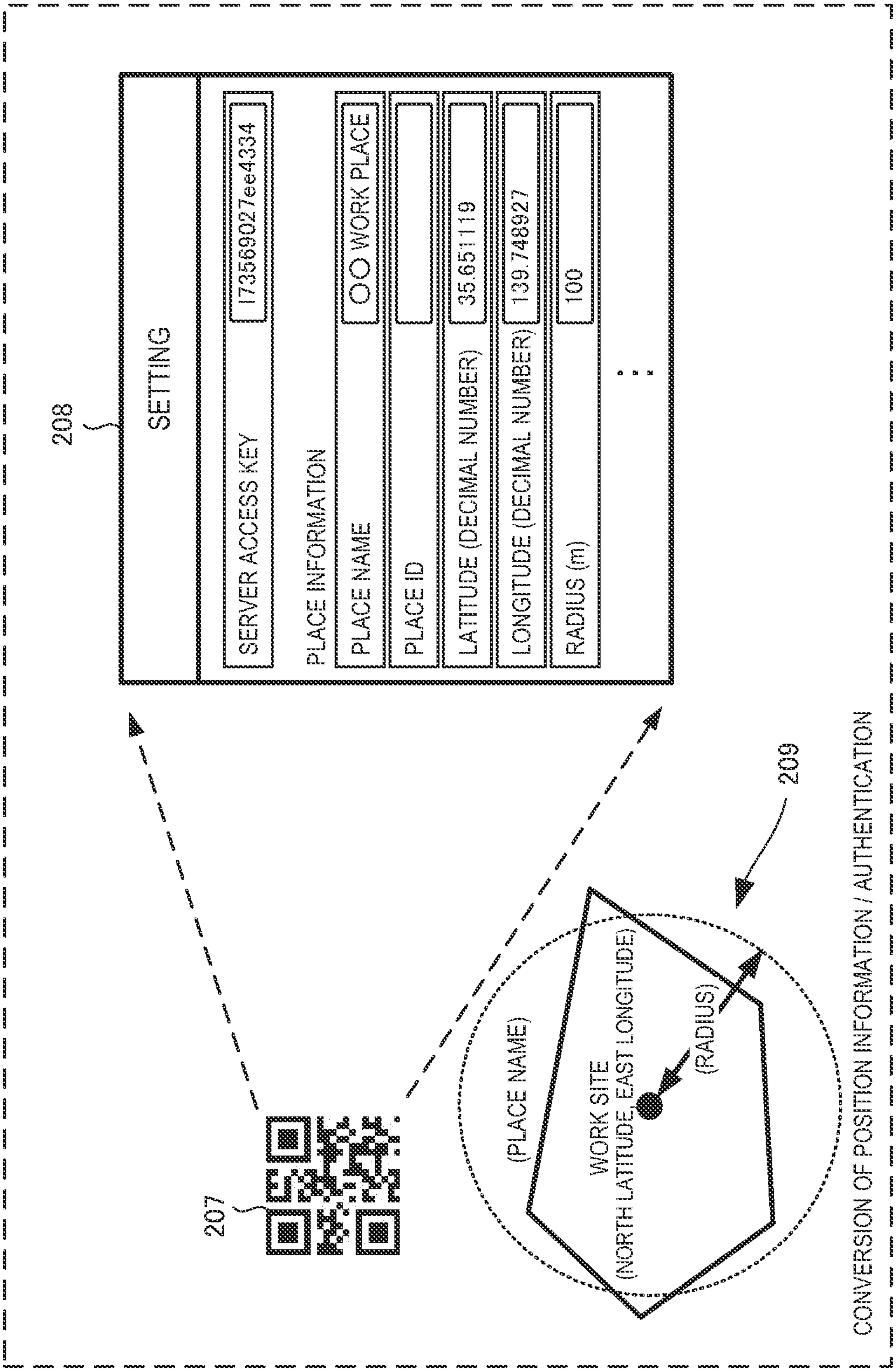
FIG. 2C is a view showing site information obtained from a QR Code® and position information obtained by a GPS according to the second example embodiment of the present invention.

FIG. 2C is a view showing the site information obtained from the QR Code® 207 and the position information obtained by the GPS according to this example embodiment.

In this example embodiment, site information 208 included in the QR Code® 207 includes a server access key and place information. The site information 208 included in the QR Code® 207 also includes, as the place information of the site, a place name, a place ID, the longitude of the center of the site, the latitude of the center of the site, and a radius from the center of the site.

FIG. 2C shows an authentication relationship 209 between the site information and the position information of the communication terminal 220. Whether the position information acquired by the GPS indicates the site information is determined in accordance with whether the position information falls within a site range of a circle, indicated by a broken line, with a radius having the center at the latitude and longitude. If the position information falls within the site range, the position information is authenticated.

Note that the site information 208 is not limited to that shown in FIG. 2C. For example, a site range may be set by a rectangle, or a correct site range may be set by information of more inflection points. However, a limitation is imposed in accordance with processing of notifying the communication terminal 220 of the site information.

(Overview of Operation of Manager Terminal)

Figure 2D:
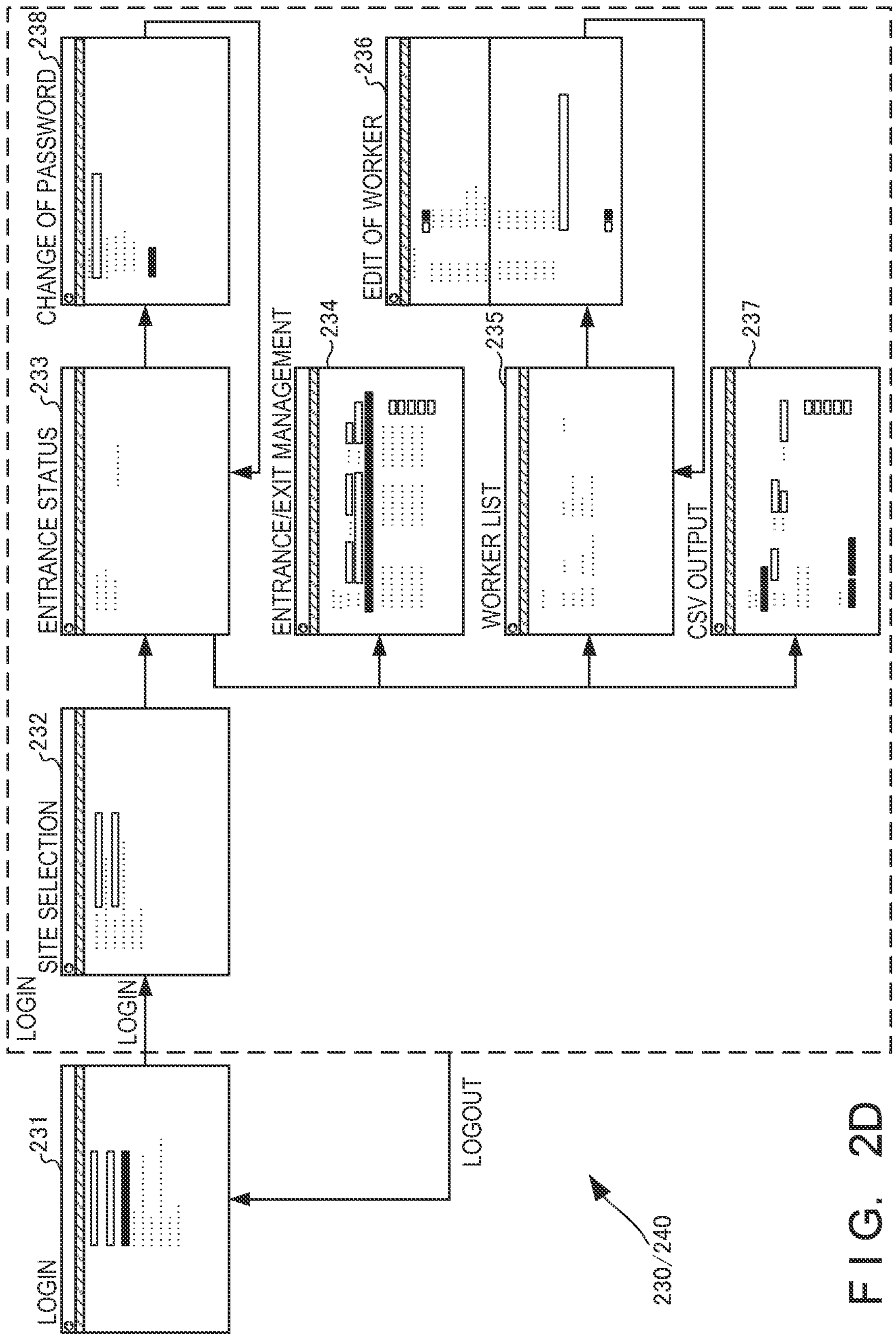
FIG. 2D is a view showing an overview of the operation of a manager terminal that communicates with the information processing apparatus according to the second example embodiment of the present invention.

FIG. 2D is a view showing an overview of the operation of the manager terminal 230/240 that communicates with the information processing apparatus 210 according to this example embodiment. Note that FIG. 2D shows screen transition in browsing or report creation in the manager terminal 230/240.

A screen 231 is a login screen to the entrance and exit management application according to this example embodiment. If the user logs in, the screen transitions to a site selection screen of a screen 232. If a specific site is selected on the screen 232, the screen transitions to each browsing screen or a report screen (to be described below) at the target site.

A screen 233 is a screen showing the entrance statuses of workers at the current target site. A screen 234 is a screen that displays a list of the statuses of the workers at the target site created from entrance registration of the workers. A screen 235 is a screen that displays a list of attributes such as the statuses and qualifications of the workers. In the screen 235, if each worker is instructed, detailed information of the worker is displayed as a screen 236, and modification, change, deletion, or addition of worker information is possible. A screen 237 is a screen that outputs, to another system, CSV data used in browsing or obtained by report creation. A screen 238 is a screen for changing a password or the like, to which the screen transitions from the screen 233.

(System Arrangement)

Figure 3:
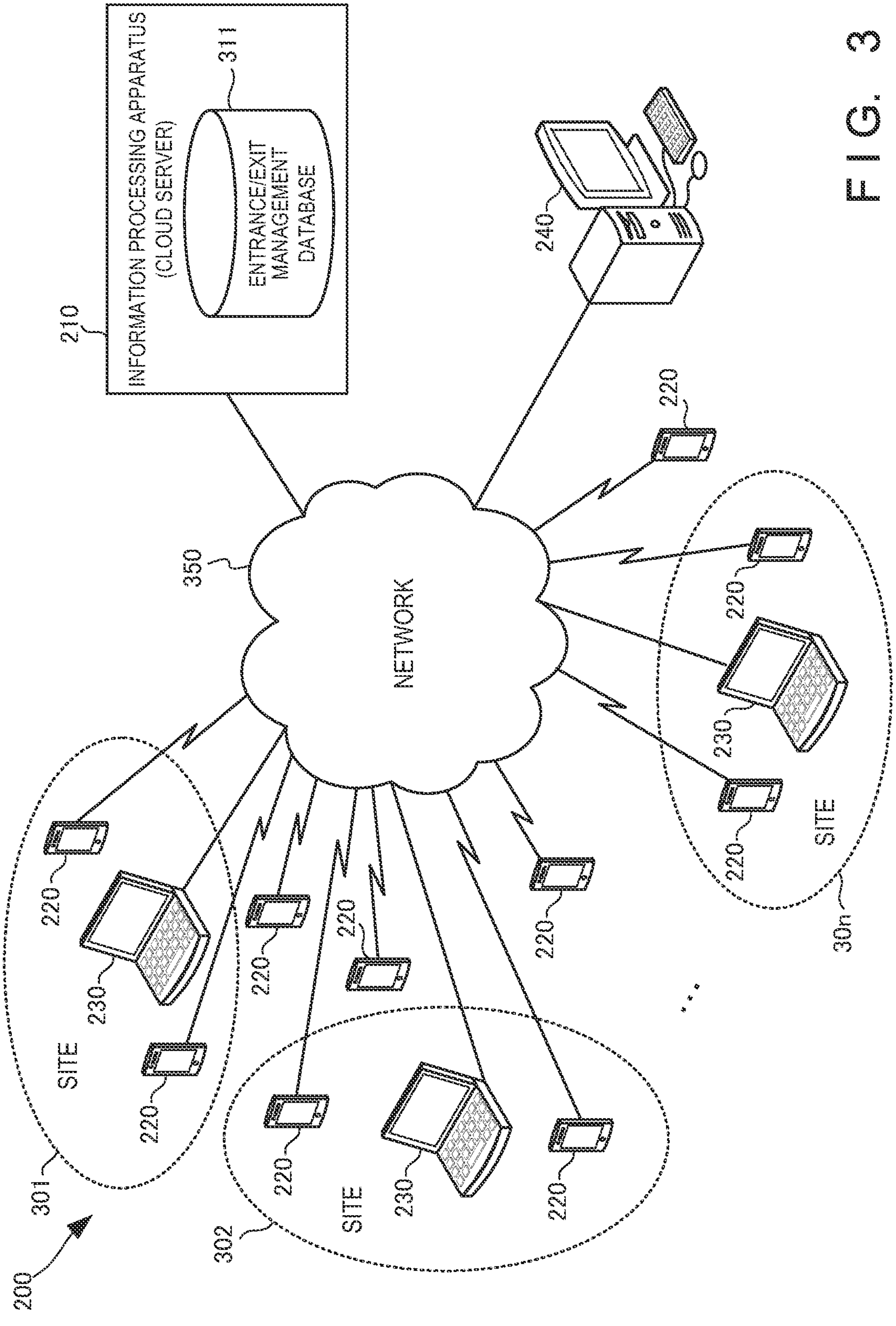
FIG. 3 is a block diagram showing the arrangement of the entrance and exit management system including the information processing apparatus according to the second example embodiment of the present invention.

FIG. 3 is a block diagram showing the arrangement of the entrance and exit management system 200 including the information processing apparatus 210 according to this example embodiment.

The entrance and exit management system 200 includes the information processing apparatus 210, the manager terminals 230 arranged at sites 301 to 30*n*, the communication terminals 220 carried by the workers, and the prime contractor manager terminal 240 for managing the overall work, all of which are connected via a network 350.

The information processing apparatus 210 includes an entrance and exit management database 311 to manage entrance and exit of each worker carrying the communication terminal 220 by registering the entrance time or exit time of the worker into or from a corresponding one of the sites 301 to 30*n*. The manager terminals 230 are used by site managers to manage work at the sites 301 to 30*n*, respectively. The manager terminals 230 are also used to browse the work statuses and entrance or exit statuses of the sites 301 to 30*n* and create work reports of the sites 301 to 30*n*, respectively. The prime contractor manager terminal 240 totally manages the sites 301 to 30*n*, and is also used to browse the work statuses and entrance or exit statuses of all the sites 301 to 30*n* and create a work report of all the sites 301 to 30*n*.

(Operation Sequence)

Figure 4A:
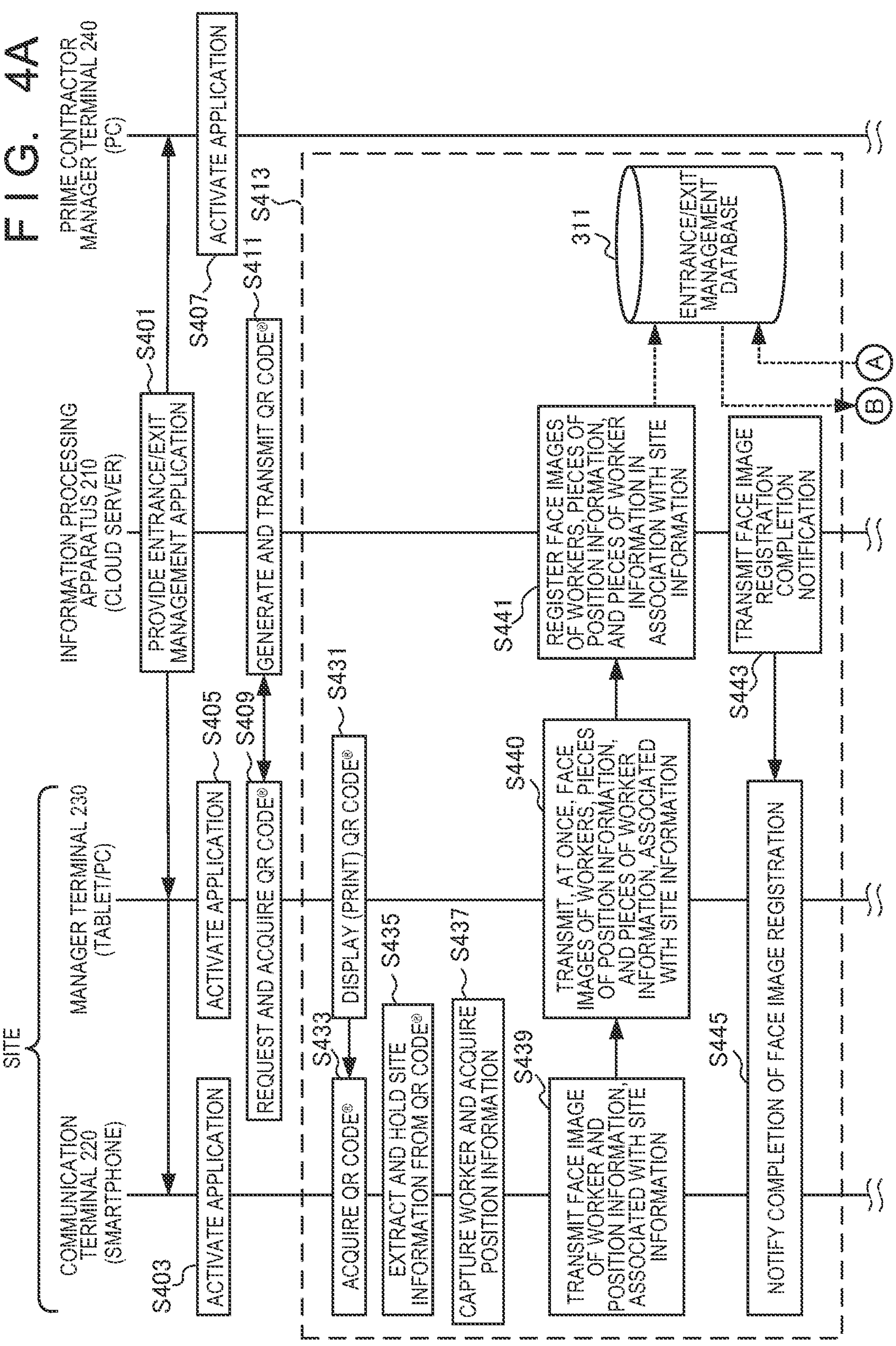
FIG. 4A is a sequence chart showing the registration procedure of the entrance and exit management system including the information processing apparatus according to the second example embodiment of the present invention.

FIG. 4A is a sequence chart showing the registration procedure of the entrance and exit management system 200 including the information processing apparatus 210 according to this example embodiment.

In step S401, the information processing apparatus 210 provides an appropriate entrance and exit management application in response to an entrance and exit management application download request from each of the communication terminal 220, the manager terminal 230, and the prime contractor manager terminal 240. In steps S403, S405, and S407, the communication terminal 220, the manager terminal 230, and the prime contractor manager terminal 240 activate the entrance and exit management applications, respectively.

In step S409, the manager terminal 230 at each site requests and acquires a QR Code® as a place specifying code which is obtained by encoding site information and is to be used to register a face image of a worker who participates at the time of new entering person training. In step S411, in response to the QR Code® request, the information processing apparatus 210 issues a QR Code® by acquiring corresponding site information, generating a QR Code®, and transmitting it.

In step S413, face image registration processing according to this example embodiment is performed. The face image registration processing is normally, desirably performed at the time of the new entering person training. In step S431, the manager terminal 230 displays the QR Code® on the display screen or prints the QR Code®. In step S433, each communication terminal 220 reads the displayed or printed QR Code®. In step S435, each communication terminal 220 extracts the site information by analyzing the acquired QR Code® using the entrance and exit management application, and holds the site information in the entrance and exit management application.

If the site information is acquired from the QR Code®, in step S437 the communication terminal 220 captures the worker and acquires the position information of the communication terminal 220 by the GPS (Global Positioning System) or the like. In step S439, each communication terminal 220 transmits, to the manager terminal 230, the face image of the worker and the position information, both of which are associated with the site information.

The manager terminal 230 collects the face images of the workers who have participated in the new entering person training, and performs, in step S440, batch transmission of the face images of the workers, the pieces of position information, and the pieces of worker information, all of which are associated with the site information, to the information processing apparatus 210. In step S441, the information processing apparatus 210 stores, in the entrance and exit management database 311, in association with the site information, the face images of the workers, the pieces of position information, and the pieces of worker information, all of which have been received from the manager terminal 230. In step S443, the information processing apparatus 210 notifies the manager terminal 230 and each communication terminal 220 that registration of the face images is complete. In step S445, the manager terminal 230 and each communication terminal 220 notify the site manager and each of the workers that registration of the face images is complete, respectively. Note that in this example, the position information is registered. However, the position information is used to record participation in the new entering person training, and is not essential to the worker registration processing.

Figure 4B:
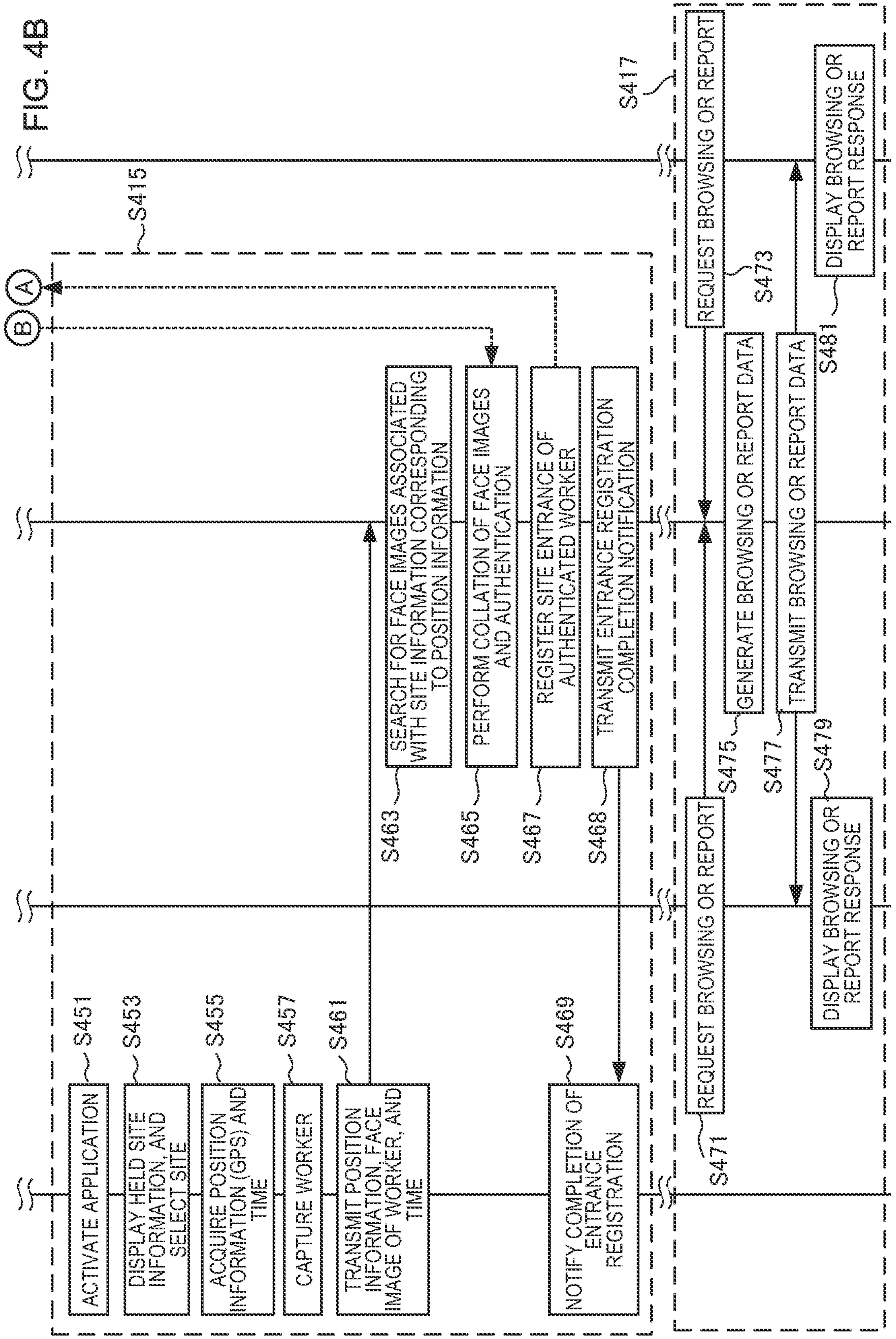
FIG. 4B is a sequence chart showing the entrance and exit management procedure of the entrance and exit management system including the information processing apparatus according to the second example embodiment of the present invention.

FIG. 4B is a sequence chart showing the entrance and exit management procedure of the entrance and exit management system 200 including the information processing apparatus 210 according to this example embodiment.

In step S415, entrance and exit registration processing according to this example embodiment is performed. The entrance and exit registration processing is performed at the time of entrance or exit of each worker at the site. Note that processing for entrance and that for exit are the same, and thus FIG. 4B shows only entrance registration. In step S451, each communication terminal 220 activates the entrance and exit management application. In step S453, the entrance and exit management application of each communication terminal 220 displays site information held in advance at the time of face image registration and, if the plurality of pieces of site information are held, prompts the user to select one of sites. In step S455, the entrance and exit management application of each communication terminal 220 acquires position information (GPS) and the current time. In step S457, the entrance and exit management application of each communication terminal 220 captures the worker. Then, in step S461, the entrance and exit management application of each communication terminal 220 transmits the acquired position information, the acquired face image of the worker, and the acquired time to the information processing apparatus 210.

In step S463, the information processing apparatus 210 searches a face image database for face images associated with the site information corresponding to the position information received from each communication terminal 220. In step S465, the information processing apparatus 210 collates the face information received from each communication terminal 220 with the face image found from the face image database, thereby performing authentication. If authentication succeeds, the information processing apparatus 210 registers, in step S467, site entrance of the authenticated worker in the entrance and exit management database 311 using a place and entrance time. In step S468, the information processing apparatus 210 transmits an entrance registration completion notification to the communication terminal 220 as an entrance applying source. In step S469, the communication terminal 220 as the entrance applying source notifies each of the workers a completion of the received entrance registration. Note that if the entrance and exit management application of the communication terminal 220 has a function of converting the position information into the site information, the converted site information may be transmitted instead of the position information to perform entrance and exit registration.

In step S417, browsing processing or report creation processing according to this example embodiment is performed. The browsing processing or the report creation processing is performed, as needed, in response to a request from each manager terminal 230 or the prime contractor manager terminal 240. Note that the browsing processing and the report creation processing are the same except that templates for deciding forms are different from each other. Thus, these processes will be described together with reference to FIG. 4B. In step S471 or S473, each manager terminal 230 or the prime contractor manager terminal 240 requests a browsing screen or report creation of the information processing apparatus 210. In step S475, the information processing apparatus 210 generates a browsing screen or a report using a template prepared in accordance with the request. In step S477, the information processing apparatus 210 transmits the generated browsing screen or report to the request source as provision of information to each manager terminal 230 or the prime contractor manager terminal 240. In step S479 or S481, each manager terminal 230 or the prime contractor manager terminal 240 outputs (displays or prints) the received browsing screen or report.

<<Functional Arrangement of Information Processing Apparatus>>

Figure 5:
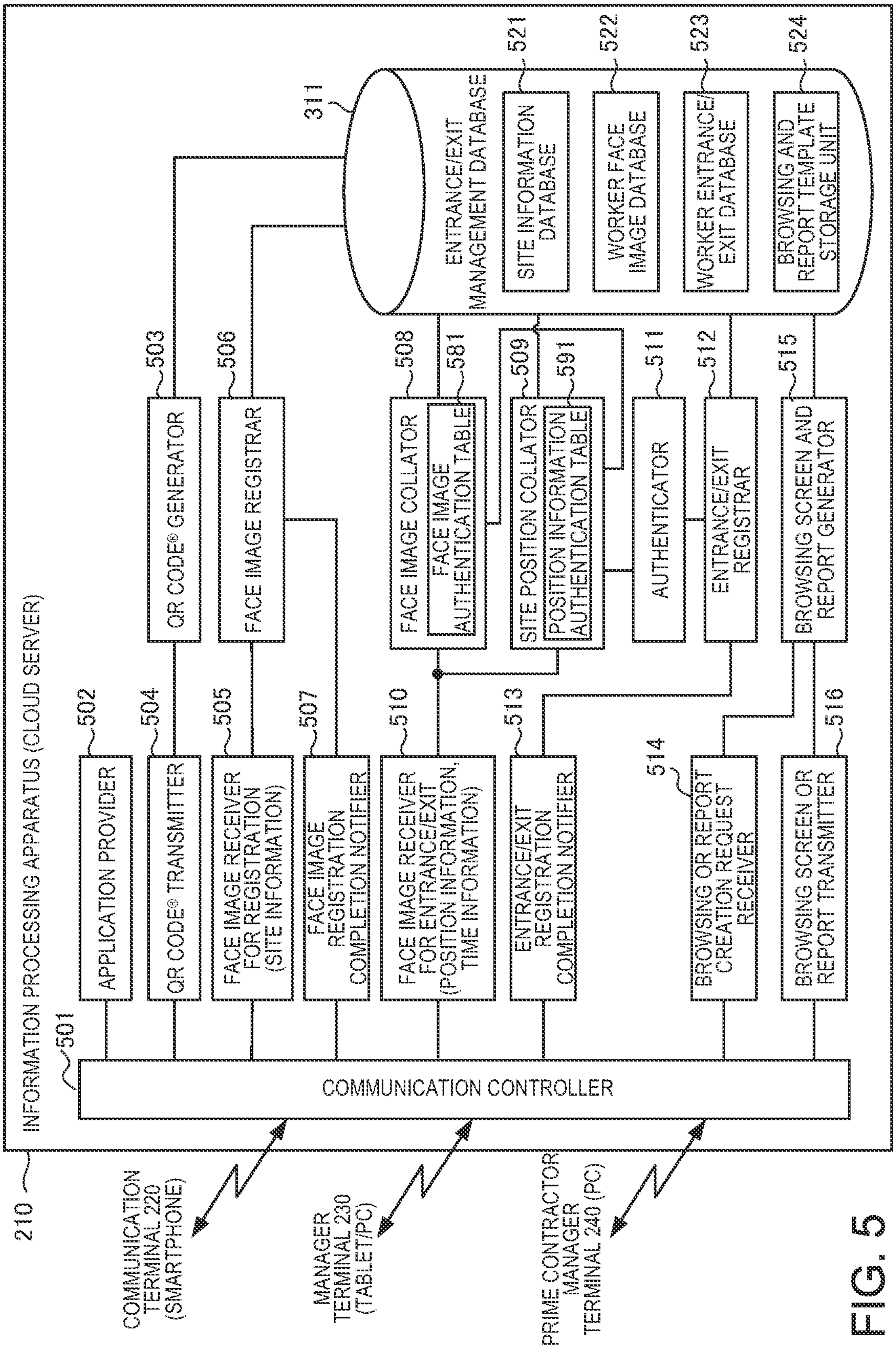
FIG. 5 is a block diagram showing the functional arrangement of the information processing apparatus according to the second example embodiment of the present invention.

FIG. 5 is a block diagram showing the functional arrangement of the information processing apparatus 210 according to this example embodiment.

The information processing apparatus 210 includes a communication controller 501, an application provider 502, a QR Code® generator 503, a QR Code® transmitter 504, a face image receiver for registration 505, a face image register 506, and a face image registration completion notifier 507. The information processing apparatus 210 also includes a face image collator 508, a site position collator 509, a face image receiver for entrance/exit 510, an authenticator 511, an entrance/exit register 512, and an entrance/exit registration completion notifier 513. Furthermore, the information processing apparatus 210 includes a browsing or report creation request receiver 514, a browsing screen/report generator 515, a browsing image and report transmitter 516, and the entrance/exit management database 311.

The communication controller 501 controls communication between the information processing apparatus 210 and each of the communication terminals 220, the manager terminals 230, and the prime contractor manager terminal 240 via the network 350. The application provider 502 provides a corresponding entrance and exit management application in response to a download request from each of the communication terminals 220, the manager terminals 230, and the prime contractor manager terminal 240.

The QR Code® generator 503 generates a QR Code® from the site information of each site acquired from a site information database 521 included in the entrance/exit management database 311. The QR Code® transmitter 504 serves as a QR Code® issuer to transmit the generated QR Code® to the manager terminal 230 of each site corresponding to the site information. The face image receiver for registration 505 receives a face image for registration from the communication terminal 220 carried by each worker together with the position information and the site information acquired from the QR Code®. The face image register 506 registers the received registration face image and position information in association with the received site information in a worker face image database 522 included in the entrance/exit management database 311. The received position information is also stored as a new entering person training taking in association with the worker in a worker entrance/exit database 523. The face image registration completion notifier 507 notifies the manager terminal 230 or the communication terminal 220 as a registration request source of completion of registration of the registration face image in the worker face image database 522.

The face image receiver for entrance/exit 510 receives a face image for entering or exiting from the communication terminal 220 together with the position information of the communication terminal 220 and the current time information. The face image collator 508 includes a face image authentication table 581, and collates the face image captured by the communication terminal 220 at the time of entrance or exit and received with the face image registered in advance in the worker face image database 522. Note that as the image face registered in the worker face image database 522 and to be collated, a face image (a registered face image at the same site) registered in association with the site information corresponding to the position information from the communication terminal 220 is desirably found and collated. The site position collator 509 optionally collates whether the received position information is included in one of the pieces of site information registered in the site information database 521. That is, if the received position information is not included in any of the pieces of site information registered in the site information database 521, it is determined that the worker carrying the communication terminal 220 is not at the appropriate site, and entrance/exit is not authenticated. The authenticator 511 authenticates an entrance and exit applications from the communication terminal 220 based on the collation result of the face image collator 508 and the collation result of the site/position collator 509. If the authenticator 511 outputs authentication success, the entrance/exit registrar 512 registers, in the worker entrance/exit database 523, as entrance/exit registration information, the time information and the position information indicating where the worker stays in association with the worker. The entrance/exit registration completion notifier 513 notifies the communication terminal 220 as an entrance/exit applying source of completion of registration of the entrance/exit registration information in the worker entrance/exit database 523.

The browsing or report creation request receiver 514 receives a browsing request or a report creation request from each manager terminal 230 and the prime contractor manager terminal 240. The browsing screen and report generator 515 serves as a browsing screen/report creator to acquire a template corresponding to the browsing request or the report creation request from a browsing/report template storage unit 524 included in the entrance/exit management database 311, and generates a browsing screen or a report. The browsing image/report transmitter 516 serves as an information provider to transmit the generated browsing screen or report to the manager terminal 230 or the prime contractor manager terminal 240 as a request source.

The entrance/exit management database 311 includes the site information database 521, the worker face image database 522, the worker entrance/exit database 523, and the browsing and report template storage unit 524. In the site information database 521, the site information of the site during work is registered. In the worker face image database 522, the face image of each worker is registered in association with each piece of site information. In the worker entrance/exit database 523, time information and position information indicating where each worker stays are registered as entrance/exit registration information in association with each worker. In the browsing and report template storage unit 524, a browsing template and a report template are stored in association with the browsing request and the report creation request, respectively.

(Site Information Database)

FIG. 6A is a table showing the structure of the site information database 521 according to this example embodiment. The site information database 521 stores site information for generating a QR Code® as a place specifying code. Note that the structure of the site information database 521 is not limited to that shown in FIG. 6A.

The site information database 521 stores at least one contract company 613, a work period 614, place information 615, and position information 616 in association with a site ID 611 and a site name 612. The work period 614 includes a start date and end date. The place information 615 indicates, for example, a site region represented by the longitude/latitude of a central position and a radius, and the position information 616 indicates, for example, the longitude/latitude of the central position.

(Worker Face Image Database)

FIG. 6B is a table showing the structure of the worker face image database 522 according to this example embodiment. The worker face image database 522 stores the face image of each worker registered in association with each piece of site information. Note that the structure of the worker face image database 522 is not limited to that shown in FIG. 6B.

The worker face image database 522 stores, in association with site information 621, a plurality of pieces of worker information 622 registered at the site and face images 623 of the registered workers. The site information 621 includes a site name and a position. Each piece of worker information 622 includes a worker name, a qualification, a license, and an attribute. Note that the attribute includes a blood type in preparation for an accident in consideration of safety in correspondence with the work. The face image 623 of each worker includes image data and feature data advantageous in collation.

(Worker Entrance and Exit Database)

FIG. 6C is a table showing the structure of the worker entrance/exit database 523 according to this example embodiment. The worker entrance/exit database 523 stores entrance/exit information registered in association with each worker. Note that the structure of the worker entrance/exit database 523 is not limited to that shown in FIG. 6C.

The worker entrance/exit database 523 stores a worker entrance/exit history 633 in association with a worker ID 631 and worker information 632. The worker entrance/exit history 633 includes an entrance/exit date and time, site information of entrance/exit, entrance/exit time, and work contents.

(Browsing and Report Template Storage Unit)

FIG. 6D is a table showing the structure of the browsing/report template storage unit 524 according to this example embodiment. The browsing/report template storage unit 524 stores a browsing template and a report template in correspondence with a browsing request of stored information of the entrance/exit management database 311, especially, a browsing request of the entrance/exit information of each worker registered in the worker entrance/exit database 523, and a report creation request based on the information. Note that the structure of the browsing/report template storage unit 524 is not limited to that shown in FIG. 6D.

The browsing and report template storage unit 524 stores a plurality of browsing or report request sources 642 in association with a browsing or report screen ID 641. Furthermore, the browsing and report template storage unit 524 stores a plurality of browsing or report contents 643 in association with each browsing or report request source 642. The browsing/report template storage unit 524 stores a browsing or report template 644 in association with the browsing or report contents 643.

(Face Image Authentication Table)

FIG. 7A is a table showing the structure of the face image authentication table 581 according to this example embodiment. The face image authentication table 581 is used to generate a face image authentication result by causing the face image collator 508 to collate the face image of the worker received from the communication terminal 220 at the time of entrance into or exit from the site with the face image of the worker registered in advance in association with the site information.

The face image authentication table 581 stores an entrance/exit face image 711, a registered face image 712, a degree 713 of matching obtained by collation of the face images, a threshold 714 of the degree of matching used to determine whether authentication succeeds or fails, and an authentication result 715.

(Position Information Authentication Table)

FIG. 7B is a table showing with structure of a position information authentication table 591 according to this example embodiment. The position information authentication table 591 is used to generate a position information authentication result by determining, using the site/position collator 509, whether the position information received from the communication terminal 220 at the time of entrance into or exit from the site is included in the site information of entrance/exit.

The position information authentication table 591 stores entrance/exit position information 721 acquired by the communication terminal 220 using the GPS or the like, site information 722 including the position information of the site, determination 723 of whether the entrance/exit position information 721 is included in the site information 722, and a position information authentication result 724.

<<Hardware Arrangement of Information Processing Apparatus>>

Figure 8:
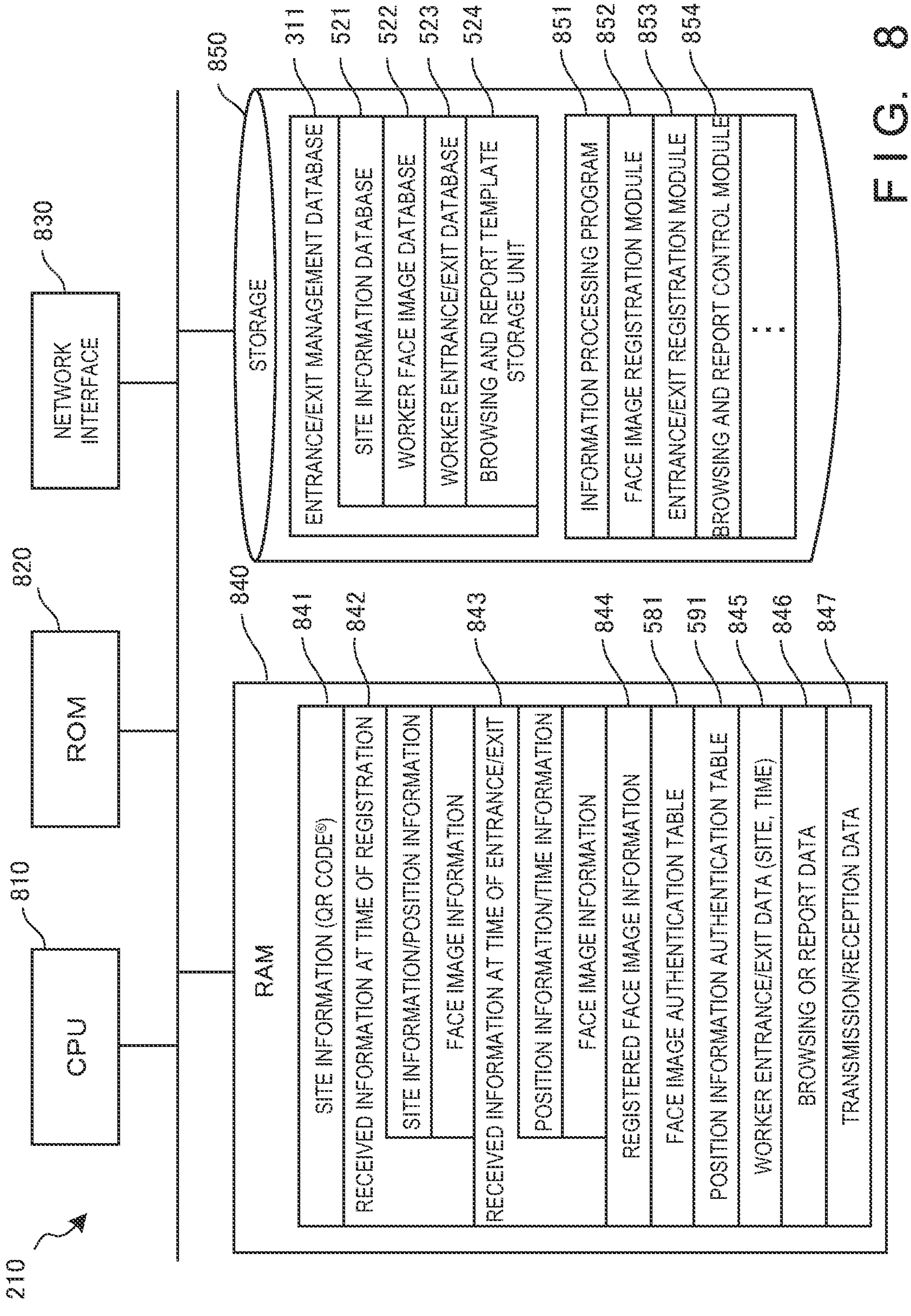
FIG. 8 is a block diagram showing the hardware arrangement of the information processing apparatus according to the second example embodiment of the present invention.

FIG. 8 is a block diagram showing the hardware arrangement of the information processing apparatus 210 according to this example embodiment.

In FIG. 8, a CPU (Central Processing Unit) 810 is an arithmetic control processor, and implements the functional components shown in FIG. 5 by executing a program. One CPU 810 or a plurality of CPUs 810 may be included. A ROM (Read Only Memory) 820 stores permanent data such as initial data and a program, and programs. A network interface 830 controls communication with each of the communication terminals 220, the manager terminals 230, and the prime contractor manager terminal 240 via a network.

A RAM (Random Access Memory) 840 is a random access memory used as a temporary storage work area by the CPU 810. An area to store data necessary for implementation of this example embodiment is allocated to the RAM 840. Site information 841 represented by a QR Code® is a QR Code® as a place specifying code distributed to each site. Received information 842 at the time of registration is received information when each worker registers a face image from the communication terminal, and includes site information, position information, and face image information. Received information 843 at the time of entrance/exit is received information when each worker registers entrance/exit from the communication terminal, and includes position information, time information, and face image information. Registered face image information 844 indicates a face image registered in advance in the worker face image database 522 and used to perform authentication with a face image received when entrance/exit is registered. The face image authentication table 581 is the table shown in FIG. 7A and used for face image authentication. The position information authentication table 591 is the table shown in FIG. 7B and used for position information authentication. Worker entrance/exit data (site, time) 845 is data registered in the worker entrance/exit database 523 when an entrance/exit application is authenticated. Browsing/report data 846 is data of a browsing screen or report generated in response to a browsing request or a report creation request. Transmission/reception data 847 is data transmitted/received to/from the communication terminals 220, the manager terminals 230, and the prime contractor manager terminal 240 via the network interface 830.

A storage 850 stores a database, various parameters, or the following data or programs necessary for implementation of this example embodiment, to be used by the CPU 810. The entrance/exit management database 311 includes the site information database 521, worker face image database 522, worker entrance/exit database 523, and browsing and report template storage unit 524 respectively shown in FIGS. 6A to 6D, and stores data for entrance and exit management.

The storage 850 stores the following programs. An information processing program 851 is a program for controlling the overall information processing apparatus 210. A face image registration module 852 is a module that registers a face image in linkage with a site by a worker. An entrance/exit registration module 853 is a module that registers entrance/exit of a worker by face image authentication and position confirmation at the time of entrance into or exit from a site. A browsing and report control module 854 is a module that creates a browsing screen or a report and provides it in response to a browsing request or a report creation request.

Note that programs and data which are associated with the general-purpose functions of the information processing apparatus 210 serving as a cloud server and other feasible functions are not shown in the RAM 840 or the storage 850 of FIG. 8.

<<Processing Procedure of Information Processing Apparatus>>

Figure 9:
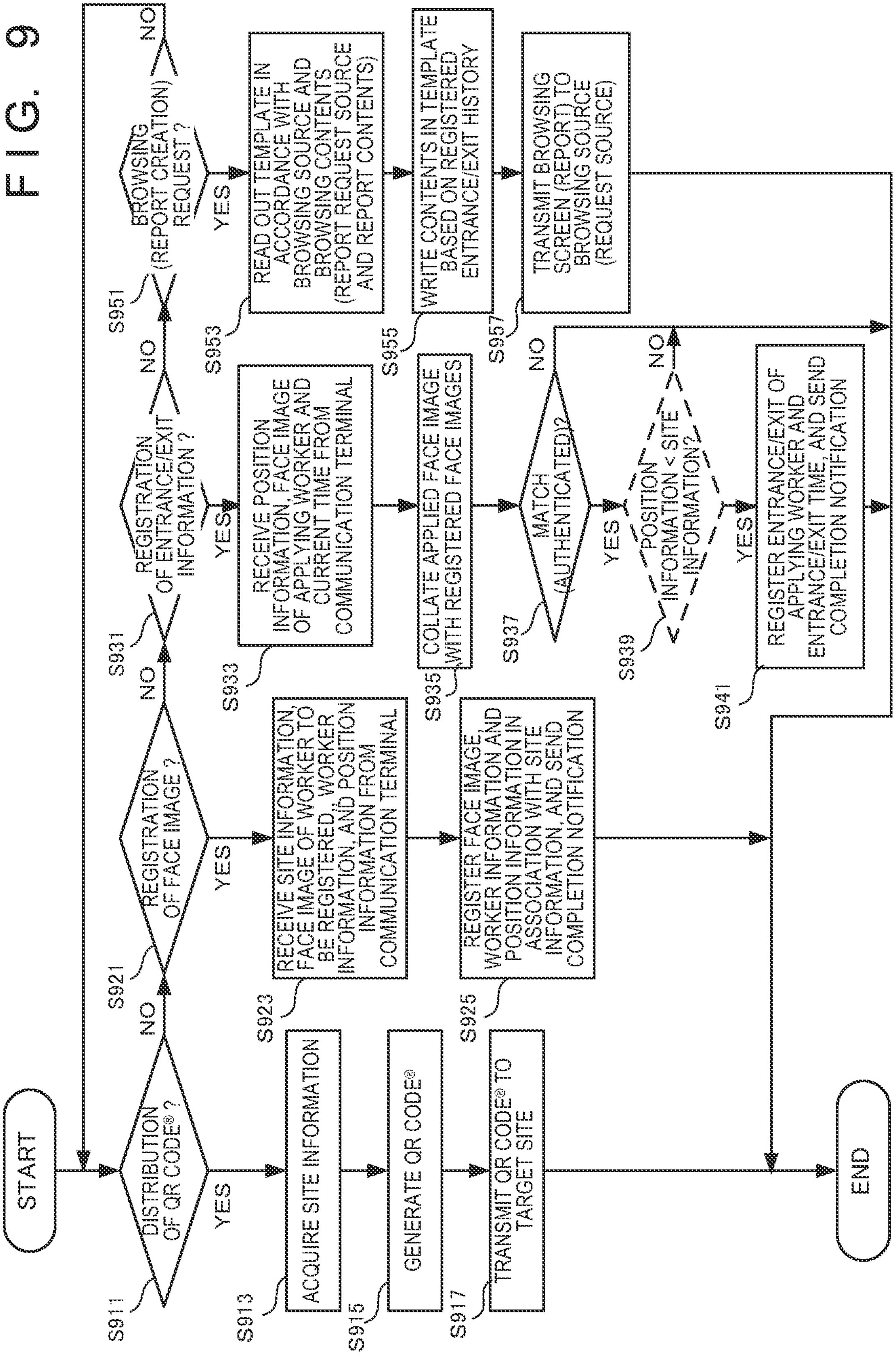
FIG. 9 is a flowchart illustrating the processing procedure of the information processing apparatus according to the second example embodiment of the present invention.

FIG. 9 is a flowchart illustrating the processing procedure of the information processing apparatus 210 according to this example embodiment. This flowchart is executed by the CPU 810 shown in FIG. 8 using the RAM 840, thereby implementing the functional components shown in FIG. 5.

In step S911, the information processing apparatus 210 determines whether to distribute a QR Code® generated from site information. If it is determined to distribute a QR Code®, the information processing apparatus 210 acquires, in step S913, site information from the site information database 521. In step S915, the information processing apparatus 210 generates a QR Code® based on the acquired site information. Then, the information processing apparatus 210 transmits the generated QR Code® to the manager terminal 230 at the target site.

If it is determined not to distribute a QR Code®, the information processing apparatus 210 determines in step S921 whether to register a face image. If it is determined to register a face image, the information processing apparatus 210 receives, in step S923, site information, a face image of a worker to be registered, worker information, and position information from the communication terminal. In step S925, the information processing apparatus 210 registers the face image, worker information, and position information in the worker face image database 522 in association with the site information, and send a notification of a registration completion.

If it is determined not to distribute a QR Code® or register a face image, the information processing apparatus 210 determines in step S931 whether to register entrance/exit information. If it is determined to register entrance/exit information, the information processing apparatus 210 receives, in step S933, position information, a face image of an applying worker, and current time from the communication terminal. In step S935, the information processing apparatus 210 collates the registered face image with an applied face image. In step S937, the information processing apparatus 210 determines whether face authentication succeeds. If it is determined that face authentication fails, the process ends without registering entrance/exit information. If it is determined that face authentication succeeds, the information processing apparatus 210 optionally determines in step S939 whether the position information is included in the site information. If it is determined that the position information is not included in the site information, the process ends without registering entrance/exit information; otherwise, the information processing apparatus 210 registers, in step S941, the entrance/exit place of the applying worker and time in the worker entrance/exit database 523, and send a notification of a registration completion.

If it is determined not to distribute a QR Code®, register a face image, or register entrance/exit information, the information processing apparatus 210 determines in step S951 whether a browsing or report creation request is issued. If it is determined that a browsing or report creation request is issued, the information processing apparatus 210 reads out, in step S953, a browsing template or a report template from the browsing/report template storage unit 524 in accordance with a browsing source and browsing contents (a report request source and report contents). In step S955, the information processing apparatus 210 writes in the browsing template or the report template based on the registered entrance/exist history. In step S957, the information processing apparatus 210 transmits the browsing screen (report) to the browsing source (request source).

<<Functional Arrangement of Communication Terminal>>

Figure 10:
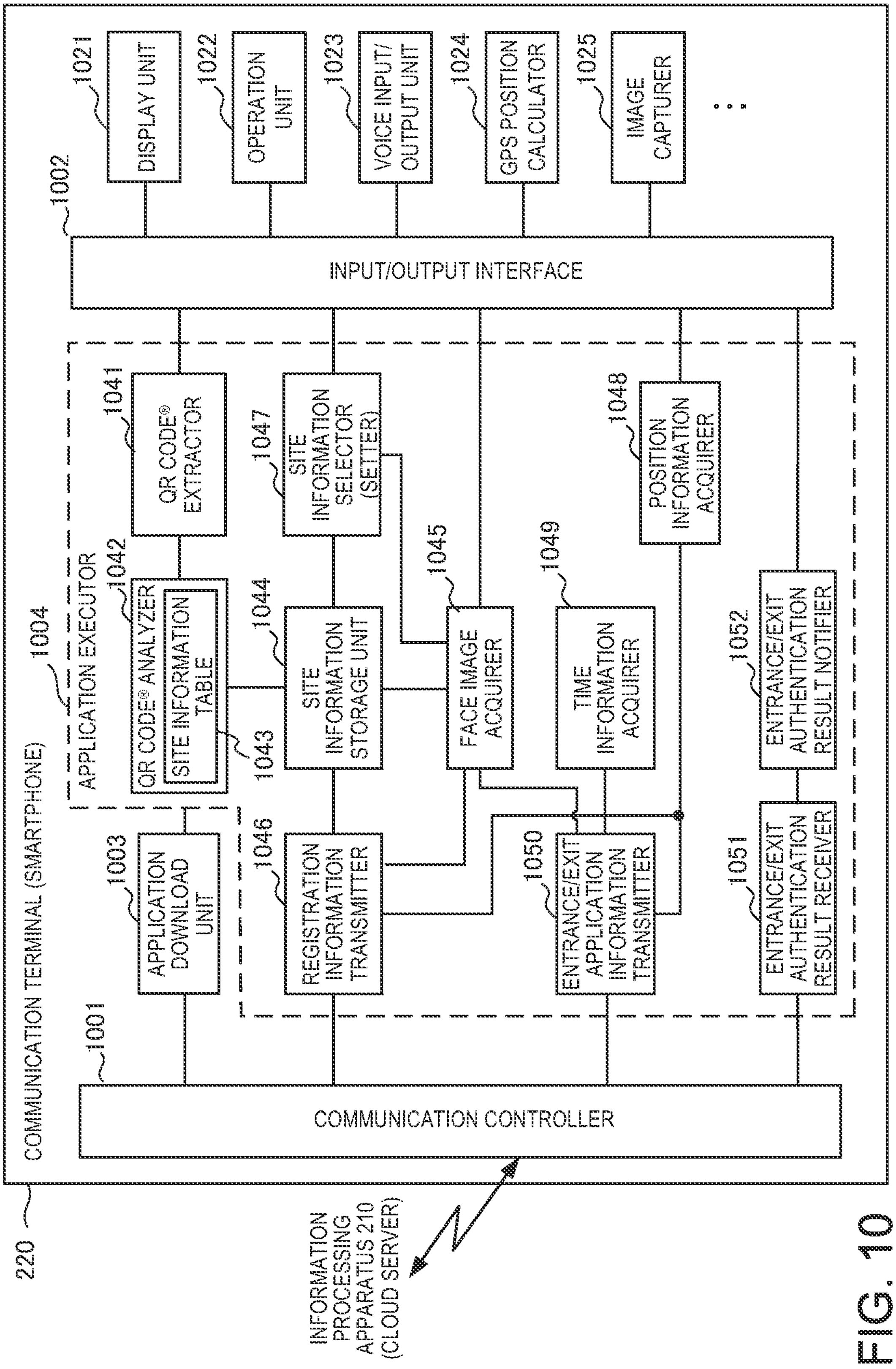
FIG. 10 is a block diagram showing the functional arrangement of the communication terminal according to the second example embodiment of the present invention.

FIG. 10 is a block diagram showing the functional arrangement of the communication terminal 220 according to this example embodiment.

The communication terminal 220 includes a communication controller 1001, an input/output interface 1002, an application download unit 1003, and an application executor 1004. The communication controller 1001 controls communication with the information processing apparatus 210 via the network 350. The input/output interface 1002 interfaces with input/output devices. In this example embodiment, a display unit 1021, an operation unit 1022, a voice input/output unit 1023, a GPS position calculator 1024, and an image capturer 1025 are connected as input/output devices to the input/output interface 1002. Note that the display unit 1021 and the operation unit 1022 may be implemented by a touch panel. The application download unit 1003 downloads the entrance and exit management application for the communication terminal from the information processing apparatus 210.

The application executor 1004 includes a QR Code® extractor 1041, a QR Code® analyzer 1042, a site information storage unit 1044, a face image acquirer 1045, and a registration information transmitter 1046. The application executor 1004 also includes a site information selector (setter) 1047, a position information acquirer 1048, a time information acquirer 1049, an entrance/exit application information transmitter 1050, an entrance/exit authentication result receiver 1051, and an entrance/exit authentication result notifier 1052.

The QR Code® extractor 1041 serves as a place specifying code acquirer to extract a QR Code® from an image captured by the image capturer 1025. The QR Code® analyzer 1042 includes a site information table 1043 for converting a QR Code® into site information, and reconstructs site information by analyzing the extracted QR Code®. The site information storage unit 1044 serves as a site place holder to store the reconstructed site information and hold it for an entrance/exit registration application. If site information obtained from a QR Code® is newly held in the site information storage unit 1044, the face image acquirer 1045 serves as an operation controller to acquire a face image from the image captured by the image capturer 1025 and transmit it to the registration information transmitter 1046. The registration information transmitter 1046 transmits registration information to the information processing apparatus 210 to register the face image in correspondence with the site information. Note that the registration information includes the site information reconstructed from the QR Code®, the face image of the worker to be registered, and the position information of the communication terminal 220.

If pieces of site information held in the site information storage unit 1044 are displayed at the time of entrance/exit registration, the site information selector (setter) 1047 selects and sets one of them. If the site information is set by the site information selector (setter) 1047, the face image acquirer 1045 acquires a face image from the image captured by the image capturer 1025, and transmits it to the entrance/exit application information transmitter 1050. The position information acquirer 1048 acquires the position information of the communication terminal 220 calculated by the GPS position calculator 1024. The time information acquirer 1049 acquires current time from a timer (not shown). The entrance/exit application information transmitter 1050 transmits, to the information processing apparatus 210, application information for applying registration of entrance/exit. Note that the application information includes the time information, the face image of the worker to be authenticated, and the position information of the communication terminal 220.

The entrance/exit authentication result receiver 1051 serves as an authentication result acquirer to receive the authentication result of the entrance/exit application information in the information processing apparatus 210. The entrance/exit authentication result notifier 1052 makes a notification of the authentication result of the received entrance/exit application information from the output unit of the display unit 1021 or the voice input/output unit 1023. When an authentication error occurs, an alarm sound may be generated.

(Site Information Table)

Figure 11:
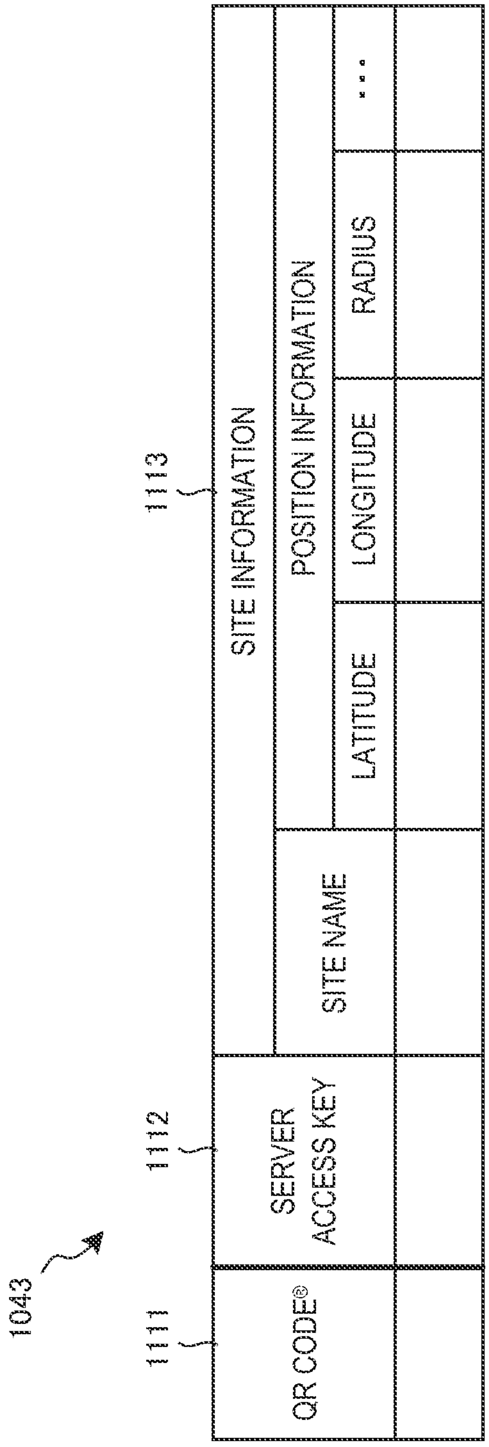
FIG. 11 is a table showing the structure of a site information table according to the second example embodiment of the present invention.

FIG. 11 is a table showing the structure of the site information table 1043 according to this example embodiment. The site information table 1043 is used by the QR Code® analyzer 1042 to acquire site information from a QR Code®.

The site information table 1043 stores a server access key 1112 and site information 1113 in association with a QR Code® 1111. Note that the site information 1113 includes a site name, and a latitude/longitude/radius as position information.

<<Hardware Arrangement of Communication Terminal>>

Figure 12:
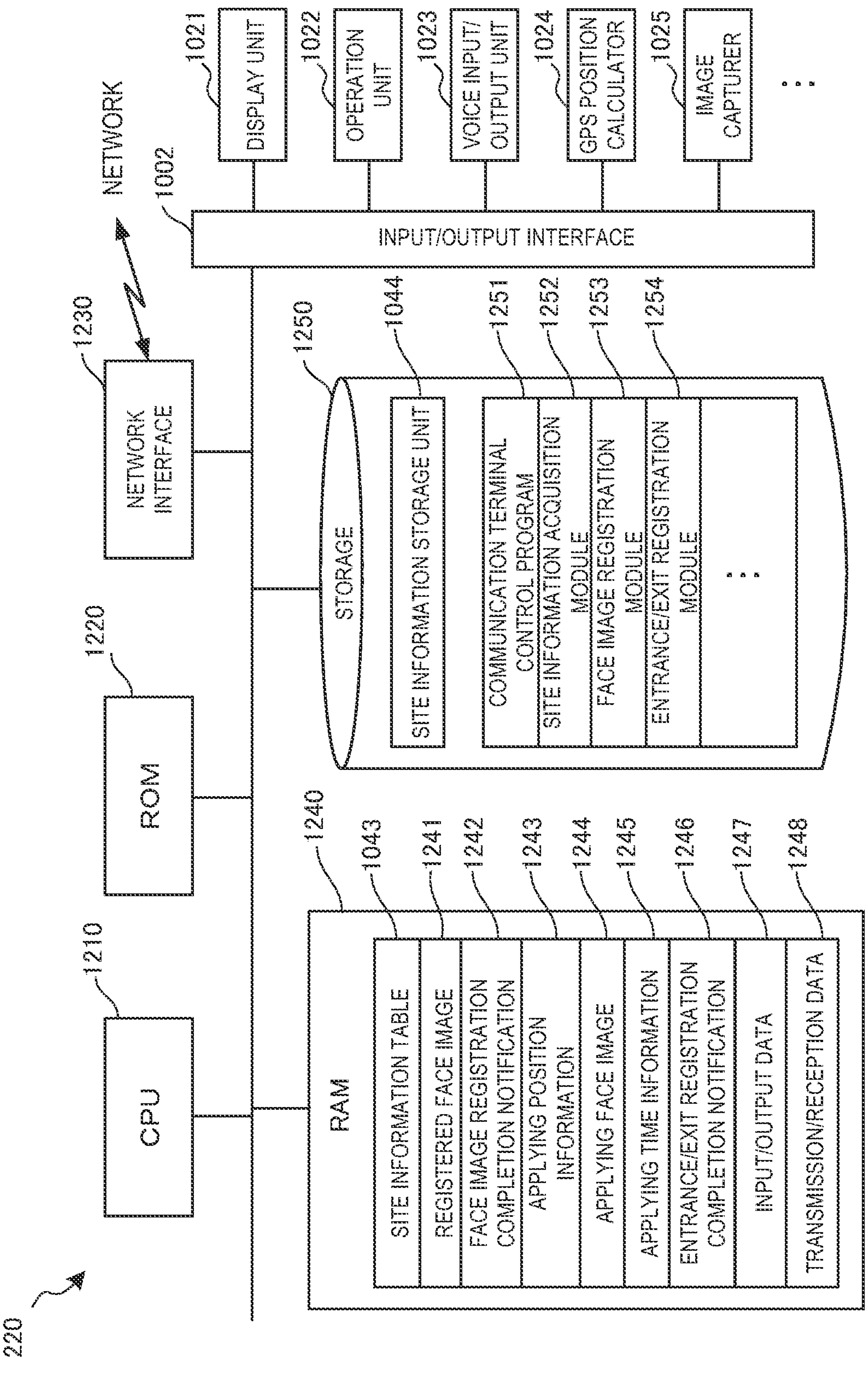
FIG. 12 is a block diagram showing the hardware arrangement of the communication terminal according to the second example embodiment of the present invention.

FIG. 12 is a block diagram showing the hardware arrangement of the communication terminal 220 according to this example embodiment.

In FIG. 12, a CPU 1210 is an arithmetic control processor, and implements the functional components shown in FIG. 10 by executing a program. One CPU 1210 or a plurality of CPUs 1210 may be included. A ROM 1220 stores permanent data such as initial data and a program, and programs. A network interface 1230 controls communication with each of the information processing apparatus 210 and the manager terminals 230 via a network.

A RAM 1240 is a random access memory used as a temporary storage work area by the CPU 1210. An area to store data necessary for implementation of this example embodiment is allocated to the RAM 1240. The site information table 1043 is a table shown in FIG. 11 and used to reconstruct site information from a read QR Code®. A registered face image 1241 is a face image captured by the image capturer 1025 at the time of registration of a face image. A face image registration completion notification 1242 is a notification that registration of a face image is complete in correspondence with the site information in the information processing apparatus 210. Applying position information 1243 indicates the position information of the communication terminal 220 transmitted to the information processing apparatus 210 at the time of the entrance/exit registration application. An applying face image 1244 is the face image of the applying worker transmitted to the information processing apparatus 210 at the time of the entrance/exit registration application. Applying time information 1245 indicates the current time transmitted to the information processing apparatus 210 at the time of the entrance/exit registration application. An entrance/exit registration completion notification 1246 is a notification that authentication of position confirmation and face authentication succeed and entrance/exit registration is complete in the information processing apparatus 210. Input/output data 1247 is data input/output to/from an input/output device via the input/output interface 1002. Transmission/reception data 1248 is data transmitted/received via the network interface 1230.

A storage 1250 stores a database, various parameters, or the following data or programs necessary for implementation of this example embodiment, to be used by the CPU 1210. The site information storage unit 1044 stores site information reconstructed from a QR Code® at the time of registration of a face image.

The storage 1250 stores the following programs. A communication terminal control program 1251 is a program that controls the overall communication terminal 220. A site information acquisition module 1252 is a module that reads a QR Code®, reconstructs site information, and stores it in the site information storage unit 1044. A face image registration module 1253 is a module that registers a face image in the information processing apparatus 210 in association with site information. An entrance/exit registration module 1254 is a module that performs entrance/exit registration by face authentication and position confirmation in the information processing apparatus 210 at the time of entrance/exit.

The input/output interface 1002 performs interface to control data input/output to/from the input/output device. In this example embodiment, the display unit 1021, the operation unit 1022, the voice input/output unit 1023, the GPS position calculator 1024, the image capturer 1025, and the like are connected to the input/output interface 1002.

Note that programs and data which are associated with the general-purpose functions of the communication terminal 220 and other feasible functions are not shown in the RAM 1240 or the storage 1250 of FIG. 12.

<<Processing Procedure of Communication Terminal>>

Figure 13:
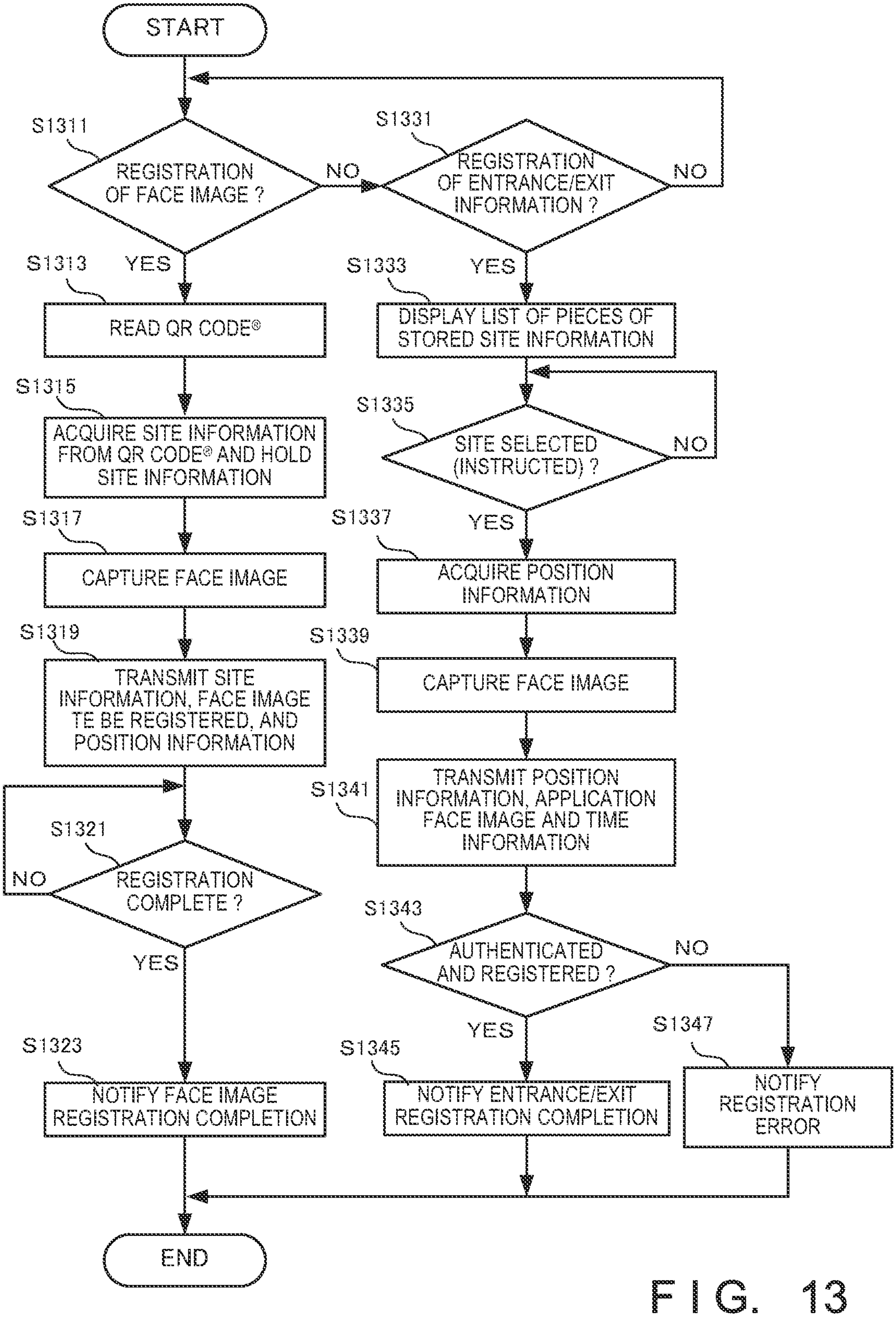
FIG. 13 is a flowchart illustrating the processing procedure of the communication terminal according to the second example embodiment of the present invention.

FIG. 13 is a flowchart illustrating the processing procedure of the communication terminal 220 according to this example embodiment. This flowchart is executed by the CPU 1210 shown in FIG. 12 using the RAM 1240, thereby implementing the functional components shown in FIG. 10.

In step S1311, the communication terminal 220 determines whether to register a face image of a worker. If it is determined to register the face image, the communication terminal 220 reads, in step S1313, a QR Code® by the image capturer 1025. In step S1315, the communication terminal 220 acquires site information from the read QR Code® and holds it. In step S1317, the communication terminal 220 captures a face image of a worker to be registered. In step S1319, the communication terminal 220 transmits, to the information processing apparatus 210, the face image to be registered and the position information of the communication terminal in association with the site information. In step S1321, the communication terminal 220 waits for a face image registration completion notification from the information processing apparatus 210. Upon receiving a face image registration completion notification, the communication terminal 220 notifies, in step S1323, that the face image registration of the registration request worker is complete to the worker.

If it is determined not to register the face image, the communication terminal 220 determines in step S1331 whether to register entrance/exit information of an applying worker. If it is determined to register the entrance/exit information, the communication terminal 220 displays, in step S1333, a list of the pieces of stored site information. If one piece of site information is stored, the site information is displayed. If a plurality of pieces of site information are stored, the communication terminal 220 waits, in step S1335, for selection of site information by the worker who applies entrance/exit registration. If the site information is selected by the worker, the communication terminal 220 acquires the position information of the communication terminal in step S1337. In step S1339, the communication terminal 220 captures a face image of the worker who applies entrance/exit registration. In step S1341, the communication terminal 220 transmits the position information, the applying face image for entrance/exit registration, and time information to the information processing apparatus 210. In step S1343, the communication terminal 220 waits for an entrance/exit registration completion notification from the information processing apparatus 210. If an entrance/exit registration completion notification is received, the communication terminal 220 notifies, in step S1345, the applying worker that entrance/exit registration is complete. If an authentication error is received, the communication terminal 220 notifies, in step S1347, the applying worker of a registration error.

<<Functional Arrangement of Manager Terminal>>

Figure 14:
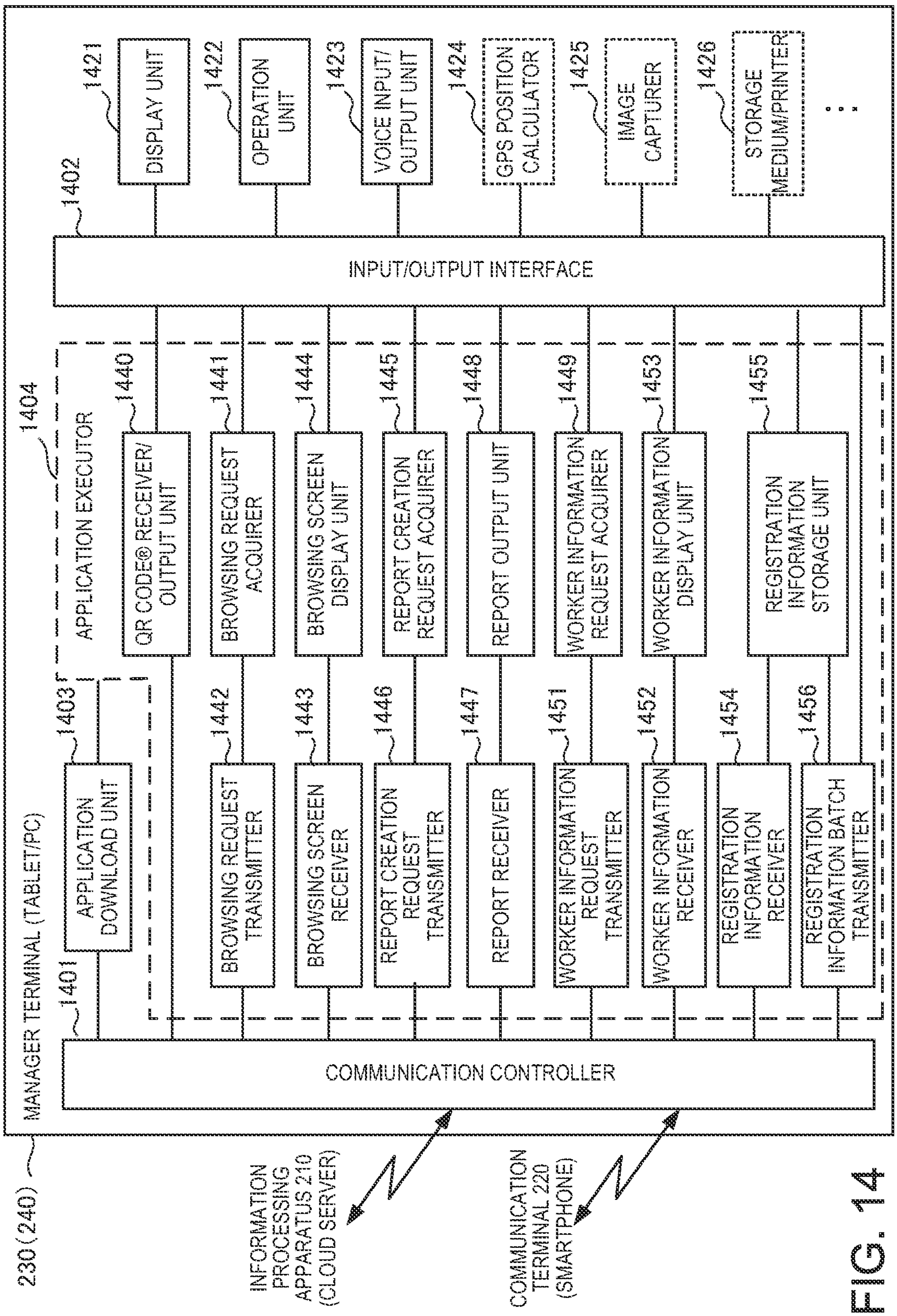
FIG. 14 is a block diagram showing the functional arrangement of the manager terminal according to the second example embodiment of the present invention.

FIG. 14 is a block diagram showing the functional arrangement of the manager terminal 230/240 according to this example embodiment.

The manager terminal 230/240 includes a communication controller 1401, an input/output interface 1402, an application download unit 1403, and an application executor 1404. The communication controller 1401 controls communication with each of the information processing apparatus 210 and the communication terminals 220 via the network 350. The input/output interface 1402 interfaces with input/output devices. In this example embodiment, a display unit 1421, an operation unit 1422, and a voice input/output unit 1423 are connected as input/output devices to the input/output interface 1402, and a GPS position calculator 1424, an image capturer 1425, and a storage medium/printer 1426 are optionally connected as input/output devices to the input/output interface 1402. The application download unit 1403 downloads the entrance and exit management application for the manager communication terminal from the information processing apparatus 210.

The application executor 1404 includes a QR Code® receiver/output unit 1440, a browsing request acquirer 1441, a browsing request transmitter 1442, a browsing screen receiver 1443, and a browsing screen display unit 1444. The application executor 1404 also includes a report creation request acquirer 1445, a report creation request transmitter 1446, a report receiver 1447, and a report output unit 1448. Furthermore, the application executor 1404 includes a worker information request acquirer 1449, a worker information request transmitter 1451, a worker information receiver 1452, a worker information display unit 1453, a registration information receiver 1454, a registration information storage unit 1455, and a registration information batch transmitter 1456.

The QR Code® receiver/output unit 1440 receives a QR Code® from the information processing apparatus 210, and outputs it to the display unit 1421 or the printer 1426. The browsing request acquirer 1441 acquires a browsing request instructed by a manager from the operation unit 1422. The browsing request transmitter 1442 transmits the acquired browsing request to the information processing apparatus 210. The browsing screen receiver 1443 receives a browsing screen corresponding to the browsing request from the information processing apparatus 210. The browsing screen display unit 1444 displays the received browsing screen on the display unit 1421. The report creation request acquirer 1445 acquires a report creation request instructed by the manager from the operation unit 1422. The report creation request transmitter 1446 transmits the acquired report creation request to the information processing apparatus 210. The report receiver 1447 receives a report corresponding to the report creation request from the information processing apparatus 210. The report output unit 1448 outputs the received report to the display unit 1421 or the printer 1426. The browsing request transmitter 1442 transmits the acquired browsing request to the information processing apparatus 210.

The worker information request acquirer 1449 acquires a worker information request instructed by the manager from the operation unit 1422. Note that the worker information request is also issued by selecting the browsing screen or the worker in the report displayed on the display unit 1421. The worker information request transmitter 1451 transmits the acquired worker information request to the information processing apparatus 210. The worker information receiver 1452 receives worker information corresponding to the worker information request from the information processing apparatus 210. The worker information display unit 1453 displays the received worker information on the display unit 1421. The registration information receiver 1454 receives registration information from each communication terminal 220. The registration information storage unit 1455 displays the received registration information on the display unit 1421 while storing it. The registration information batch transmitter 1456 transmits, at once, to the information processing apparatus 210, the pieces of registration information registered in the registration information storage unit 1455 in response to an instruction of the manger from the operation unit 1422.

<<Processing Procedure of Manager Terminal>>

Figure 15:
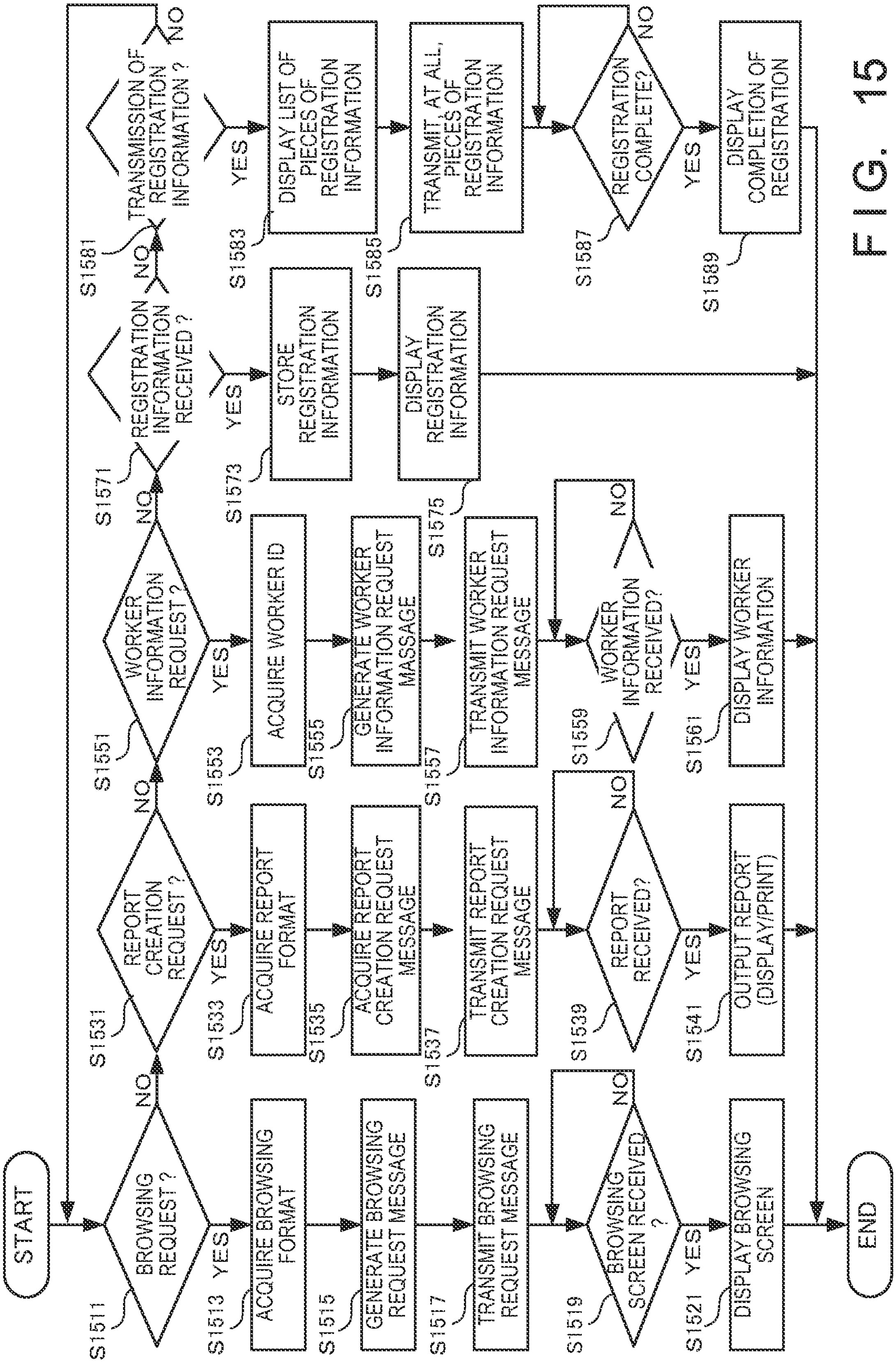
FIG. 15 is a flowchart illustrating the processing procedure of the manager terminal according to the second example embodiment of the present invention.

FIG. 15 is a flowchart illustrating the processing procedure of the manager terminal 230/240 according to this example embodiment. This flowchart is executed by a CPU (not shown) forming the manager terminal 230/240 using a RAM, thereby implementing the functional components shown in FIG. 14. The processing procedure of the manager terminal 230 will representatively be described below.

In step S1511, the manager terminal 230 determines whether a browsing request is instructed. If it is determined that a browsing request is instructed, the manager terminal 230 acquires an instructed browsing format in step S1513. In step S1515, the manager terminal 230 generates a browsing request message. In step S1517, the manager terminal 230 transmits the generated browsing request message to the information processing apparatus 210. In step S1519, the manager terminal 230 waits for reception of a browsing screen from the information processing apparatus 210. If the browsing screen is received, the manager terminal 230 displays, in step S1521, the browsing screen on the display unit 1421.

If it is not determined that a browsing request is instructed, the manager terminal 230 determines in step S1531 whether a report creation request is instructed. If it is determined that a report creation request is instructed, the manager terminal 230 acquires an instructed report format in step S1533. In step S1535, the manager terminal 230 generates a report request message. In step S1537, the manager terminal 230 transmits the generated report request message to the information processing apparatus 210. In step S1539, the manager terminal 230 waits for reception of a report from the information processing apparatus 210. If a report is received, in step S1541 the manager terminal 230 displays the report on the display unit 1421 or prints the report by the printer 1426.

If it is not determined that a browsing request is instructed or that a report creation request is instructed, the manager terminal 230 determines in step S1551 whether a worker information request is instructed. If it is determined that a worker information request is instructed, the manager terminal 230 acquires an instructed worker ID in step S1553. In step S1555, the manager terminal 230 generates a worker information request message. In step S1557, the manager terminal 230 transmits the generated worker information request message to the information processing apparatus 210. In step S1559, the manager terminal 230 waits for reception of worker information from the information processing apparatus 210. If worker information is received, the manager terminal 230 displays, in step S1561, the worker information on the display unit 1421.

If it is not determined that a browsing request is instructed, that a report creation request is instructed, or that a worker information request is instructed, the manager terminal 230 determines in step S1571 whether registration information is received. If registration information is received, the manager terminal 230 stores, in step S1573, the received registration information in the registration information storage unit 1455. In step S1575, the manager terminal 230 displays, on the display unit 1421, the stored registration information from each communication terminal 220.

If it is not determined that a browsing request is instructed, that a report creation request is instructed, that a worker information request is instructed, or that registration information is received, the manager terminal 230 determines in step S1581 whether transmission of the registration information stored in the registration information storage unit 1455 is instructed. If it is determined that transmission of the registration information is instructed, the manager terminal 230 displays, in step S1583, a list of the pieces of stored registration information. In step S1585, the manager terminal 230 performs batch transmission of the pieces of registration information to the information processing apparatus 210. In step S1587, the manager terminal 230 waits for reception of a registration completion notification from the information processing apparatus 210. If the registration completion notification is received, the manager terminal 230 displays, in step S1589, completion of registration of registration information (especially, a face image) on the display unit 1421. For registration information for which an authentication error has occurred, the manager terminal 230 makes a notification of the error.

Note that in this example embodiment, the communication terminal is notified of site information using a QR Code® as a place specifying code. However, a barcode or the like may be used as a place specifying code that cannot be visually recognized by a person. Alternatively, the communication terminal may be notified of site information by short-distance communication from an IC card or short-distance communication such as infrared communication between the communication terminals. In addition, the communication terminal acquires position information from the GPS. However, it may be impossible to acquire position information in a room or the like. To cope with this, the acquisition of the position information can be replaced by reception of a beacon signal or acquisition of position information by short-distance communication without changing the basic arrangement according to this example embodiment.

According to this example embodiment, it is possible to efficiently record entrance/exit of an entering/exiting person by simple authentication and registration of entrance/exit based on face authentication and the position information of a communication terminal carried by the entering/exiting person using the communication terminal. Since registration of a face image of an entering/exiting person is performed when distributing a place specifying code such as a QR Code®, it is possible to prevent registration of a face image by a suspicious person. Furthermore, the load of a site manager or a business manager can be reduced by browsing entrance/exit histories of recorded entering/exiting people or creating a report.

For example, although it takes time and labor to confirm the schedule and result of each worker at the time of a morning assembly or site confirmation, this example embodiment reduces the entrance and exit management cost by combining face authentication and position confirmation. Furthermore, although it takes time to organize the number of people reported by a work cooperative company and transcribe it to various reports, this example embodiment can save labor of creating various reports based on entrance/exit recording information. In addition, a man-day report from the work cooperative company is directly used as a report value for reasons such as the fact that it takes time/labor to perform personal identification, and it is thus impossible to grasp the actual situation. However, according to this example embodiment, it is possible to readily grasp personal identification including qualification information, which can contribute to payment of the correct labor cost by entrance/exit recording and suppression of a social insurance premium. Although the management cost is required for distribution of conventional entrance/exit cards since the cards may be lost or left, this example embodiment can reduce the risk of a loss and card management since entrance/exit is recorded by face authentication. That is, for example, it is possible to readily grasp the actual man-day of each worker at a construction site by combining the face authentication technique and position information confirmation using the GPS or the like, thereby contributing to improvement of productivity at the site.

As described above, according to this example embodiment, it is possible to satisfy the following requests desired in site entrance and exit management. That is, it is required to readily confirm whether a qualified person is working (fraud prevention/compliance). It is required to efficiently manage whether the person himself/herself is surely at the site on work schedule (work management/social insurance). It is required to systematically, automatically manage start permission and end confirmation of work (work management/safety management). Furthermore, it is required to construct a low-end, so-called labor attendant management mechanism. That is, it is possible to save manpower for site entrance and exit management (so-called labor attendant management task) executed every day, by performing face authentication by a communication terminal (for example, a smartphone or the like) that can be carried at the time of site entrance/exit, and grasping when/at which site the person himself/herself is present.

Third Example Embodiment

An information processing apparatus according to the third example embodiment of the present invention will be described next. The information processing apparatus according to this example embodiment is different from that in the above-described second example embodiment in that liveliness is confirmed (it is confirmed whether the person himself/herself is actually captured) at the time of acquisition of a face image for entrance/exit registration. The remaining components and operations are the same as those in the second example embodiment. Hence, the same reference numerals denote the same components and operations, and a detailed description thereof will be omitted.

<<Overview of Liveness Confirmation Operation>>

Figure 16:
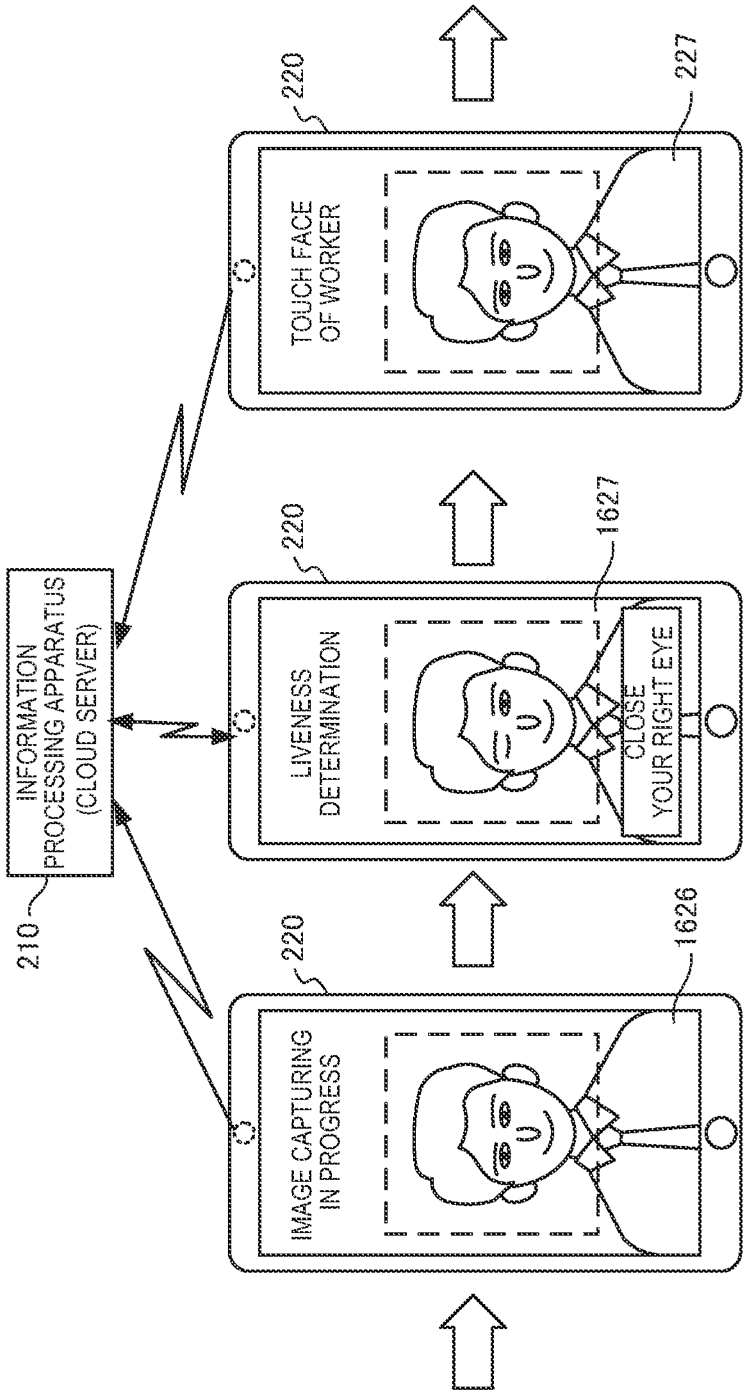
FIG. 16 is a view showing an overview of a liveness confirmation operation in a communication terminal that communicates with an information processing apparatus according to the third example embodiment of the present invention.

FIG. 16 is a view showing an overview of a liveness confirmation operation in a communication terminal 220 that communicates with the information processing apparatus according to this example embodiment. Note that FIG. 16 shows addition of liveness processing to entrance/exit registration in the lower portion of FIG. 2B. The same reference numerals as in FIG. 2B denote the same components and a description thereof will be omitted.

After a display screen 226 in FIG. 2B, a display screen 1626 is displayed on the communication terminal 220 to indicate that a moving image is being captured. After that, liveness determination is performed on a display screen 1627. On the display screen 1627 shown in FIG. 16, a case in which the right eye is closed is shown. However, as long as liveness is confirmed, another operation may be possible, or a plurality of operations may be instructed to improve the accuracy of confirmation. If liveness can be confirmed, a face image is transmitted from a display screen 227.

(Face Image Authentication Table)

Figure 17:
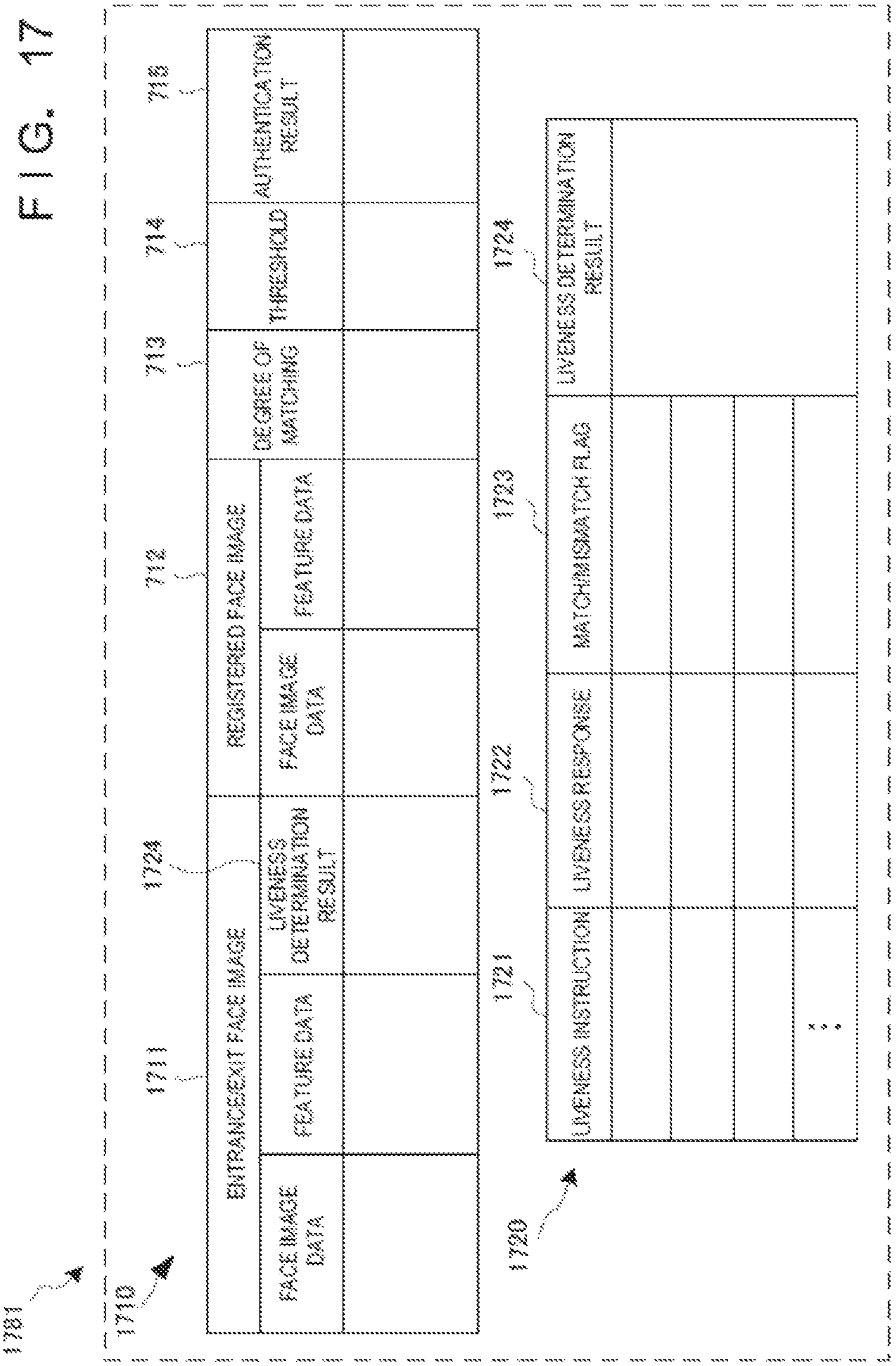
FIG. 17 is a table showing the structure of a face image authentication table according to the third example embodiment of the present invention.

FIG. 17 is table showing the structure of a face image authentication table 1781 according to this example embodiment. Note that the face image authentication table 1781 replaces the face image authentication table 581 shown in FIG. 5, and then liveness face image authentication is performed. Note that in the face image authentication table 1781, the same reference numerals as in the face image authentication table 581 shown in FIG. 5 denote the same components and a repetitive description will be omitted.

The face image authentication table 1781 includes an authentication table 1710 corresponding to the face image authentication table 581 and a liveness table 1720 used for liveness determination. The authentication table 1710 stores a liveness determination result 1724 as an entrance/exit face image 1711. The liveness determination result 1724 is generated as an overall determination result by determining a match/mismatch flag 1723 based on a liveness instruction 1721 and a liveness response 1722 of the liveness table 1720.

<<Processing Procedure of Information Processing Apparatus>>

Figure 18:
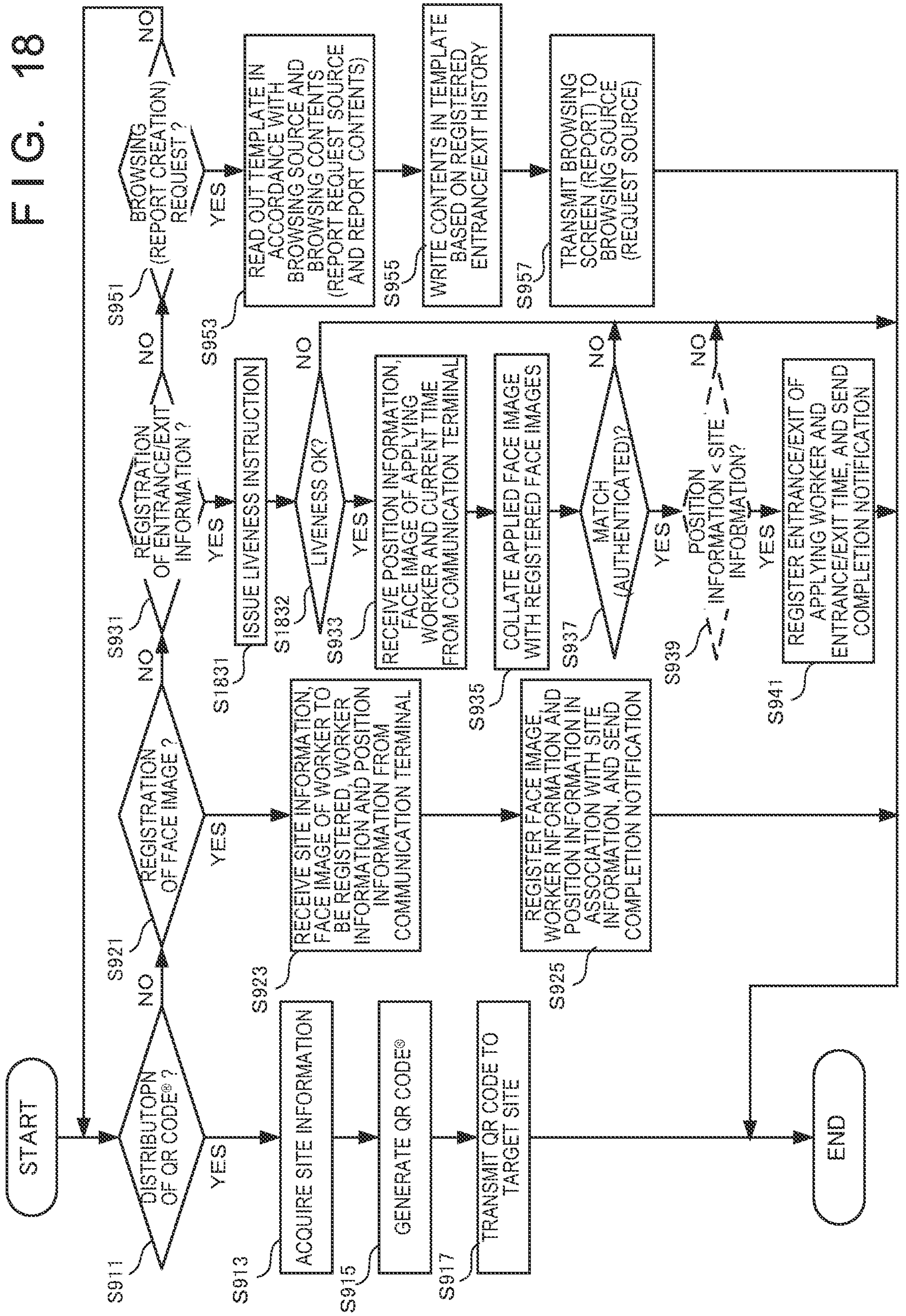
FIG. 18 is a flowchart illustrating the processing procedure of the information processing apparatus according to the third example embodiment of the present invention.

FIG. 18 is a flowchart illustrating the processing procedure of an information processing apparatus 210 according to this example embodiment. Note that in FIG. 18, the same step numbers as in FIG. 9 denote the same steps and a repetitive description thereof will be omitted.

In step S1831, the information processing apparatus 210 issues a liveness operation instruction. In step S1832, the information processing apparatus 210 determines whether liveness is OK. If it is determined that liveness is OK, the process advances to authentication processing in step S933 and subsequent steps; otherwise, entrance/exit registration processing ends.

Note that in this example embodiment, liveness confirmation is performed by the information processing apparatus. However, it may be configured to perform simple liveness confirmation by an application downloaded by the communication terminal.

According to this example embodiment, in addition to the effects of the second example embodiment, it is possible to prevent fraud such as spoofing in authentication at the time of entrance/exit.

Fourth Example Embodiment

An information processing apparatus according to the fourth example embodiment of the present invention will be described next. The information processing apparatus according to this example embodiment is different from those in the above-described second and third example embodiments in that face images of a group of workers are registered at once by a manager terminal and/or entrance/exit of the group of workers are registered at once by the manager terminal. That is, at the time of face image registration, pieces of face information of a plurality of users extracted from an image including face images of the plurality of users are registered as a plurality of registered users in association with a place. At the time of entrance/exit registration, pieces of face information of a plurality of applying users are extracted from an image including face images of the plurality of applying users and user authentication of the plurality of applying users is performed by comparing the pieces of face information of the plurality of applying users with the pieces of face information of the plurality of registered users. The remaining components and operations are the same as those in the second and third example embodiments. Hence, the same reference numerals denote the same components and operations, and a detailed description thereof will be omitted.

<<Overview of Simultaneous Image Capturing Operation>>

Figure 19A:
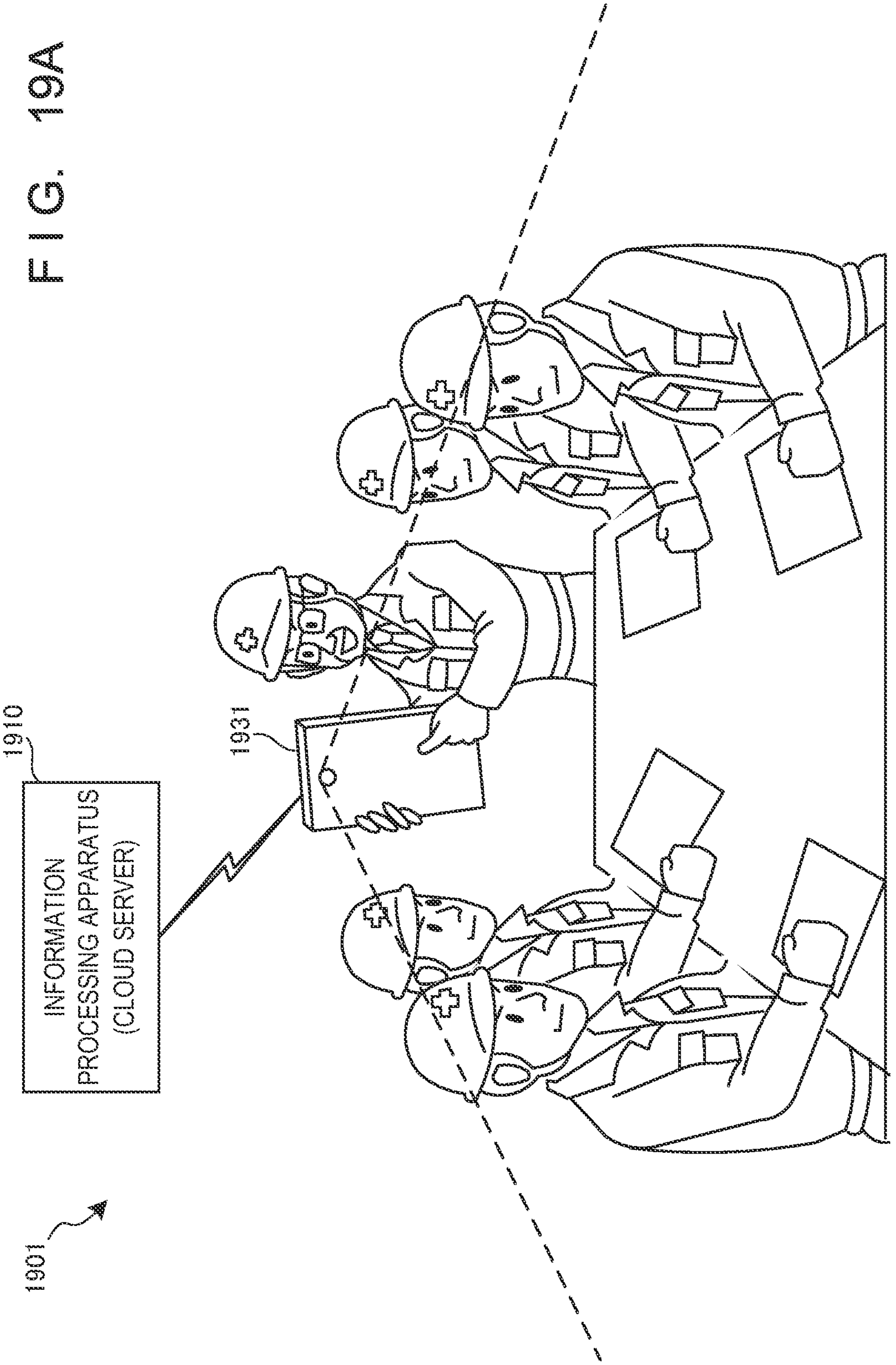
FIG. 19A is a view showing an overview of a simultaneous image capturing operation at the time of face image registration in a manager terminal that communicates with an information processing apparatus according to the fourth example embodiment of the present invention.

FIG. 19A is a view showing an overview 1901 of a simultaneous image capturing operation at the time of face image registration in a manager terminal 1931 that communicates with an information processing apparatus 1910 according to this example embodiment.

FIG. 19A shows a scene in which new entering person training is performed. A teacher of the new entering person training simultaneously captures, by the image capturer of the manager terminal 1931, a plurality of workers who participate in the new entering person training, and transmits the thus obtained image to the information processing apparatus 1910. The information processing apparatus 1910 extracts the face image of each worker from the received image, and uses it for face image registration. Note that the image capturer of the manager terminal 1931 may be a front camera or a rear camera.

Figure 19B:
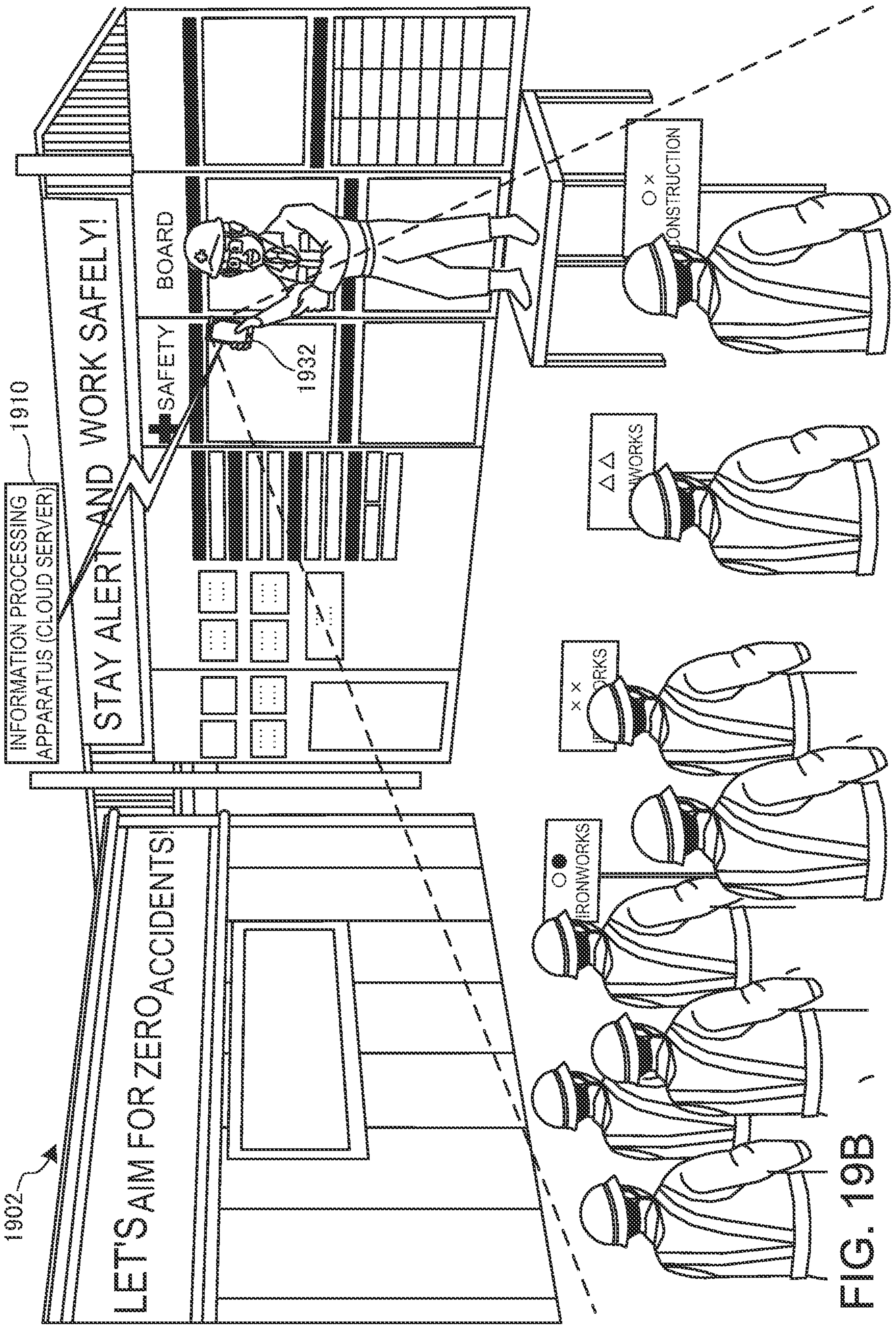
FIG. 19B is a view showing an overview of a simultaneous image capturing operation at the time of entrance/exit registration in the manager terminal that communicates with the information processing apparatus according to the fourth example embodiment of the present invention.

FIG. 19B is a view showing an overview 1902 of a simultaneous image capturing operation at the time of entrance/exit registration in a manager terminal 1932 that communicates with the information processing apparatus 1910 according to this example embodiment.

FIG. 19B shows a scene in which a morning assembly is held. In the morning assembly, the manager simultaneously captures, by the image capturer of the manager terminal 1932, a plurality of workers who participate in the morning assembly, and transmits the thus obtained image to the information processing apparatus 1910. The information processing apparatus 1910 extracts the face image of each worker from the received image, and uses it for face authentication. Note that the same applies to exit processing in an evening assembly, and a repetitive description will be omitted. Note that the image capturer of the manager terminal 1932 may be a front camera or a rear camera.

<<Operation Sequence of Entrance and Exit Management System>>

Figure 20A:
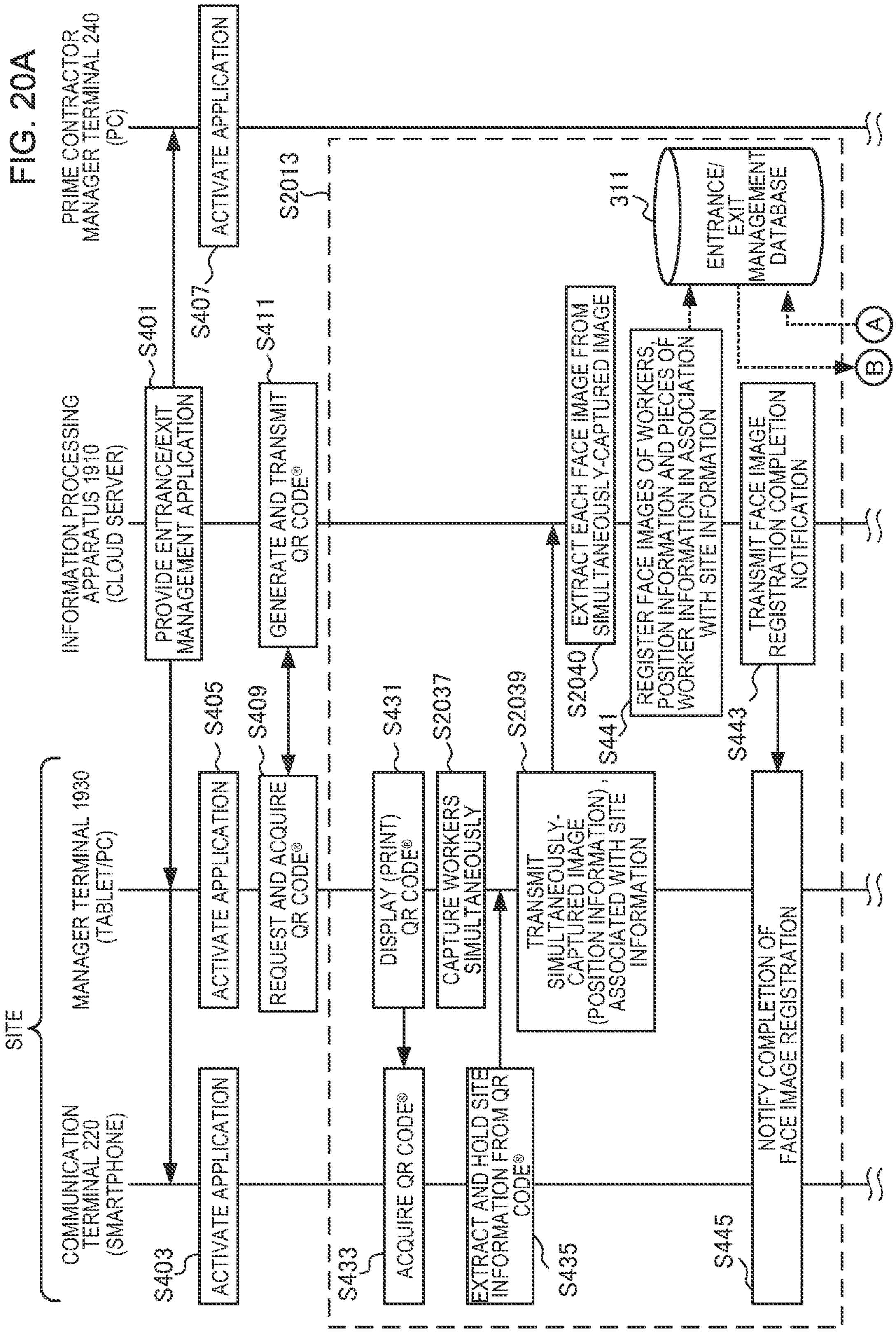
FIG. 20A is a sequence chart showing the registration procedure of an entrance/exit management system including the information processing apparatus according to the fourth example embodiment of the present invention.

FIG. 20A is a sequence chart showing the registration procedure of an entrance and exit management system including the information processing apparatus 1910 according to this example embodiment. Note that in FIG. 20A, the same step numbers as in FIG. 4A denote the same steps and a repetitive description thereof will be omitted. Note also that in FIG. 20A, the manager terminals 1931 and 1932 are represented by a manager terminal 1930.

In step S2013, face image registration processing according to this example embodiment is performed. In step S2037, the manager terminal 1930 simultaneously captures, by the image capturer, workers who participate in the new entering person training. In step S2039, the manager terminal 1930 transmits, to the information processing apparatus 1910, a simultaneously-captured image and position information of the manager terminal 1930 together with site information, worker information, and the like. In step S2040, the information processing apparatus 1910 extracts the face image of each worker from the received simultaneously captured image, and uses it for subsequent face image registration.

Figure 20B:
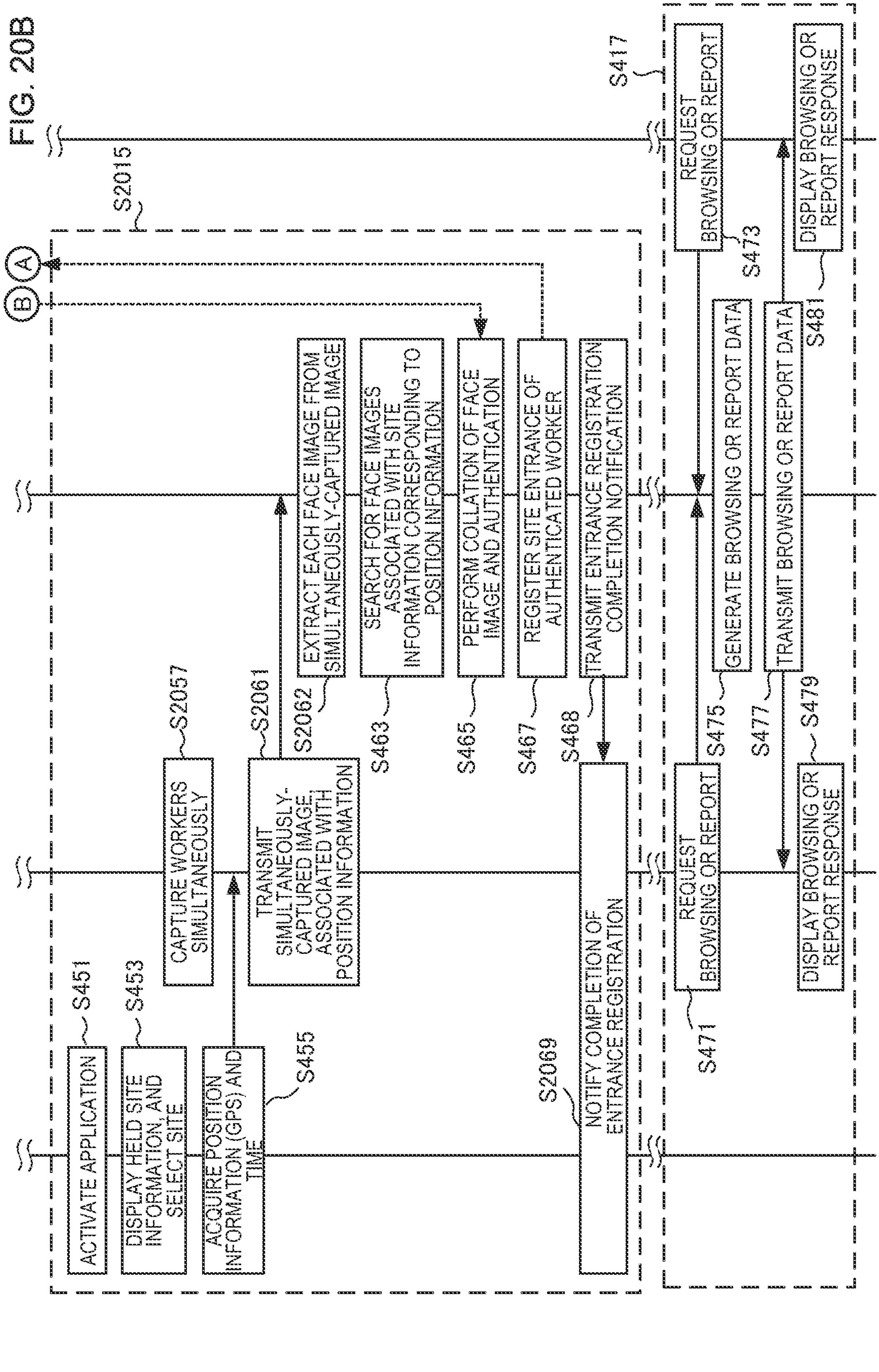
FIG. 20B is a sequence chart showing the entrance/exit management procedure of the entrance and exit management system including the information processing apparatus according to the fourth example embodiment of the present invention.

FIG. 20B is a sequence chart showing the entrance and exit management procedure of the entrance and exit management system including the information processing apparatus 1910 according to this example embodiment. Note that in FIG. 20B, the same step numbers as in FIG. 4B denote the same steps and a repetitive description thereof will be omitted.

In step S2015, entrance/exit registration processing according to this example embodiment is performed. In step S2057, the manager terminal 1930 simultaneously captures, by the image capturer, workers who participate in a morning assembly. In step S2061, the manager terminal 1930 transmits the simultaneously captured image to the information processing apparatus 1910 together with position information, time information, and the like. In step S2062, the information processing apparatus 1910 extracts the face image of each worker from the received simultaneously captured image, and uses the extracted face image for subsequent face authentication. In step S2069, the manager terminal 1930 and the communication terminal 220 notify a completion of an entrance registration.

<<Functional Arrangement of Information Processing Apparatus>>

Figure 21:
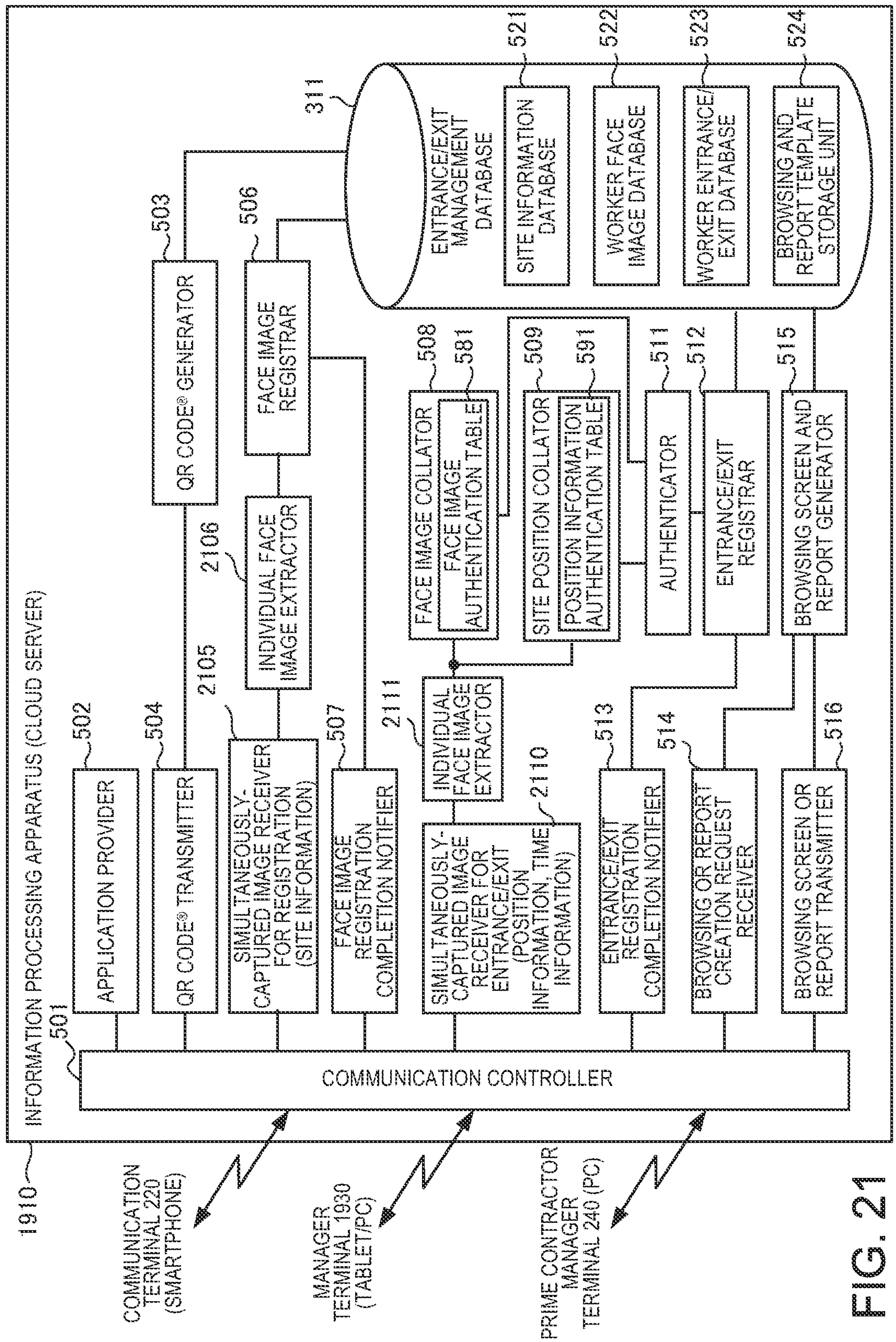
FIG. 21 is a block diagram showing the functional arrangement of the information processing apparatus according to the fourth example embodiment of the present invention.

FIG. 21 is a block diagram showing the functional arrangement of the information processing apparatus 1910 according to this example embodiment. Note that in FIG. 21, the same reference numerals as in FIG. 5 denote the same functional components and a repetitive description thereof will be omitted.

The information processing apparatus 1910 includes a simultaneously-captured image receiver for registration 2105, an individual face image extractor 2106, a simultaneously-captured image receiver for entrance/exit 2110, and an individual face image extractor 2111. The simultaneously captured image receiver for registration 2105 receives, together with the site information, worker information, and the like, the image simultaneously captured in the new entering person training and transmitted from a manager terminal 1930. The individual face image extractor 2106 extracts each face image from the image simultaneously captured in the new entering person training and received, and outputs the face image to the face image registrar 506. The simultaneously captured image receiver for entrance/exit 2110 receives, together with the position, the time information, and the like, the image simultaneously captured in the morning or evening assembly and transmitted from the manager terminal 230. The individual face image extractor 2111 extracts each face image from the image simultaneously captured in the morning or evening assembly and received, and outputs the face image to the face image collator 508.

<<Processing Procedure of Information Processing Apparatus>>

Figure 22:
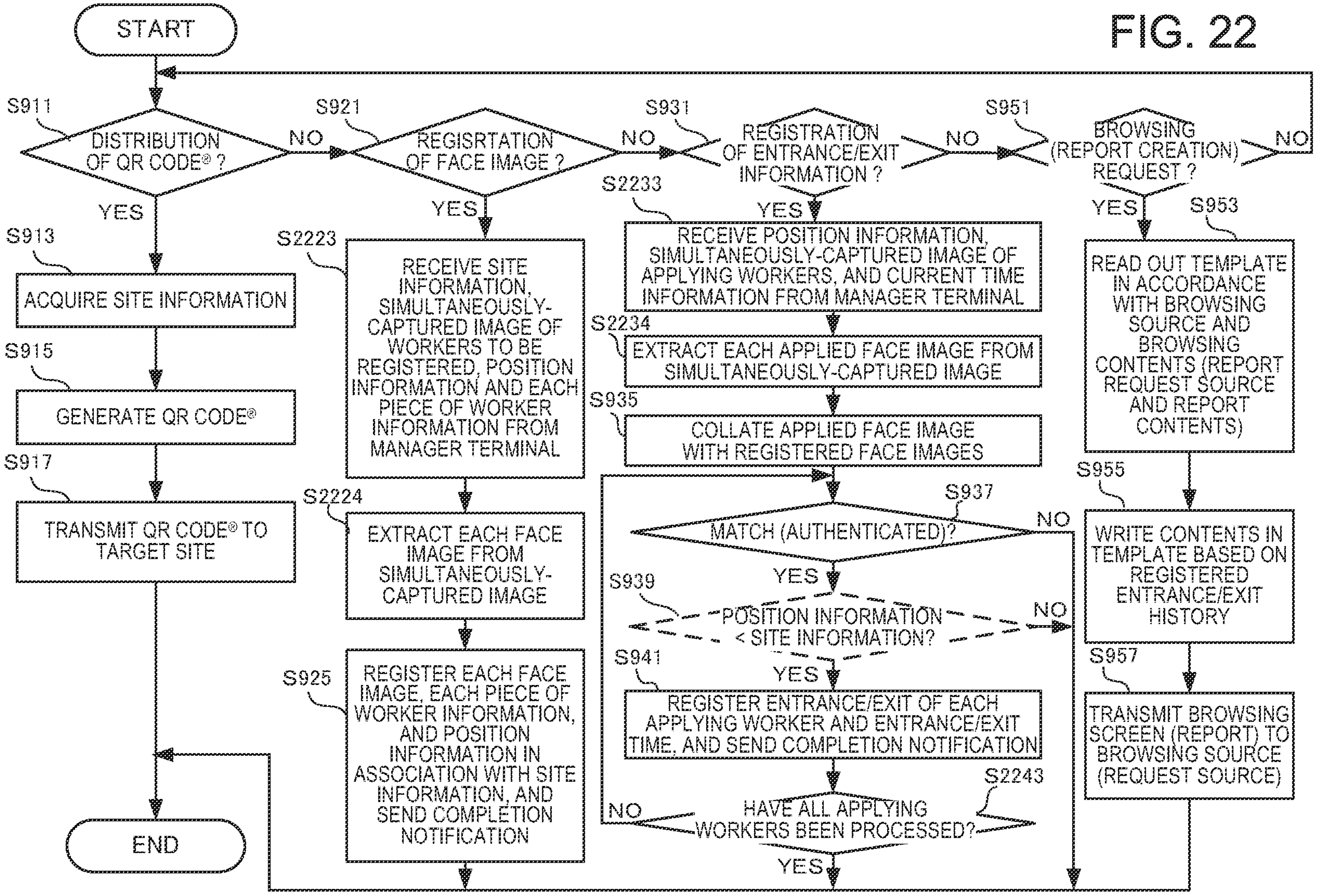
FIG. 22 is a flowchart illustrating the processing procedure of the information processing apparatus according to the fourth example embodiment of the present invention.

FIG. 22 is a flowchart illustrating the processing procedure of the information processing apparatus 1910 according to this example embodiment. Note that in FIG. 22, the same step numbers as in FIG. 9 denote the same steps and a repetitive description thereof will be omitted.

In step S2223, the information processing apparatus 1910 receives the simultaneously-captured image and the position information of the manager terminal 1930 from the manager terminal 1930. In step S2224, the information processing apparatus 1910 extracts the face image of each worker from the received simultaneously-captured image, and uses the extracted face image for subsequent face image registration. In step S2233, the information processing apparatus 1910 receives the simultaneously-captured image, the position information of the manager terminal 1930, and the current time information from the manager terminal 1930. In step S2234, the information processing apparatus 1910 extracts the face image of each worker from the received simultaneously-captured image, and uses the extracted face image for subsequent face authentication. By step S2243, the information processing apparatus 1910 repeats authentication of all applying workers included in the simultaneously-captured image.

According to this example embodiment, in addition to the effects of the above example embodiments, it is possible to improve discipline in a work place and further reduce the load of a site manager or a business manager since face images of workers are simultaneously registered and/or entrance/exit of the workers is simultaneously registered.

Fifth Example Embodiment

An information processing apparatus according to the fifth example embodiment of the present invention will be described next. The information processing apparatus according to this example embodiment is different from those in the above-described second to fourth example embodiments in that if an authentication error occurs at the time of entrance/exit, site information held in a communication terminal is deleted. In this example embodiment, the information processing apparatus instructs the communication terminal to delete the site information. Note that the communication terminal from which the site information has been deleted becomes unusable for entrance into or exit from the site, and it is necessary to re-execute site information acquisition processing or face image registration processing. The remaining components and operations are the same as those in the second example embodiment. Hence, the same reference numerals denote the same components and operations, and a detailed description thereof will be omitted.

<<Operation Sequence of Entrance and Exit Management System>>

Figure 23:
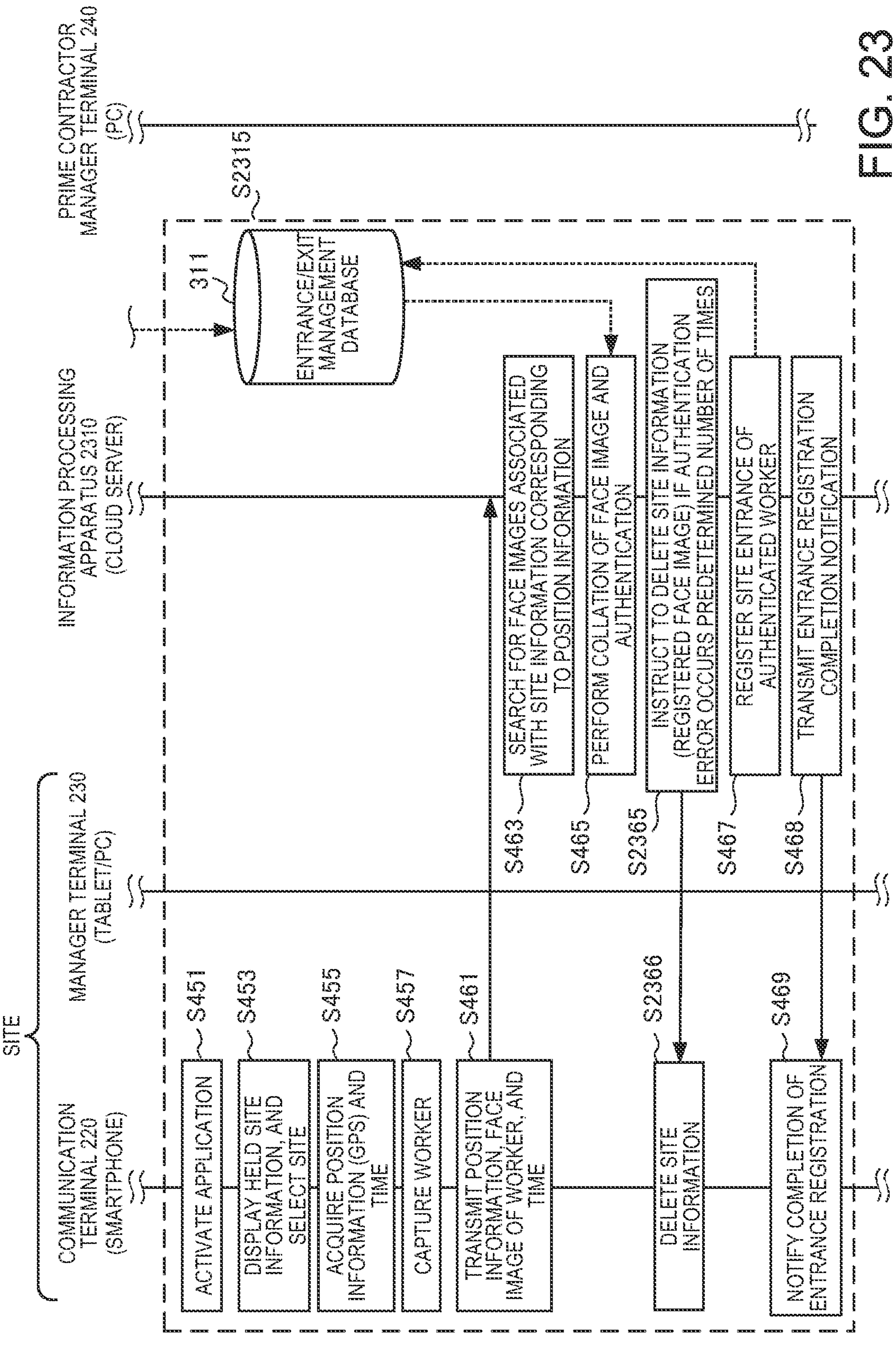
FIG. 23 is a sequence chart showing an entrance and exit management procedure including site information deletion of an entrance and exit management system including an information processing apparatus according to the fifth example embodiment of the present invention.

FIG. 23 is a sequence chart showing an entrance and exit management procedure including site information deletion of an entrance and exit management system including an information processing apparatus 2310 according to this example embodiment. Note that in FIG. 23, the same step numbers as in FIG. 4B denote the same steps and a repetitive description thereof will be omitted. Step S417 of browsing or report creation is the same as in FIG. 4B, and is thus omitted from FIG. 23.

In step S2315, entrance/exit registration processing according to this example embodiment is performed. In step S2365, if authentication errors occur in a predetermined number (one or more) of times for each communication terminal or each worker, the information processing apparatus 2310 instructs a communication terminal 220 to delete held site information. In step S2366, upon receiving the site information deletion instruction, the communication terminal 220 deletes the site information held at the time of face image registration. At this time, if the authentication error is determined to be malicious, a face image of a worker registered in an entrance/exit management database 311 may be deleted. To use the communication terminal 220 for entrance/exit registration at the site, it is necessary to re-execute site information acquisition processing or face image registration processing <<Functional Arrangement of Information Processing Apparatus>>

Figure 24:
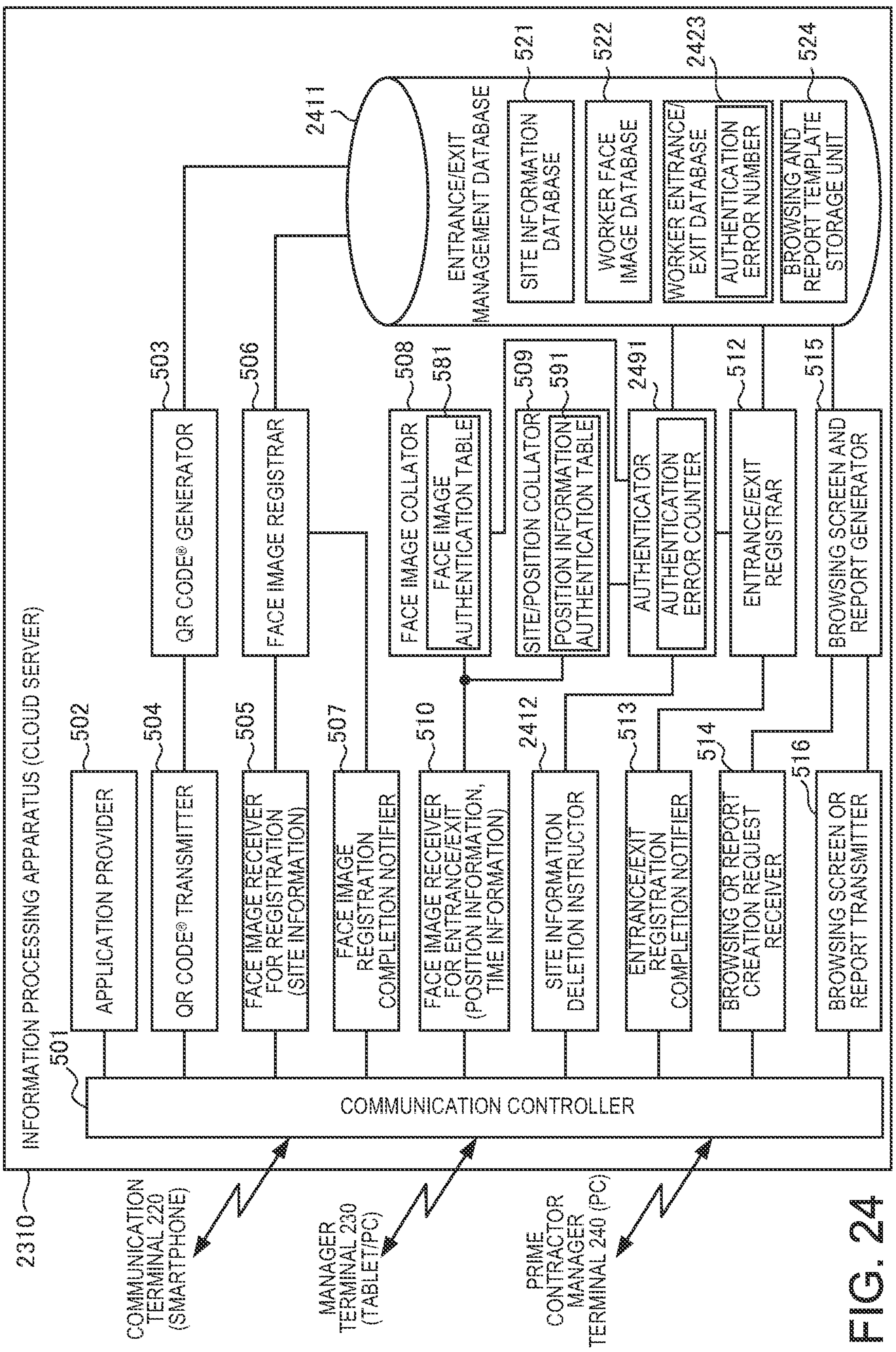
FIG. 24 is a block diagram showing the functional arrangement of the information processing apparatus according to the fifth example embodiment of the present invention.

FIG. 24 is a block diagram showing the functional arrangement of the information processing apparatus 2310 according to this example embodiment. Note that in FIG. 24, the same reference numerals as in FIG. denote the same functional components and a repetitive description thereof will be omitted.

The information processing apparatus 2310 includes an authenticator 2491, a site information deletion instructor 2412, and a worker entrance/exit database 2423 included in an entrance/exit management database 2411. The authenticator 2491 includes an authentication error counter to count the number of times of occurrence of an authentication error. If the number of times of occurrence of the authentication error exceeds a predetermined number (one or more), the authenticator 2491 requests the site information deletion instructor 2412 to delete site information. Upon receiving the site information deletion request from the authenticator 2491, the site information deletion instructor 2412 instructs the target communication terminal 220 to delete the site information of the corresponding site. The worker entrance/exit database 2423 stores an authentication error number as a threshold of an authentication error count based on which site information deletion is requested.

<<Processing Procedure of Information Processing Apparatus>>

Figure 25:
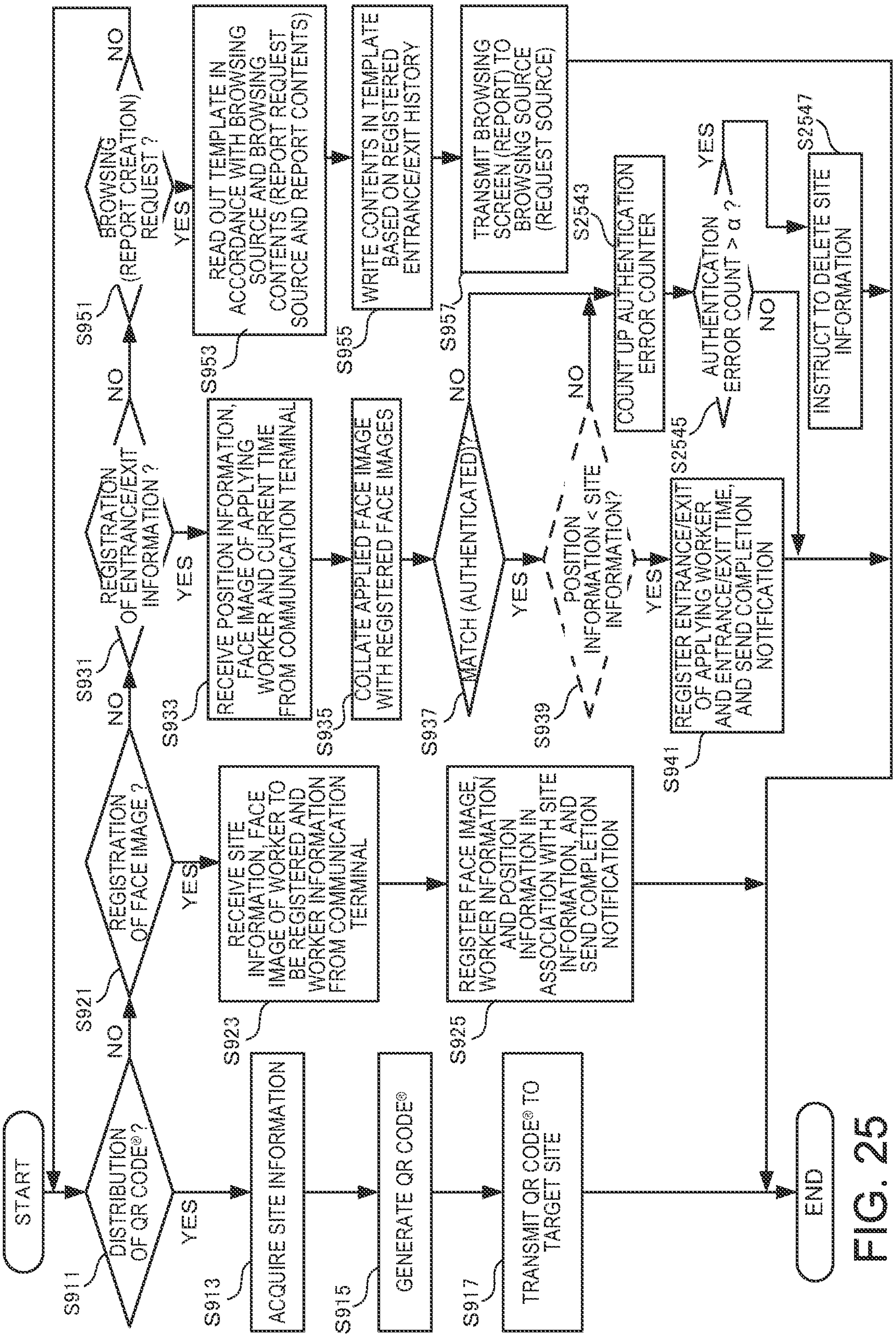
FIG. 25 is a flowchart illustrating the processing procedure of the information processing apparatus according to the fifth example embodiment of the present invention.

FIG. 25 is a flowchart illustrating the processing procedure of the information processing apparatus 2310 according to this example embodiment. Note that in FIG. 25, the same step numbers as in FIG. 9 denote the same steps and a repetitive description thereof will be omitted.

In step S2543, the information processing apparatus 2310 counts up the authentication error counter. In step S2545, the information processing apparatus 2310 determines whether the authentication error count exceeds a predetermined number $\alpha$. If it is determined that the authentication error count exceeds the predetermined error number $\alpha$, the information processing apparatus 2310 instructs, in step S2547, the target communication terminal 220 to delete the site information of the corresponding site.

According to this example embodiment, in addition to the effects of the above example embodiments, it is possible to more efficiently manage entrance/exit of an entering/exiting person by restricting the use of a communication terminal that causes an authentication error. In addition, it is possible to reduce unnecessary expenses among expenses required for authentication processing, and entrance and exit management processing of the information processing apparatus serving as a loud server.

Sixth Example Embodiment

A communication terminal according to the sixth example embodiment of the present invention will be described next. The communication terminal according to this example embodiment is different from those in the above-described second to fifth example embodiments in that if an authentication error occurs at the time of entrance/exit, the communication terminal deletes site information by itself. Note that the communication terminal which has deleted the site information becomes unusable for entrance/exit at the site, and it is necessary to re-execute site information acquisition processing or face image registration processing. In this example embodiment, position information authentication is performed in the communication terminal based on acquired position information and held position information of site information, thereby reducing unnecessary face image transmission and authentication. The remaining components and operations are the same as those in the second to fifth example embodiments. Hence, the same reference numerals denote the same components and operations, and a detailed description thereof will be omitted.

<<Operation Sequence of Entrance and Exit Management System>>

Figure 26:
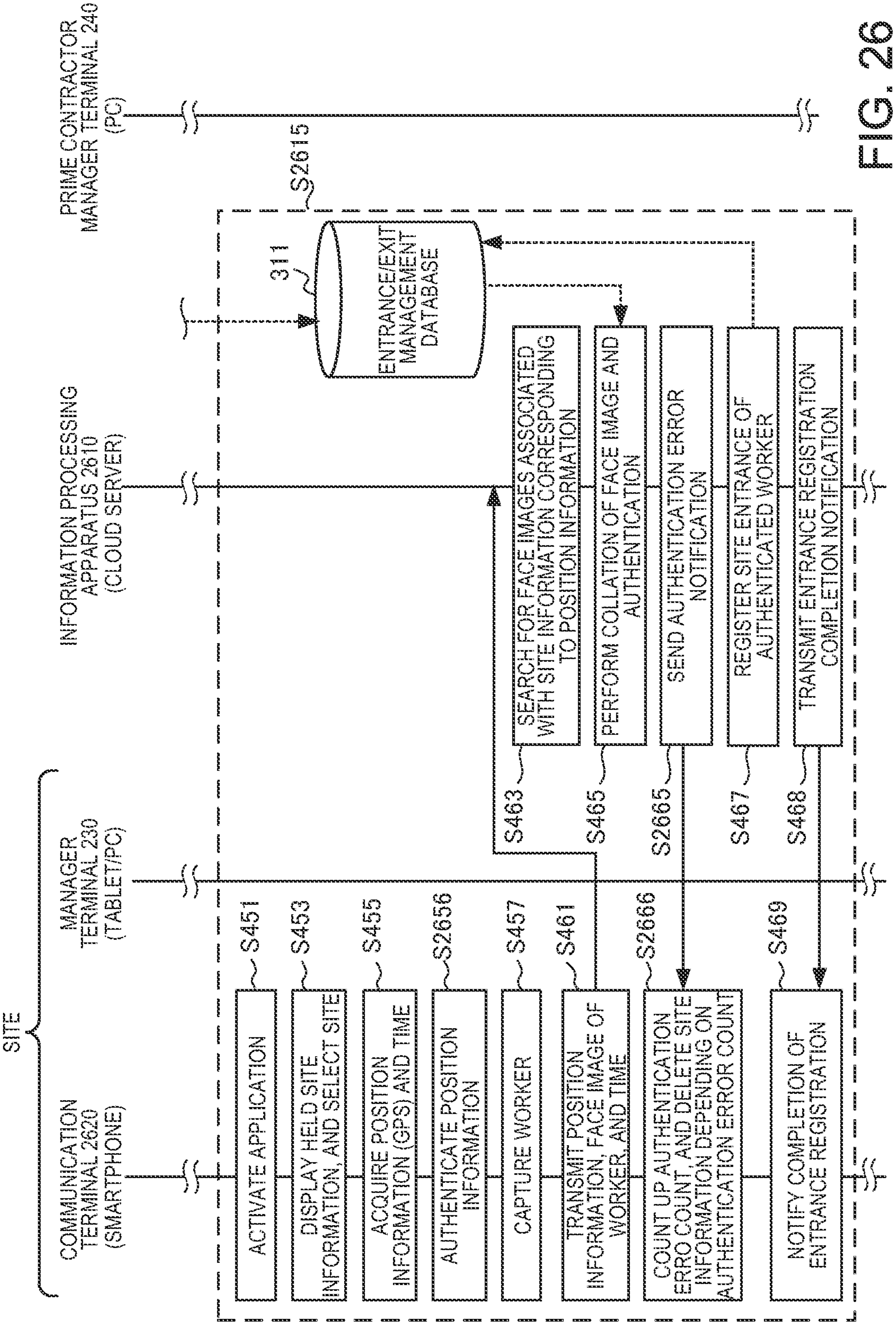
FIG. 26 is a sequence chart showing an entrance and exit management procedure including site information deletion of an entrance and exit management system including an information processing apparatus according to the sixth example embodiment of the present invention.

FIG. 26 is a sequence chart showing an entrance and exit management procedure including site information deletion of an entrance and exit management system including a communication terminal 2620 according to this example embodiment. Note that in FIG. 26, the same step numbers as in FIG. 4B denote the same steps and a repetitive description thereof will be omitted.

In step S2615, entrance/exit registration processing according to this example embodiment is performed. In step S2665, an information processing apparatus 2610 notifies the target communication terminal 2620 of an authentication error which has occurred. In step S2666, upon receiving the authentication error from the information processing apparatus 2610, each target communication terminal 2620 counts up an authentication error count. If the authentication error count exceeds a threshold, the communication terminal 2620 deletes site information of the target site, or deletes all pieces of held site information if the communication terminal 2620 has a problem.

<<Functional Arrangement of Communication Terminal>>

Figure 27:
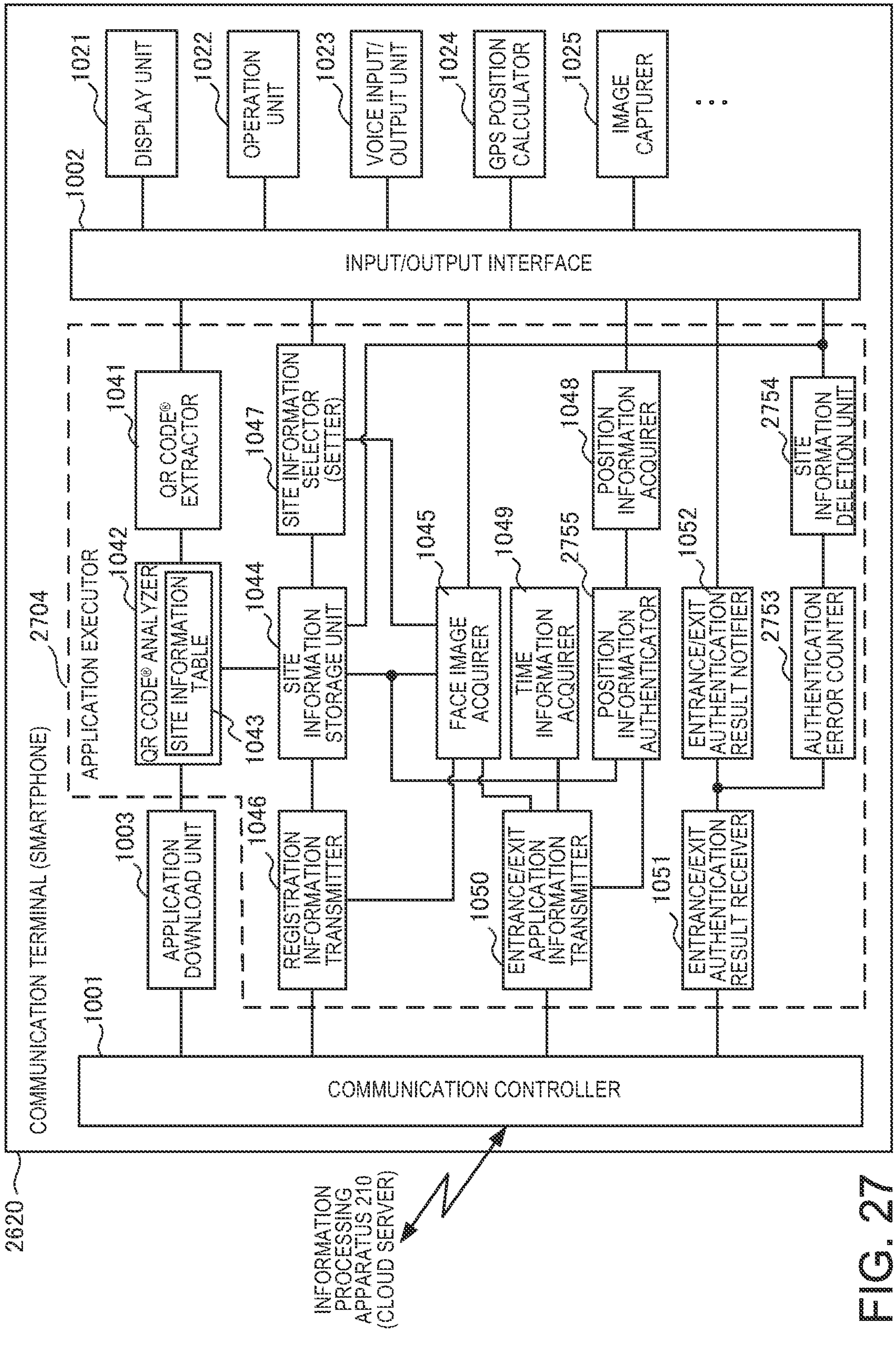
FIG. 27 is a block diagram showing the functional arrangement of a communication terminal according to the sixth example embodiment of the present invention.

FIG. 27 is a block diagram showing the functional arrangement of the communication terminal 2620 according to this example embodiment. Note that in FIG. 27, the same reference numerals as in FIG. 10 denote the same functional components and a repetitive description thereof will be omitted.

The communication terminal 2620 includes an authentication error counter 2753, a site information deletion unit 2754 and a position information authenticator 2755, in an application executor 2704. If an authentication result received by an entrance/exit authentication result receiver 1051 includes an authentication error, the authentication error counter 2753 counts an authentication error count. The authentication error count may be counted for each site or for all the sites. The site information deletion unit 2754 serves as a place deletion unit to delete, if the authentication error count of the authentication error counter 2753 exceeds a predetermined threshold, site information in a site information storage unit 1044. Site information deletion processing may be performed for each site or for each communication terminal 220. The position information authenticator 2755 determines whether position information acquired by the communication terminal 2620 indicates a position within a range of a site indicated by the held site information. The position information authenticator 2755 stops to transmit entrance/exit application information, if the acquired position information is outside the held site information.

<<Processing Procedure of Communication Terminal>>

Figure 28:
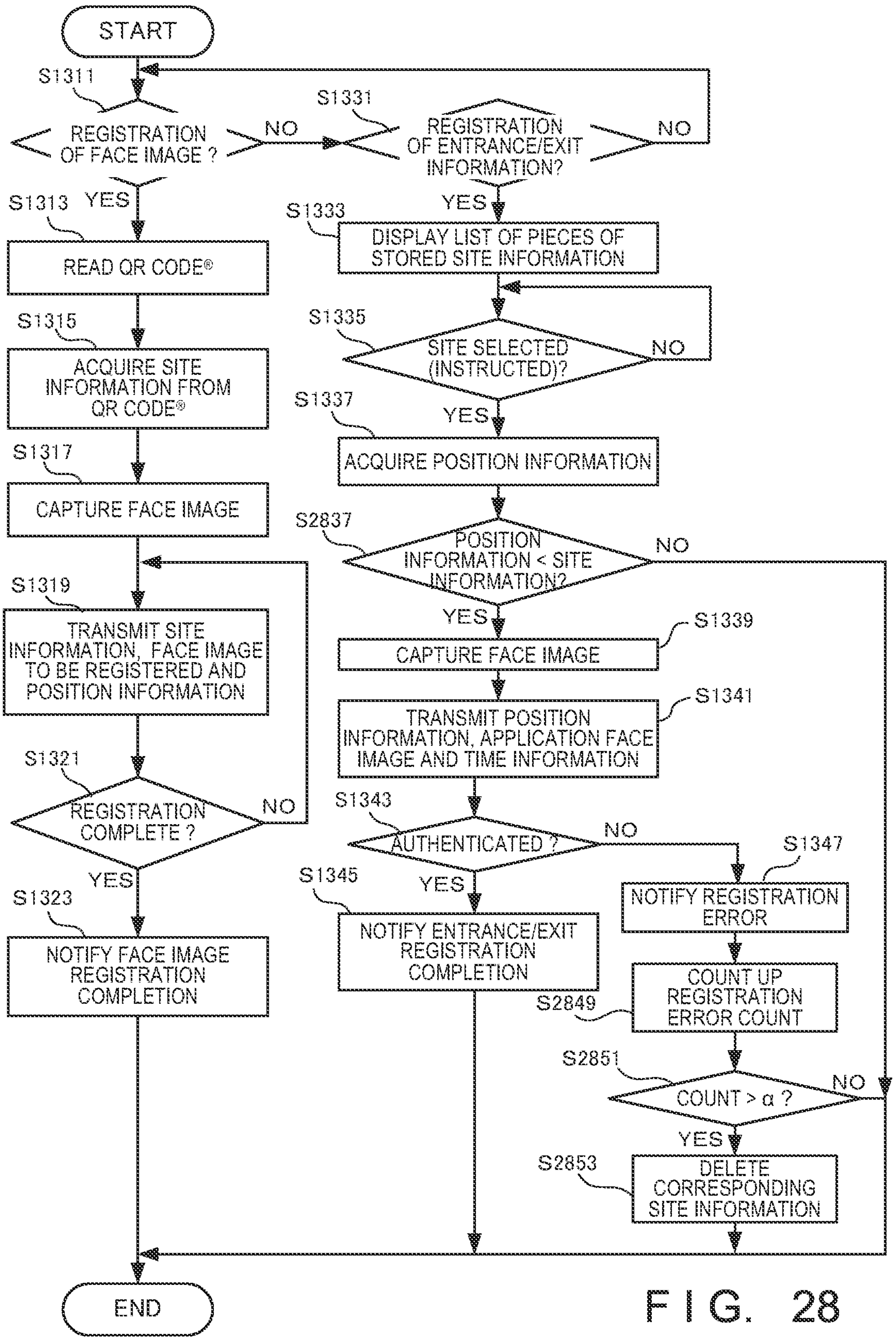
FIG. 28 is a flowchart illustrating the processing procedure of the communication terminal according to the sixth example embodiment of the present invention.

FIG. 28 is a flowchart illustrating the processing procedure of the communication terminal 2620 according to this example embodiment. Note that in FIG. 28, the same step numbers as in FIG. 13 denote the same steps and a repetitive description thereof will be omitted.

In step S2837, the communication terminal 2620 determines whether position information acquired by the communication terminal 2620 indicates a position within a range of a site indicated by the held site information. If the acquired position information is within the held site information, the communication terminal 2620 proceeds to step S1339. If the acquired position information is outside the held site information, the position information authenticator 2755 ends the procedure. In step S2849, the communication terminal 2620 counts up the authentication error count. In step S2851, the communication terminal 2620 determines whether the authentication error count exceeds a predetermined threshold number α. If the authentication error count exceeds the predetermined threshold number α, the communication terminal 2620 deletes corresponding site information in step S2853. In this case, the person cannot enter the site corresponding to the deleted site information unless site information acquisition processing or face image registration is re-executed.

According to this example embodiment, in addition to the effects of the above example embodiments, it is possible to more efficiently manage entrance/exit of an entering/exiting person by reducing the load of the information processing apparatus serving as a cloud server. In addition, since position information is authenticated in the communication terminal and unnecessary face image transmission and authentication are reduced, it is possible to further reduce the load of the information processing apparatus serving as a cloud server.

Seventh Example Embodiment

An information processing apparatus according to the seventh example embodiment of the present invention will be described next. The information processing apparatus according to this example embodiment is different from those in the above-described second to sixth example embodiments in that even if at the time of entrance/exit, especially, at the time of entrance, authentication fails, an entering person count is counted up. The remaining components and operations are the same as those in the second to sixth example embodiments. Hence, the same reference numerals denote the same components and operations, and a detailed description thereof will be omitted.

(Worker Entrance and Exit Database)

FIG. 29 is a table showing the structure of a worker entrance/exit database 2923 according to this example embodiment. Note that the worker entrance/exit database 2923 replaces the worker entrance/exit database 523 shown in FIG. 6C.

The worker entrance/exit database 2923 stores a worker entrance/exit history 2933 in association with a worker ID 2931 and worker information 2932. In this example embodiment, an indefinite person is included as the worker ID 2931. This indefinite person is an entering/exiting person for whom no face image is registered or an authentication error occurs in face authentication. For this indefinite person, only the number of entering/exiting people can be specified. In the worker entrance/exit history 2933, if position information does not match, a mismatch is stored in site information. This field corresponds to a case in which entrance/exit is recorded but a site cannot be specified.

Note that even if the date/time, entrance/exit time, and work contents are unclear, it is possible to prevent fraud or simply count entrance/exit by recording the entering/exiting person count. Thus, even if the worker is not registered, it is possible to count the number of times of entrance.

<<Processing Procedure of Information Processing Apparatus>>

Figure 30:
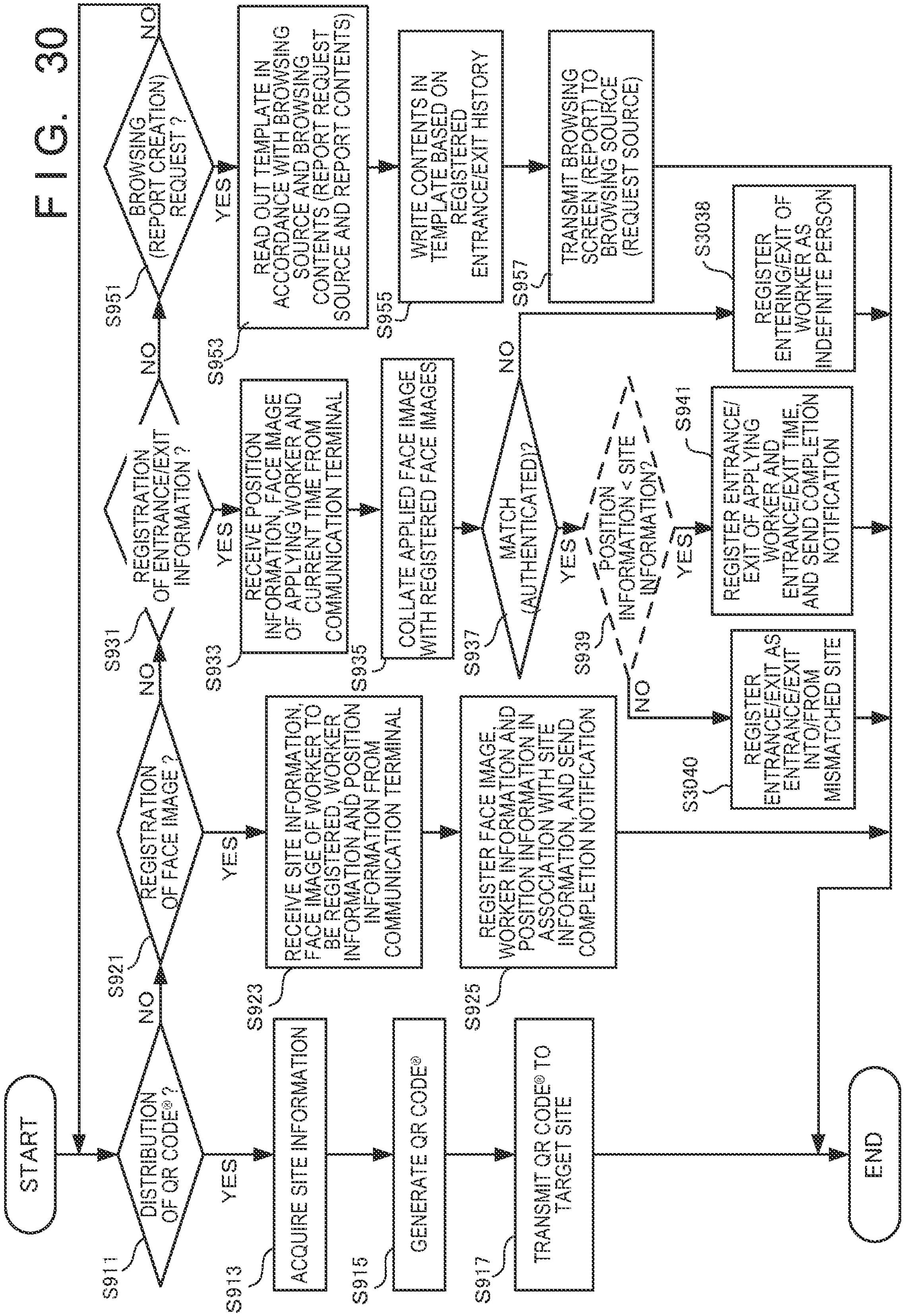
FIG. 30 is a flowchart illustrating the processing procedure of an information processing apparatus according to the seventh example embodiment of the present invention.

FIG. 30 is a flowchart illustrating the processing procedure of an information processing apparatus 3010 according to this example embodiment. Note that in FIG. 30, the same step numbers as in FIG. 9 denote the same steps and a repetitive description thereof will be omitted.

In step S3038, even if a face authentication error occurs, the information processing apparatus 3010 registers a corresponding worker as an indefinite person in the worker entrance/exit database 2923. In step S3040, even if position information does not match, the information processing apparatus 3010 registers entrance or exit as entrance into or exit from a mismatched site in the worker entrance/exit database 2923.

According to this example embodiment, in addition to the effects of the above example embodiments, even if authentication fails since, for example, no face image is registered, it is possible to prevent fraud or simply count entrance/exit by keeping the position information in the entrance/exit record. That is, even if the worker is not registered, it is possible to count the number of times of entrance.

Eighth Example Embodiment

An information processing apparatus according to the eighth example embodiment of the present invention will be described next. The information processing apparatus according to this example embodiment is different from those in the above-described second to seventh example embodiments in that at the time of face image registration, worker information is acquired from a member management server in which a worker has performed member registration. The remaining components and operations are the same as those in the second to seventh example embodiments. Hence, the same reference numerals denote the same components and operations, and a detailed description thereof will be omitted.

<<Arrangement of Entrance and Exit Management System>>

Figure 31:
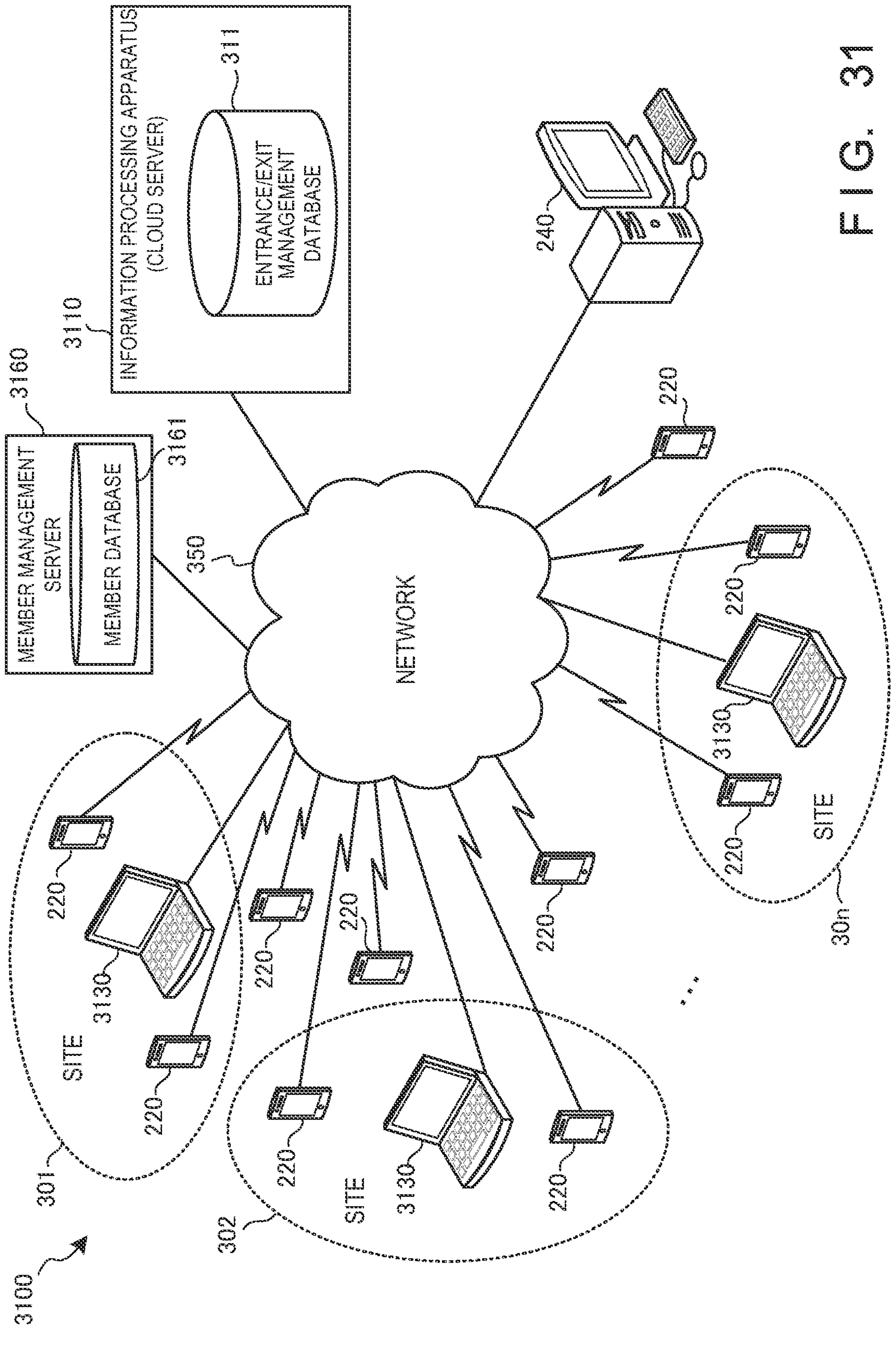
FIG. 31 is a block diagram showing the arrangement of an entrance and exit management system including an information processing apparatus according to the eighth example embodiment of the present invention.

FIG. 31 is a block diagram showing the arrangement of an entrance and exit management system 3100 including an information processing apparatus 3110 according to this example embodiment. Note that in FIG. 31, the same reference numerals as in FIG. 3 denote the same components and a repetitive description thereof will be omitted.

The entrance and exit management system 3100 includes a member management server 3160 having a member database 3161. The member management server 3160 stores and manages worker information and history of workers who have performed member registration in the member database 3161. The information processing apparatus 3110 of the entrance and exit management system 3100 performs input terminal processing for the worker information of the workers who have performed member registration by acquiring the worker information from the member database 3161 without performing the processing by the workers every time. Therefore, a manager terminal 3130 need not transmit, to the information processing apparatus 3110, information such as worker information held in the member database 3161, unlike the above example embodiment, and need only transmit a face image associated with site information.

<<Operation Sequence of Entrance and Exit Management System>>

Figure 32:
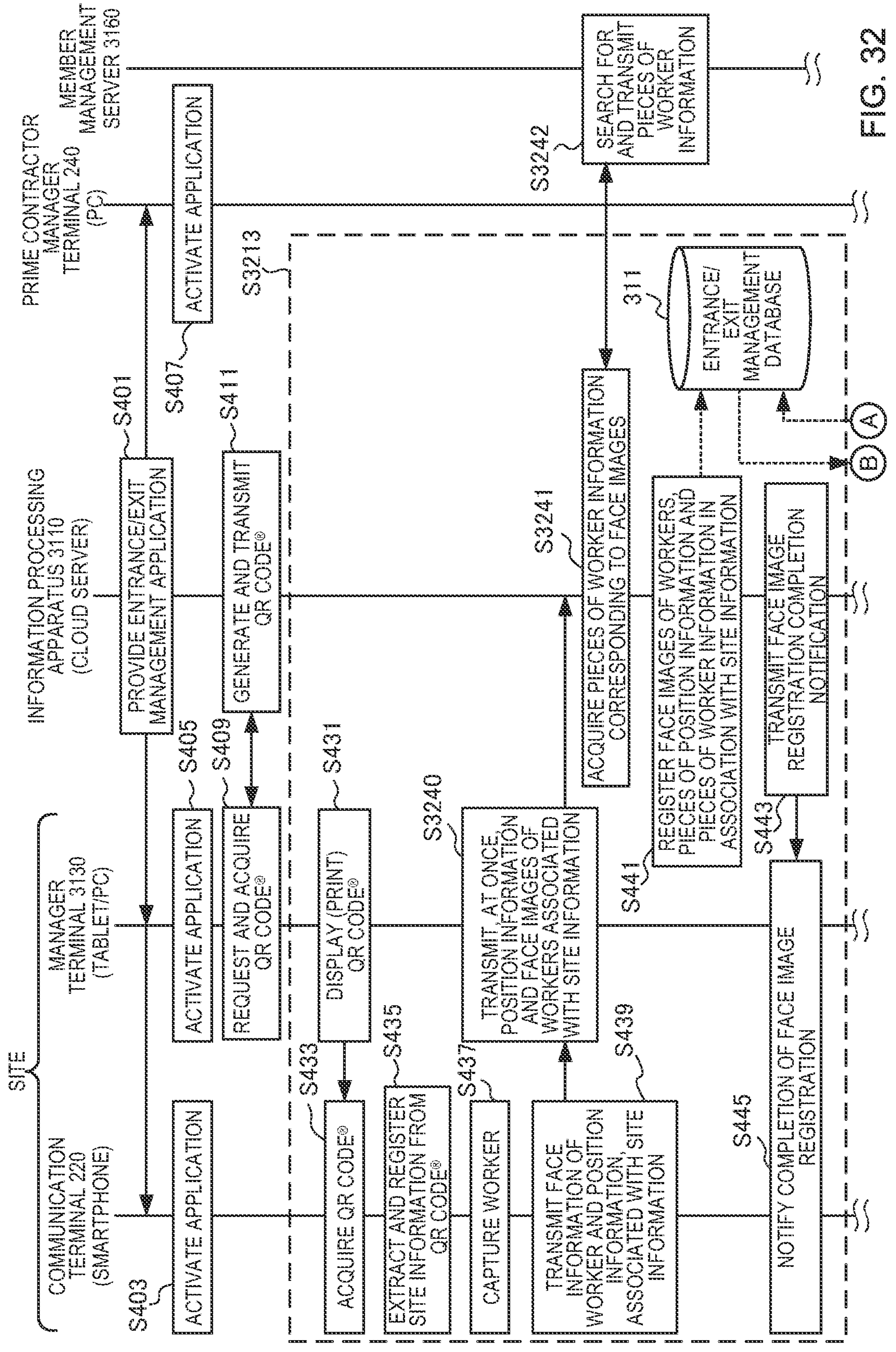
FIG. 32 is a sequence chart showing the registration procedure of the entrance and exit management system including the information processing apparatus according to the eighth example embodiment of the present invention.

FIG. 32 is a sequence chart showing the registration procedure of the entrance and exit management system 3100 including the information processing apparatus 3110 according to this example embodiment. Note that in FIG. 32, the same step numbers as in FIG. 4A denote the same steps and a repetitive description thereof will be omitted.

In step S3213, face image registration processing according to this example embodiment is performed. In step S3240, the manager terminal 3130 transmits, at once, position information and face images of workers associated with site information to the information processing apparatus 3110. In step S3241, the information processing apparatus 3110 acquires pieces of worker information of workers and the like from the member management server 3160. In step S3242, the member management server 3160 transmits, to the information processing apparatus 3110, the pieces of worker information of the workers and the like stored in the member database 3161.

According to this example embodiment, in addition to the effects of the above example embodiments, it is possible to efficiently register face images by saving the labor of inputting worker information for each face image registration operation.

Ninth Example Embodiment

An information processing apparatus according to the ninth example embodiment of the present invention will be described next. The information processing apparatus according to this example embodiment is different from those in the above-described second to eighth example embodiments in that when a predetermined worker patrols a plurality of sites, entrance/exit into/from the sites is managed, unlike management of entrance/exit of workers into/from a predetermined site. The remaining components and operations are the same as those in the second to eighth example embodiments. Hence, the same reference numerals denote the same components and operations, and a detailed description thereof will be omitted.

<<Overview of Operation of Site Management System>>

Figure 33:
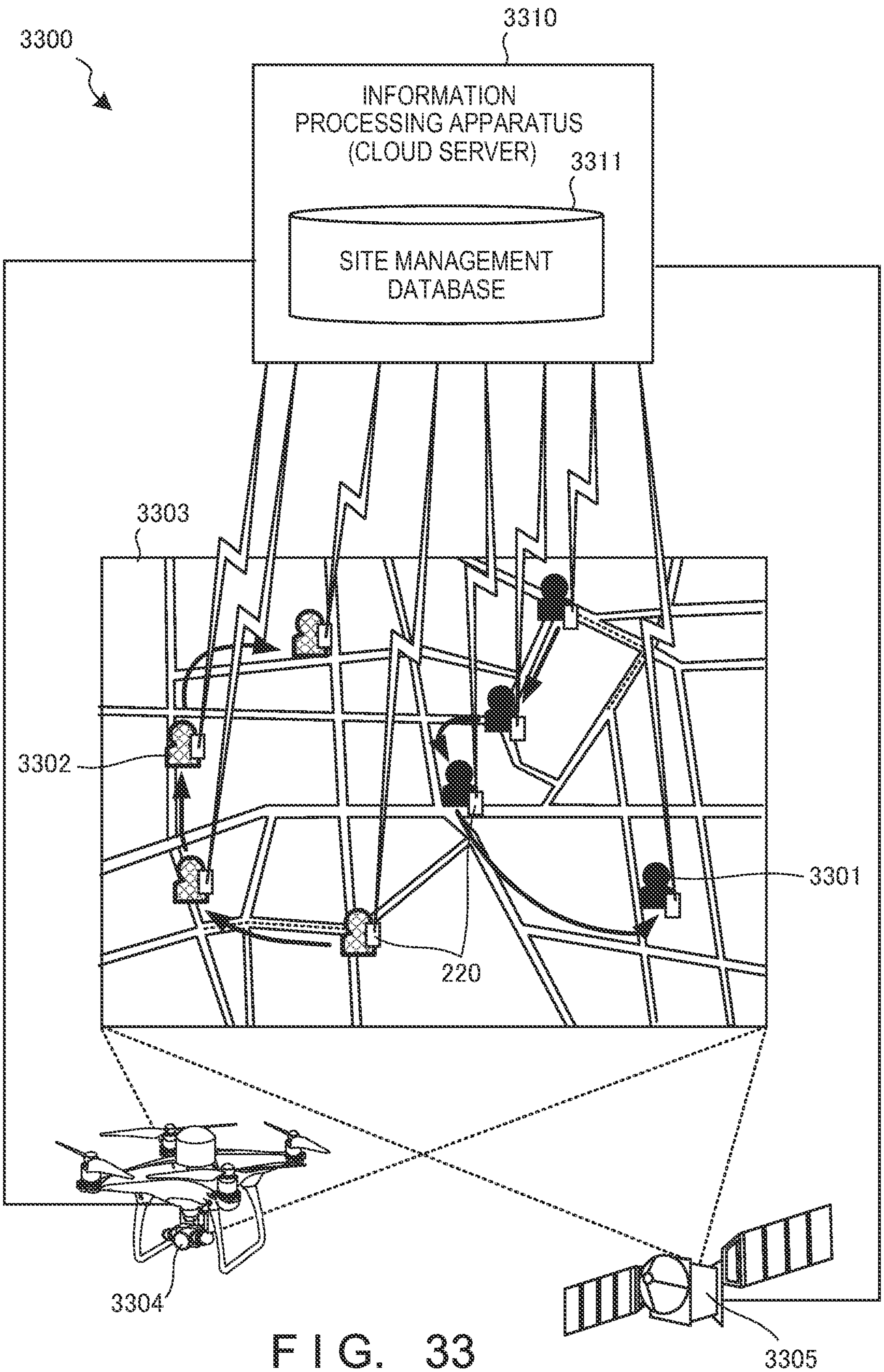
FIG. 33 is a view showing an overview of the operation of a site management system including an information processing apparatus according to the ninth example embodiment of the present invention.

FIG. 33 is a view showing an overview of the operation of a site management system 3300 including an information processing apparatus 3310 according to this example embodiment. Note that in FIG. 33, a communication terminal 220 is the same as that in each of the above-described example embodiments.

Servicemen 3301 and 3302 as a plurality of workers patrol a plurality of sites. The communication terminal 220 carried by each of the servicemen 3301 and 3302 transmits a face image and position information to the information processing apparatus 3310 at the time of entrance into each site, and entrance registration is performed in a site management database by face authentication and position confirmation. In addition, the face image and position information are transmitted to the information processing apparatus 3310 at the time of exit from each site, and exit registration is performed in the site management database by face authentication and position confirmation. In this way, a technique arrangement similar to the technique arrangement in each of the above example embodiments in which workers gather in one site, is applied to a case in which a serviceman patrols a plurality of sites. Note that entrance into or exit from a plurality of sites may be managed for each day or for a long period. Note that for a region 3303 including a plurality of sites when displaying a patrol history of the sites, an existing map, an aerial image obtained using a drone 3304 or the like, or a satellite photo obtained using a satellite 3305 may be used.

(Site Management Database)

FIG. 34 is a table showing the structure of a site management database 3311 according to this example embodiment. Note that FIGS. 6A to 6D may be added to FIG. 34.

The site management database 3311 stores registration information 3412 and a worker entrance/exit history 3413 in association with a worker ID 3411. The registration information 3412 includes the attribute of a worker and sets of a plurality of pieces of site information and a plurality of face images. The worker entrance/exit history 3413 includes work dates, arrival times, departure times, pieces of site information, pieces of position information, and work contents.

According to this example embodiment, even if entrance/exit into/from each site when a predetermined worker patrols a plurality of sites is managed, the technical concept described in each of the above example embodiments can be applied directly.

Tenth Example Embodiment

An information processing apparatus according to the tenth example embodiment of the present invention will be described next. The information processing apparatus according to this example embodiment is different from those in the above-described second to ninth example embodiments in that data accumulated in a file server or the like by performing position confirmation and face authentication are disclosed by specifying a place. For example, by specifying the current place of the user, whether the user can see data having high confidentiality such as product information and drawings browsed in a factory or a construction site is controlled with respect to access to the data, thereby preventing leakage of electric data. The remaining components and operations are the same as those in the second to ninth example embodiments. Hence, the same reference numerals denote the same components and operations, and a detailed description thereof will be omitted.

<<Arrangement of Entrance and Exit Management System>>

Figure 35:
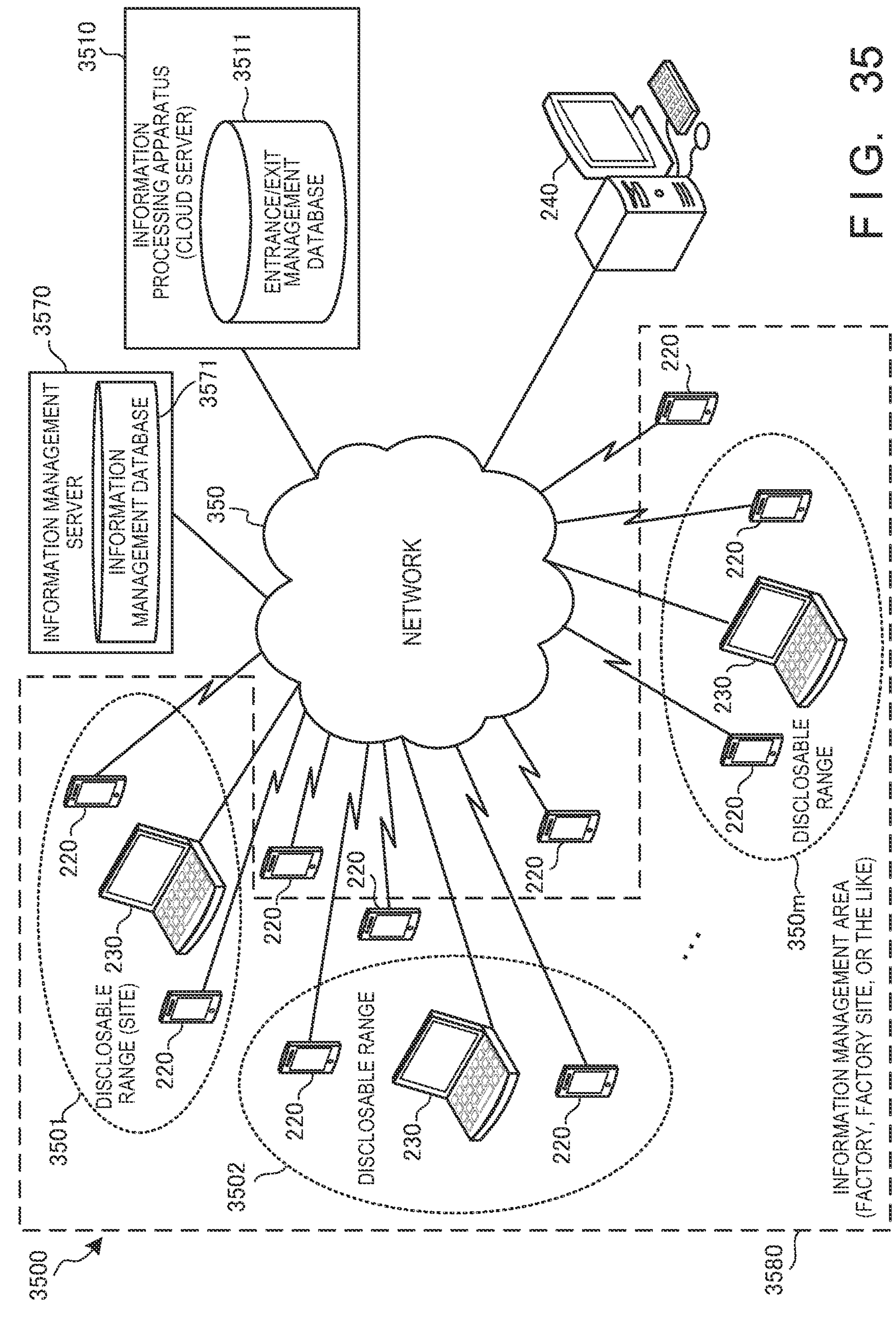
FIG. 35 is a block diagram showing the arrangement of an entrance and exit management system including an information processing apparatus according to the 10th example embodiment of the present invention.

FIG. 35 is a block diagram showing the arrangement of an entrance and exit management system 3500 including an information processing apparatus 3510 according to this example embodiment. Note that in FIG. 35, the same reference numerals as in FIG. 3 denote the same components and a repetitive description thereof will be omitted.

The entrance and exit management system 3500 includes an information management server 3570 having an information management database 3571, such as a file server. The information management server 3570 manages information confidentially stored in the information management database 3571. For example, the information processing apparatus 3510 of the entrance and exit management system 3500 sets disclosable ranges 3501 to 350*m* in an information management area 3580 of a factory or the like, and manages entrance into or exit from the disclosable ranges 3501 to 350*m* using an entrance/exit management database 3511. That is, when a worker carrying a communication terminal 220 enters each of the disclosable ranges 3501 to 350*m*, if determination is performed by face authentication and position confirmation, the information processing apparatus 3510 instructs the information management server 3570 to disclose the confidential information in the information management database 3571. On the other hand, even if the worker carrying the communication terminal 220 enters each of the disclosable ranges 3501 to 350*m*, if face authentication fails, disclosure of the confidential information in the information management database 3571 by the information management server 3570 is aborted. Alternatively, if face authentication succeeds but position confirmation fails (the worker is outside the disclosable ranges 3501 to 350*m*), disclosure of the confidential information in the information management database 3571 by the information management server 3570 is aborted.

Note that the information management server 3570 may also manage entrance/exit of the information processing apparatus 3510 and the information processing apparatus 3510 may manage the confidential information in the information management server 3570.

<<Operation Sequence of Entrance and Exit Management System>>

Figure 36:
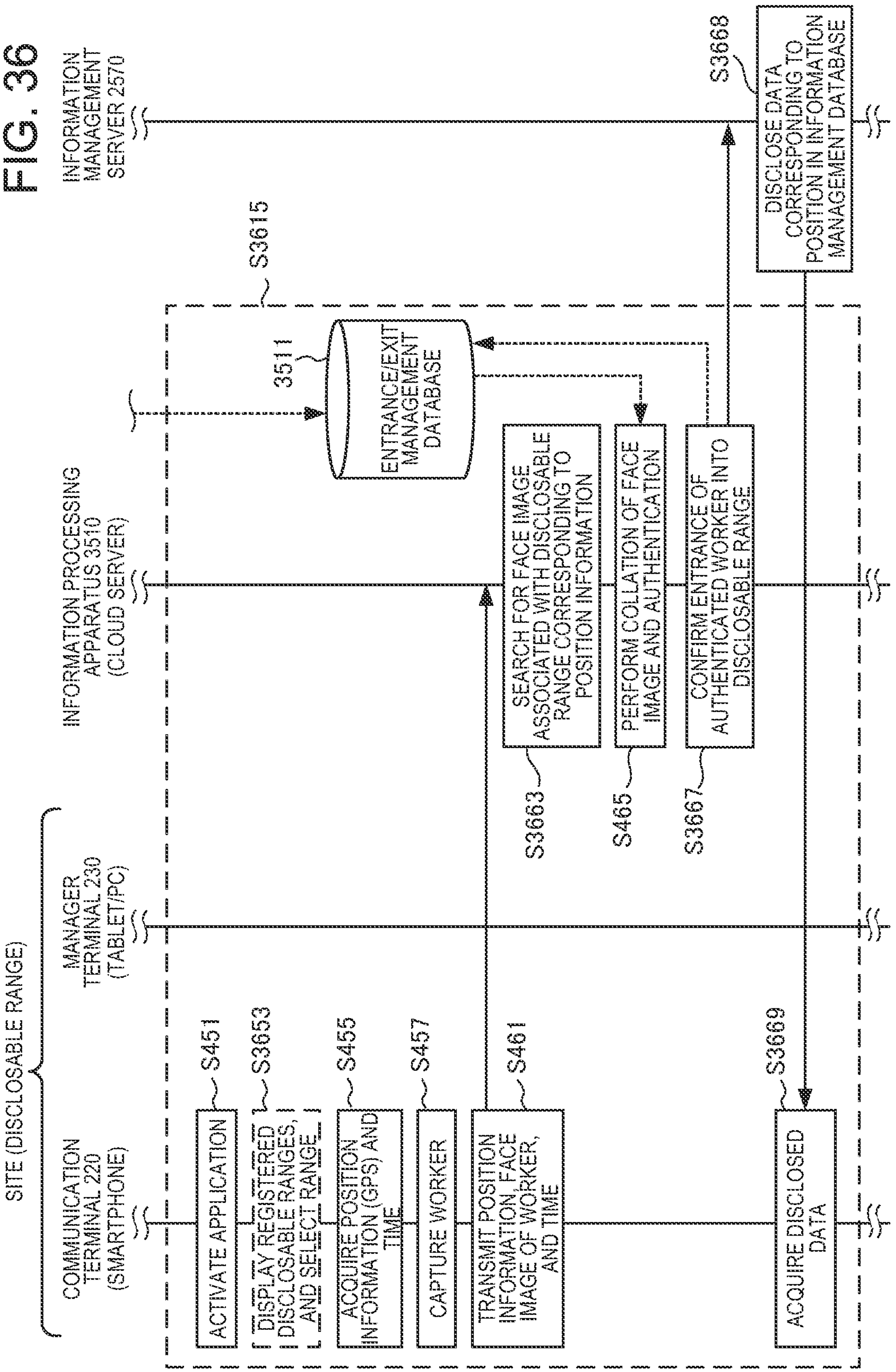
FIG. 36 is a sequence chart showing the operation procedure of the entrance and exit management system including the information processing apparatus according to the 10th example embodiment of the present invention.

FIG. 36 is a sequence chart showing the operation procedure of the entrance and exit management system 3500 including the information processing apparatus 3510 according to this example embodiment. Note that in FIG. 36, the same step numbers as in FIG. 4B denote the same steps and a repetitive description thereof will be omitted.

In step S3653, the communication terminal 220 may displays registered disclosable ranges and select a range. The information processing apparatus 3510 searches, in step S3663, for a face image associated with a disclosable range corresponding to position information of the communication terminal 220, and performs collation/authentication of the face image in step S465. After collation/authentication of the face image, in step S3667 the information processing apparatus 3510 confirms entrance, into the disclosable range, of the worker authenticated based on the position information of the communication terminal 220, and instructs the information management server 3570 to disclose the information. In step S3668, the information management server 3570 discloses, to the target communication terminal 220, confidential data corresponding to a position in the information management database. In step S3669, the communication terminal 220 acquires the data disclosed by the information management server 3570.

<<Functional Arrangement of Information Processing Apparatus>>

Figure 37:
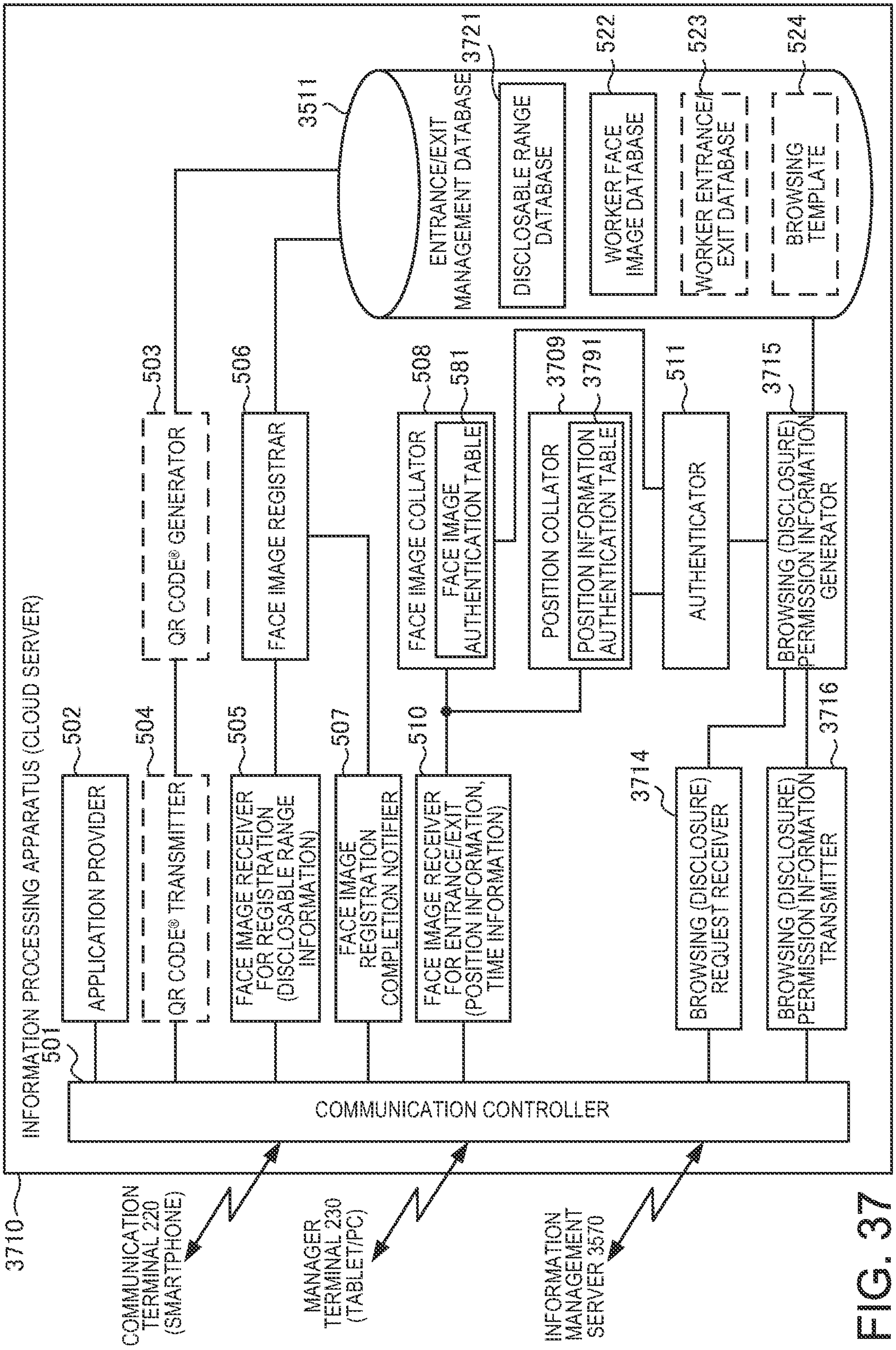
FIG. 37 is a block diagram showing the functional arrangement of the information processing apparatus according to the 10th example embodiment of the present invention.

FIG. 37 is a block diagram showing the functional arrangement of an information processing apparatus 3710 according to the 10th example embodiment of the present invention. Note that in FIG. 37, the same reference numerals as in FIG. 5 denote the same functional components and a repetitive description thereof will be omitted.

The information processing apparatus 3710 includes a position collator 3709, a browsing (disclosure) request receiver 3714, a browsing (disclosure) permission information generator 3715, a browsing (disclosure) permission information transmitter 3716, and a disclosable range database 3721 included in the entrance/exit management database 3511. The position collator 3709 includes a position information authentication table 3791, and collates the position information of the communication terminal of a worker, who desires disclosure of confidential information, with a disclosable range to perform position authentication. The browsing (disclosure) request receiver 3714 receives a browsing (disclosure) request from the communication terminal 220. When an authenticator 511 makes a notification of authentication success, the browsing (disclosure) permission information generator 3715 generates browsing (disclosure) permission information corresponding to the browsing (disclosure) request. The browsing (disclosure) permission information transmitter 3716 transmits the generated browsing (disclosure) permission information to the information management server 3570. Site information of the disclosable range is registered in the disclosable range database 3721 included in the entrance/exit management database 3511.

(Position Information Authentication Table)

FIG. 38 is a table showing the structure of the position information authentication table 3791 according to this example embodiment. The position information authentication table 3791 is used by the position collator 3709 to determine, based on the position information of the communication terminal 220 and the disclosable range, whether the position information indicates a disclosable position.

Note that in FIG. 38, the same reference numerals as in FIG. 7B denote the same components and a repetitive description thereof will be omitted.

The position information authentication table 3791 stores entrance/exit position information 721, disclosable range information 3822, a collation result 3823 which is obtained by collating these pieces of information and indicates whether the position information is included in the disclosable range, and an authentication result 3824 obtained based on the collation result 3823.

<<Processing Procedure of Information Processing Apparatus>>

Figure 39:
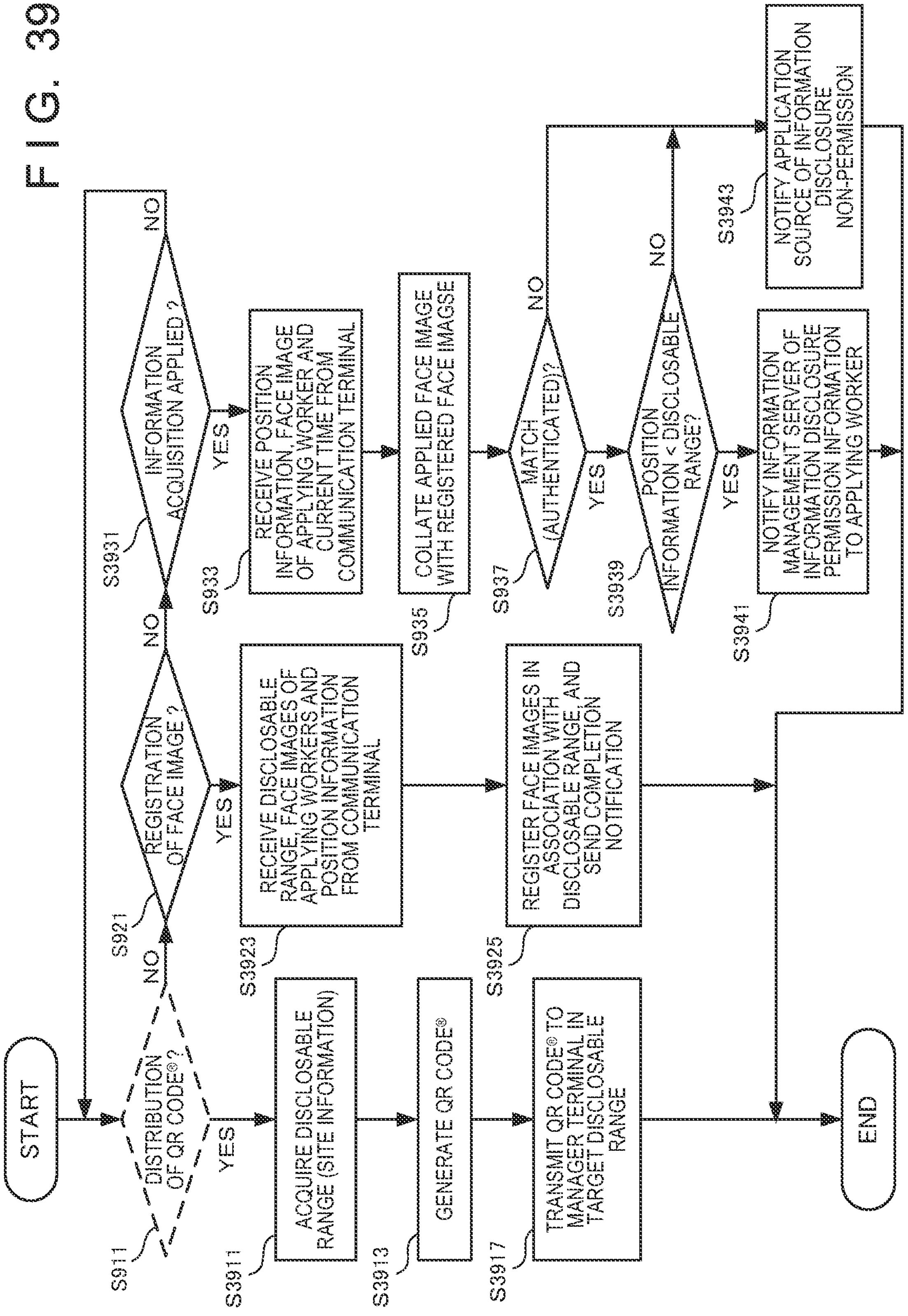
FIG. 39 is a flowchart illustrating the processing procedure of the information processing apparatus according to the 10th example embodiment of the present invention.

FIG. 39 is a flowchart illustrating the processing procedure of the information processing apparatus 3510 according to this example embodiment. Note that in FIG. 39, the same step numbers as in FIG. 9 denote the same steps and a repetitive description thereof will be omitted. Note also that in FIG. 39, face image registration based on a QR Code® is optional.

In step S3911, the information processing apparatus 3510 acquires disclosable range information corresponding to site information. In step S3913, the information processing apparatus 3510 generates a QR Code® from the disclosable range information. In step S3917, the information processing apparatus 3510 transmits the QR Code® to a manager terminal in the target disclosable range. In step S3923, the information processing apparatus 3510 receives the disclosable range, the face images of applying workers, and position information from the communication terminal. In step S3925, the information processing apparatus 3510 registers the face images in association with the disclosable range.

If it is determined not to distribute a QR Code® or register a face image, the information processing apparatus 3510 determines in step S3931 whether to apply information acquisition. In step S3939, the information processing apparatus 3510 determines whether the position information of the communication terminal is included in the disclosable range. If it is determined that the position information of the communication terminal is included in the disclosable range, the information processing apparatus 3510 notifies, in step S3941, the information management server 3570 of information disclosure permission information to the applying worker. On the other hand, if it is determined that the position information of the communication terminal is not included in the disclosable range, the information processing apparatus 3510 notifies, in step S3943, the communication terminal of the applying source of information disclosure non-permission.

Note that in this example embodiment, the information management server is separately provided to manage disclosure of confidential information. However, confidential information may be stored in the information processing apparatus serving as a cloud server, and disclosure management may be performed in the information processing apparatus.

According to this example embodiment, it is possible to control access to data having high confidentiality by combining position confirmation and face authentication, similar to the above-described example embodiments.

Other Example Embodiments

Note that in each of the above-described example embodiments, the information processing apparatus that manages entrance/exit serves as a cloud server that implements various entrance and exit management operations. However, an entrance and exit management server that manages an individual entrance and exit management operation may be used. In addition, although entrance/exit registration is performed by face authentication at the time of entrance/exit, an authentication error may occur or a worker may enter or exit without performing registration processing. In this case, based on browsing by a site manager from the manager terminal, it may be possible to modify the number of entering/exiting people by the operation of forced entrance processing/forced exit processing without performing registration processing.

In the above-described example embodiments, entrance and exit management of workers in a construction site has mainly been explained. However, each of the example embodiments is applied to another system in which unspecified people gather in a site to work, thereby obtaining similar effects. Application to the example embodiment in which an individual worker patrols a plurality of work sites has been described. This example embodiment is also applied to another system similar to the system in which an individual person patrols a plurality of sites, thereby obtaining similar effects. Furthermore, the present invention is applied to another system in which permission/non-permission of specific processing is determined by combining position confirmation and face authentication, thereby obtaining the same effects.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an information processing apparatus comprising:

a face information register that registers, as face information of a registered user in association with a predetermined place, face information of a user who enters or exits from the place;

an information acquirer that acquires, from a communication terminal, position information of the communication terminal, face information of an applying user who applies entrance or exit into or from the place, and application information of entrance or exit;

a user authenticator that performs user authentication by comparing the face information of the applying user acquired by the information acquirer from the communication terminal with the face information of the registered user registered in the face information register; and an entrance/exit recorder that records, if the user authentication succeeds, entrance or exit of the applying user into or from the place corresponding to the position information.

(Supplementary Note 2)

There is provided the information processing apparatus according to supplementary note 1, wherein the information acquirer further acquires time information from the communication terminal, and the entrance/exit recorder records entrance time or exit time of the applying user based on the time information.

(Supplementary Note 3)

There is provided the information processing apparatus according to supplementary note 1 or 2, wherein the user authenticator searches for face information associated with the place corresponding to the position information from the face information registered in the face information register, and compares the face information with the face information of the applying user.

(Supplementary Note 4)

There is provided the information processing apparatus according to any one of supplementary notes 1 to 3, wherein at the time of the user authentication, the user authenticator further performs position information authentication by comparing the position information of the communication terminal with the position information of the place.

(Supplementary Note 5)

There is provided the information processing apparatus according to any one of supplementary notes 1 to 4, further comprising an issuer that issues a place specifying code used by the communication terminal to acquire and hold the place, wherein the face information register receives the place acquired and held by the communication terminal from the place specifying code, and face information of the user captured by the communication terminal, and registers the face information of the user in association with the place, and the information acquirer acquires, from the communication terminal that holds the place, the position information of the communication terminal, the face information of the applying user, and the application information.

(Supplementary Note 6)

There is provided the information processing apparatus according to supplementary note 5, further comprising an instructor that instructs the communication terminal to delete information of the place held by the communication terminal.

(Supplementary Note 7)

There is provided the information processing apparatus according to supplementary note 6, wherein if the user authenticator fails in the user authentication, the instructor instructs the communication terminal to delete the information of the place held by the communication terminal.

(Supplementary Note 8)

There is provided the information processing apparatus according to any one of supplementary notes 1 to 7, wherein the face information registers, as a plurality of registered users, in association with the place, pieces of face information of a plurality of users extracted from an image including face images of the plurality of users.

(Supplementary Note 9)

There is provided the information processing apparatus according to any one of supplementary notes 1 to 8, wherein the information acquirer extracts the pieces of face information of the plurality of users from the image including the face images of the plurality of users, and the user authenticator performs user authentication of the plurality of applying users by comparing the pieces of face information of the plurality of applying users with the pieces of face information of the registered users.

(Supplementary Note 10)

There is provided the information processing apparatus according to any one of supplementary notes 1 to 9, further comprising:

a browsing request acquirer that acquires a browsing request of a record of entrance or exit into or from the place, which is recorded in the entrance/exit recorder; and an information provider that provides, to a browsing request source, in a format according to the browsing request, the record of the entrance or exit into or from the place.

(Supplementary Note 11)

There is provided the information processing apparatus according to any one of supplementary notes 1 to 10, wherein the entrance/exit recorder records entrance or exit of the applying user into or from the place as history information of entrance or exit into or from the place, and the apparatus further comprises a report creator that creates a report using the history information recorded in the entrance/exit recorder.

(Supplementary Note 12)

There is provided a control method for an information processing apparatus, comprising:

registering, as face information of a registered user in association with a predetermined place, in a face information register, face information of a user who enters or exits from the place;

acquiring, from a communication terminal, position information of the communication terminal, face information of an applying user who applies entrance or exit into or from the place, and application information of entrance or exit;

performing user authentication by comparing the face information of the applying user acquired from the communication terminal in the acquiring with the face information of the registered user registered in the face information register; and recording, if the user authentication succeeds, entrance or exit of the applying user into or from the place corresponding to the position information in an entrance/exit recorder.

(Supplementary Note 13)

There is provided a control program of an information processing apparatus for causing a computer to execute a method, comprising:

registering, as face information of a registered user in association with a predetermined place, in a face information register, face information of a user who enters or exits from the place;

acquiring, from a communication terminal, position information of the communication terminal, face information of an applying user who applies entrance or exit into or from the place, and application information of entrance or exit;

performing user authentication by comparing the face information of the applying user acquired from the communication terminal in the acquiring with the face information of the registered user registered in the face information register; and recording, if the user authentication succeeds, entrance or exit of the applying user into or from the place corresponding to the position information in an entrance/exit recorder.

(Supplementary Note 14)

There is provided a communication terminal comprising:

a registration information transmitter that transmits, to an information processing apparatus, as registration of entrance or exit into or from a predetermined place, the place and face information of a registered user who registers entrance or exit into or from the place in association with each other;

an application information transmitter that transmits, to the information processing apparatus, as application information of entrance or exit into or from the place, position information of the communication terminal and face information of an applying user who applies entrance or exit into or from the place;

an authentication result acquirer that acquires, from the information processing apparatus, a result of authentication performed in the information processing apparatus by comparing, with the face information of the applying user transmitted by the application information transmitter, the face information of the registered user transmitted by the registration information transmitter and registered in advance in association with the place; and a notifier that notifies, based on the acquired result of the authentication, whether an application of entrance/exit of the applying user is accepted.

(Supplementary Note 15)

There is provided the communication terminal according to supplementary note 14, further comprising:

a code acquirer that acquires a place specifying code for specifying the place, which is issued by the information processing apparatus;

a place holder that acquires the place from the place specifying code and holds the place;

an operation controller that allows, if the place holder holds the place, the application information transmitter to operate; and a place deletion unit that deletes, if the authentication result acquirer acquires an authentication result indicating a failure of authentication, the place held in the place holder.

(Supplementary Note 16)

There is provided a control method for a communication terminal, comprising:

performing registration information transmission of transmitting, to an information processing apparatus, as registration of entrance or exit into or from a predetermined place, the place and face information of a registered user who registers entrance or exit into or from the place in association with each other;

performing application information transmission of transmitting, to the information processing apparatus, as an application of entrance or exit into or from the place, position information of the communication terminal and face information of an applying user who applies entrance or exit into or from the place;

acquiring, from the information processing apparatus, a result of authentication performed in the information processing apparatus by comparing, with the face information of the applying user transmitted in the performing the application information transmission, the face information of the registered user transmitted in the performing the registration information transmission and registered in advance in association with the place; and notifying, based on the acquired result of the authentication, whether the application of entrance/exit of the applying user is accepted.

(Supplementary Note 17)

There is provided a control program of a communication terminal for causing a computer to execute a method, comprising:

performing registration information transmission of transmitting, to an information processing apparatus, as registration of entrance or exit into or from a predetermined place, the place and face information of a registered user who registers entrance or exit into or from the place in association with each other;

performing application information transmission of transmitting, to the information processing apparatus, as an application of entrance or exit into or from the place, position information of the communication terminal and face information of an applying user who applies entrance or exit into or from the place;

acquiring, from the information processing apparatus, a result of authentication performed in the information processing apparatus by comparing, with the face information of the applying user transmitted in the performing the application information transmission, the face information of the registered user transmitted in the performing the registration information transmission and registered in advance in association with the place; and notifying, based on the acquired result of the authentication, whether the application of entrance/exit of the applying user is accepted.

(Supplementary Note 18)

There is provided an entrance/exit management system comprising:

a face information register that registers, as face information of a registered user in association with a predetermined place, face information of a user who enters or exits from the place;

an information acquirer that acquires position information of a communication terminal, face information, captured by the communication terminal, of an applying user who applies entrance or exit into or from the place, and application information of entrance or exit input to the communication terminal;

a user authenticator that performs user authentication by comparing the face information of the applying user acquired by the information acquirer with the face information of the registered user registered in the face information register; and an entrance/exit recorder that records, if the user authentication succeeds, entrance or exit of the applying user into or from the place corresponding to the position information.

(Supplementary Note 19)

There is provided an entrance/exit management system according to supplementary note 18, wherein the face information registers the face information of the user in association with the place acquired from an issued place specifying code for specifying the issued place, if the acquired place is held by the communication terminal, the information acquirer acquires the position information of the communication terminal, the face information of the applying user, and the application information, and a place deletion unit that deletes, if the user authenticator fails in authentication, the place held by the communication terminal.

(Supplementary Note 20)

There is provided an entrance/exit management method for an entrance/exit management system, comprising:

registering, as face information of a registered user in association with a predetermined place, in a face information register, face information of a user who enters or exits from the place;

acquiring position information of a communication terminal, face information, captured by the communication terminal, of an applying user who applies entrance or exit into or from the place, and application information of entrance or exit input to the communication terminal;

performing user authentication by comparing the face information of the applying user acquired in the acquiring with the face information of the registered user registered in the face information register; and recording, if the user authentication succeeds, entrance or exit of the applying user into or from the place corresponding to the position information in an entrance/exit recorder.

What is claimed is:

1. A non-transitory computer readable medium storing a control program of a communication terminal for causing a computer to execute a method, the method comprising:

transmitting, to an information processing apparatus and via the communication terminal, position information of the communication terminal and face information of a user who requests to enter a place or exit the place;

acquiring, from the information processing apparatus, a result of user authentication by comparing the transmitted face information of the user with registered face information of registered users that have been registered in advance as corresponding to the transmitted position information; and notifying, to the user, whether the user is permitted to enter the place or exit the place based on the acquired result of the user authentication.

2. The non-transitory computer readable medium according to claim 1, the method further comprising:

transmitting, to the information processing apparatus, time information which indicates time of entry into the place or time of exit from the place of the user.

3. The non-transitory computer readable medium according to claim 1, wherein the result of user authentication is generated by comparing the position information of the communication terminal with place information of the place.

4. The non-transitory computer readable medium according to claim 3, the method further comprising:

acquiring a code for specifying the place; and acquiring the place information from the code.

5. The non-transitory computer readable medium according to claim 4, wherein the code for specifying the place is a two-dimensional code.

6. The non-transitory computer readable medium according to claim 4, the method further comprising:

holding the place information in a place holder;

allowing, if the place holder holds the place information, transmission of the position information of the communication terminal and the face information of the user; and deleting, if the result of the authentication indicates a failure of authentication or if a usage period has expired, the place information held in the place holder.

7. A method for controlling a communication terminal, the method comprising:

transmitting, via the communication terminal and to an information processing apparatus, position information of the communication terminal and face information of a user who requests to enter a place or exit the place;

acquiring, by the communication terminal and from the information processing apparatus, a result of user authentication by comparing the transmitted face information of the user with registered face information of registered users that have been registered in advance as corresponding to the transmitted position information; and notifying, to the user, whether the user is permitted to enter the place or exit the place based on the acquired result of the user authentication.

8. The method according to claim 7, further comprising:

transmitting, to the information processing apparatus, time information which indicates time of entry into the place or time of exit from the place of the user.

9. The method according to claim 7, wherein the result of user authentication is generated by comparing the position information of the communication terminal with place information of the place.

10. The method according to claim 7, further comprising:

acquiring a code for specifying the place; and acquiring the place information from the code.

11. The method according to claim 10, wherein the code for specifying the place is a two-dimensional code.

12. The method according to claim 10, further comprising:

holding the place information in a place holder;

allowing, if the place holder holds the place information, transmission of the position information of the communication terminal and the face information of the requesting user; and deleting, if the result of the authentication indicates a failure of authentication or if a usage period has expired, the place information held in the place holder.

13. A communication terminal comprising:

a memory storing instructions; and a processor configured to execute the instructions to:

transmit, to an information processing apparatus and via the communication terminal, position information of the communication terminal and face information of a user who requests to enter a place or exit the place;

acquire, from the information processing apparatus, a result of user authentication by comparing the transmitted face information of the user with registered face information of registered users that have been registered in advance as corresponding to the transmitted position information; and notify, to the user, whether the user is permitted to enter the place or exit the place based on the acquired result of the user authentication.

14. The communication terminal according to claim 13, wherein the processor is further configured to execute the instruction to:

transmit, to the information processing apparatus, time information which indicates time of entry into the place or time of exit from the place of the user.

15. The communication terminal according to claim 13, wherein the result of user authentication is generated by comparing the position information of the communication terminal with place information of the place.

16. The communication terminal according to claim 13, wherein the processor is further configured to execute the instruction to:

acquiring a code for specifying the place; and acquiring the place information from the code.

17. The communication terminal according to claim 16, wherein the code for specifying the place is a two-dimensional code.

18. The communication terminal according to claim 16, wherein the processor is further configured to execute the instruction to:

hold the place information in a place holder;

allow, if the place holder holds the place information, transmission of the position information of the communication terminal and the face information of the user; and delete, if the result of the authentication indicates a failure of authentication or if a usage period has expired, the place information held in the place holder.

* * * * *